(12) United States Patent
Tsuchitoi

(10) Patent No.: US 8,411,328 B2
(45) Date of Patent: Apr. 2, 2013

(54) PRINT CONTROL APPARATUS, PRINT CONTROL METHOD, AND PROGRAM THEREFOR

(75) Inventor: Naoki Tsuchitoi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 933 days.

(21) Appl. No.: 12/265,174

(22) Filed: Nov. 5, 2008

(65) Prior Publication Data

US 2009/0122351 A1 May 14, 2009

(30) Foreign Application Priority Data

Nov. 8, 2007 (JP) ................................. 2007-291139

(51) Int. Cl.
*H04N 1/40* (2006.01)
*H04L 9/32* (2006.01)
*F16L 17/00* (2006.01)

(52) U.S. Cl. ...... 358/3.28; 358/3.22; 713/168; 713/176; 283/113

(58) Field of Classification Search ................. 358/3.28, 358/3.22, 1.14, 1.15, 1.16, 539, 116; 382/112, 382/276, 111, 149, 217, 170; 713/176, 161, 713/168, 170; 283/113; 282/113; 726/1, 726/26

See application file for complete search history.

(56) References Cited

U.S. PATENT DOCUMENTS

| 5,781,653 A | 7/1998 | Okubo ........................... 382/135 |
| 7,007,167 B2* | 2/2006 | Kurahashi ....................... 713/176 |
| 7,330,974 B1* | 2/2008 | Silverbrook et al. .......... 713/176 |
| 7,536,555 B2* | 5/2009 | Rhoads .......................... 713/176 |
| 7,567,355 B2* | 7/2009 | Matsunoshita ............... 358/1.13 |
| 7,567,686 B2* | 7/2009 | Rhoads .......................... 382/100 |
| 7,995,196 B1* | 8/2011 | Fraser .............................. 356/71 |
| 8,009,305 B2* | 8/2011 | Ishikawa et al. .............. 358/1.14 |
| 2002/0181738 A1* | 12/2002 | Nakamura et al. ............. 382/100 |
| 2003/0009670 A1* | 1/2003 | Rhoads .......................... 713/176 |

(Continued)

FOREIGN PATENT DOCUMENTS

| EP | 0 967 803 | 12/1999 |
| JP | 2001-144941 | 5/2001 |

(Continued)

OTHER PUBLICATIONS

International European Search Report of Application No. EP 08 16 8644 dated Feb. 2, 2009.

(Continued)

*Primary Examiner* — Madelein A Nguyen
(74) *Attorney, Agent, or Firm* — Fitzpatrick, Cella, Harper & Scinto

(57) ABSTRACT

Conventionally, during a copy operation, certain advanced mode settings make the extraction of additional security information impossible. In order to solve this problem, the print control apparatus includes: determining unit for determining an interval between a pattern element and a pattern element adjacent to the pattern element from the received image data; and control unit for performing a control so as to scale the image at a magnification specified by a user and have the scaled image printed by a printing apparatus when the product of the magnification specified by the user and the interval determined by the determining unit falls within a predetermined range, and configured to terminate or interrupt the printing of the image by the printing apparatus when the product of the magnification specified by the user and the interval determined by the determining unit does not fall within the predetermined range.

7 Claims, 43 Drawing Sheets

U.S. PATENT DOCUMENTS

| | | | |
|---|---|---|---|
| 2003/0090745 A1* | 5/2003 | Kia et al. | 358/474 |
| 2003/0095163 A1* | 5/2003 | Otsuki et al. | 347/19 |
| 2003/0179399 A1 | 9/2003 | Matsunoshita | 358/1.13 |
| 2003/0210803 A1* | 11/2003 | Kaneda et al. | 382/100 |
| 2004/0074973 A1* | 4/2004 | Schneck et al. | 235/488 |
| 2004/0153649 A1* | 8/2004 | Rhoads et al. | 713/176 |
| 2004/0184065 A1* | 9/2004 | Guan et al. | 358/1.14 |
| 2005/0041263 A1* | 2/2005 | Ishikawa et al. | 358/1.14 |
| 2005/0151990 A1* | 7/2005 | Ishikawa et al. | 358/1.14 |
| 2005/0190411 A1* | 9/2005 | Ohno | 358/3.28 |
| 2006/0072782 A1* | 4/2006 | Abe et al. | 382/100 |
| 2006/0187486 A1* | 8/2006 | Tsuchitoi | 358/1.15 |
| 2007/0097384 A1 | 5/2007 | Hashimoto | 358/1.2 |
| 2007/0127055 A1* | 6/2007 | Kujirai et al. | 358/1.14 |
| 2007/0133036 A1* | 6/2007 | Matsunoshita et al. | 358/1.14 |
| 2007/0171452 A1* | 7/2007 | Matsunoshita | 358/1.14 |
| 2007/0247652 A1* | 10/2007 | Akahori | 358/1.13 |
| 2008/0028448 A1* | 1/2008 | Tsuchitoi | 726/6 |
| 2008/0216149 A1* | 9/2008 | Rhoads | 726/1 |
| 2009/0254971 A1* | 10/2009 | Herz et al. | 726/1 |
| 2009/0268257 A1* | 10/2009 | Silverbrook et al. | 358/3.28 |
| 2010/0094639 A1* | 4/2010 | Rhoads | 704/500 |
| 2010/0165414 A1* | 7/2010 | Kautto et al. | 358/3.28 |

FOREIGN PATENT DOCUMENTS

| | | |
|---|---|---|
| JP | 2003-280469 | 10/2003 |
| JP | 2006-165818 | 6/2006 |
| JP | 2006-174085 A | 6/2006 |

OTHER PUBLICATIONS

Japanese Office Action dated May 29, 2012, issued by the Japanese Patent Office, in Japanese Patent Application No. 2011-252591.

* cited by examiner

FIG.15

| AREA | PURPOSE | ANALYSIS SPEED | DATA SIZE |
|---|---|---|---|
| FIRST AREA | REALTIME DETECTION INFORMATION SUCH AS COPY RESTRICTION | SIMILAR SPEED AS SCANNING SPEED | SMALL SIZE |
| SECOND AREA | NON-REALTIME DETECTION INFORMATION SUCH AS TRACKING RESTRICTION | RELATIVELY SLOW SPEED | LARGE SIZE |

010,111,110,011 = 2,7,6,3

PRINT CONTROL APPARATUS, PRINT CONTROL METHOD, AND PROGRAM THEREFOR

BACKGROUND OF THE INVENTION

1. Field of the Invention

The present invention relates to an information leakage countermeasure technique, applicable in particular to the generation of images including e.g. confidential, proprietary or commercially sensitive information by an image forming apparatus.

2. Description of the Related Art

The recent progress of IT in offices has led to a growing interest in security. The privacy of organizations as well as the privacy of individuals may in instances be jeopardized as manifested by, for example, an occurrence of leakage of company-owned information.

To tackle the problems described above, companies are attempting to prevent leakage to the outside by introducing IT (Information Technology) mechanisms such as setting access privileges for computerized confidential information or setting a monitoring apparatus on a firewall. Alternatively, companies are taking measures such as prohibiting notebook or laptop PCs, USB memories and other portable media from being carried out from and/or carried into the office. Computerized confidential information can be protected to a certain degree by implementing measures using an IT mechanism such as described above. This is because electronic information can only be referenced using such an IT mechanism, and also because an IT mechanism can be readily introduced therein.

On the other hand, when confidential information is printed on a medium such as paper by an image forming apparatus or the like, it is difficult to check or prevent paper, on which organizational secrets or private information of individuals are printed, from being carried out, for example, of a building. Accordingly, it is possible to circumvent conventional IT mechanisms such as described above. This makes restricting paper from being carried out more difficult as compared to computerized confidential information, presenting a challenge to maintaining security.

Various information leakage countermeasure techniques have been conventionally devised in order to deal with this problem.

As a first information leakage countermeasure technique, a conventionally-devised system involves using a known digital watermarking technique or an information embedding technique such as for example a two-dimensional barcode to embed tracking information into a paper medium itself in addition to an original image during printing. According to such systems, when information leakage involving a paper medium occurs, the tracking information can be extracted by analyzing the leaked original document. Consequently, since it is now possible to pursue those responsible for improperly taking out an original document based on tracking information included in the original, a deterrent effect on illicit actions can be expected.

In addition, as a second information leakage countermeasure technique, a conventionally devised technique involves using, for example, a known watermarking technique or a two-dimensional barcode technique to embed copy restricting information for prohibiting copying onto a medium such as paper during printing. An image forming apparatus accommodating such techniques is capable of detecting whether or not copying is enabled by extracting the copy restricting information from the original during copying, making it possible to control continuation or termination of copying on a per page basis. Furthermore, techniques have been proposed in which, aside from just copy restriction where copying is simply enabled or disabled, password information and authorized user information are embedded as condition information, whereby copying is only permitted to specific users based on the condition information. For example, one such system is disclosed in Japanese Patent Laid-Open No. 2003-280469. Hereinafter, tracking information and copy restricting information described above shall collectively be referred to as "additional security information".

Moreover, many processing techniques referred to as "advanced modes", in which printing is performed after subjecting an image to processing in accordance with a user's request, are conventionally implemented in copiers and other image forming apparatuses. Representative examples include the following:

Enlarged/reduced printing function for enlarging/reducing the size of an image with respect to an input original and printing the image Area specifying function for arbitrarily selecting an area of an image of the original to be printed Moving function for moving an image of the original longitudinally and/or laterally and printing the image Image creating function for performing mirror image inversion or negative-positive reversal on an image Conventionally, these advanced modes are applicable not only to ordinary originals but also to originals embedded with the additional security information described above.

However, with the conventional techniques described above, because it may not be possible to extract and read additional security information in printed images to which certain advance mode settings have been applied during a copying operation, there is a problem in that desired security measures may not be implemented.

In addition, while offices in which originals embedded with additional security information are distributed may choose to ban advanced mode settings and printing under such modes, such bans have an adverse effect of inhibited availability because a user is no longer able to select advanced modes when performing copying.

SUMMARY OF THE INVENTION

An object of the invention is to solve the above-described problems. Therefore, to solve the above-described problems, the invention can be configured as follows.

In the first aspect of the present invention, there is provided a print controller configured to receive image data, the image data including additional security information, for copy tracking and/or copy restriction, the additional security information being in the form of a pattern of pattern elements, the print controller comprising: a determining unit which determines an original pattern dimension from the pattern of pattern elements; and a control unit which receives a user-specified print scaling factor; determines a post-scaling pattern dimension from the product of the original pattern dimension and the print scaling factor; and determines whether the post-scaling pattern dimension falls within a predetermined range.

In the second aspect of the present invention, there is provided a print control method comprising: receiving image data, the image data including additional security information for copy tracking and/or copy restriction, the additional security information being in the form of a pattern of pattern elements; determining an original pattern dimension from the pattern of pattern elements; receiving a user-specified print scaling factor; determining a post-scaling pattern dimension from the product of the original pattern dimension and the print scaling factor; and determining whether the post-scaling pattern dimension falls within a predetermined range.

In the third aspect of the present invention, there is provided a computer-readable recording medium storing a program which when run on a computer causes the computer to: receive image data, the image data including additional security information for copy tracking and/or copy restriction, the additional security information being in the form of a pattern of pattern elements; determine an original pattern dimension from the pattern of pattern elements; receive a user-specified print scaling factor; determine a post-scaling pattern dimension from the product of the original pattern dimension and the print scaling factor; and determine whether the post-scaling pattern dimension falls within a predetermined range.

In the fourth aspect of the present invention, there is provided a print controller for receiving image data, the image data including additional security information for copy tracking and/or copy restriction, the additional security information being in the form of pattern made up of a periodically repeated pattern component, the pattern component made up of pattern elements, the print controller comprising a control unit, the control unit being configured to receive a user-specified move request and/or area specification; apply the move request and/or area specification to the image data; determine the number of pattern components remaining in the image after application of the move request and/or area specification; and determine whether the number of pattern components remaining exceeds a predetermined threshold.

In the fifth aspect of the present invention, there is provided a print controller for receiving image data, the print controller comprising: a determining unit configured to determine whether the image data comprises additional security information, for copy tracking and/or copy restriction, the additional security information being in the form of a pattern made up of pattern elements; a control unit configured to issue a terminate print instruction upon receiving both (i) a signal from the determining unit indicating the presence of additional security information and (ii) a user request to perform a mirror-imaging or negative-positive reversal process on the image data.

In addition, the present invention can be configured as a program for causing a computer to implement the method(s) of the present invention. The computer may thus function as the determining means or unit and the control means or unit of the print controller described above. The program can be in any form such as a signal. Furthermore, the program may be stored on a computer-readable storage medium that can be read by the computer.

According to the present invention, even when copying an original synthesized with additional security information, an image forming apparatus is now able to allow printing in which image processing is performed to the extent that the additional security information is not destroyed, thereby enhancing user convenience.

Further features of the present invention will become apparent from the following description of exemplary embodiments (with reference to the attached drawings).

BRIEF DESCRIPTION OF THE DRAWINGS

FIG. 15 is a diagram describing a difference in characteristics between a first area and a second area according to the first embodiment of the present invention;

DESCRIPTION OF THE EMBODIMENTS

[First Embodiment]

A first embodiment of the present invention will now be described.

<Overall Layout of System>

Figure 1:
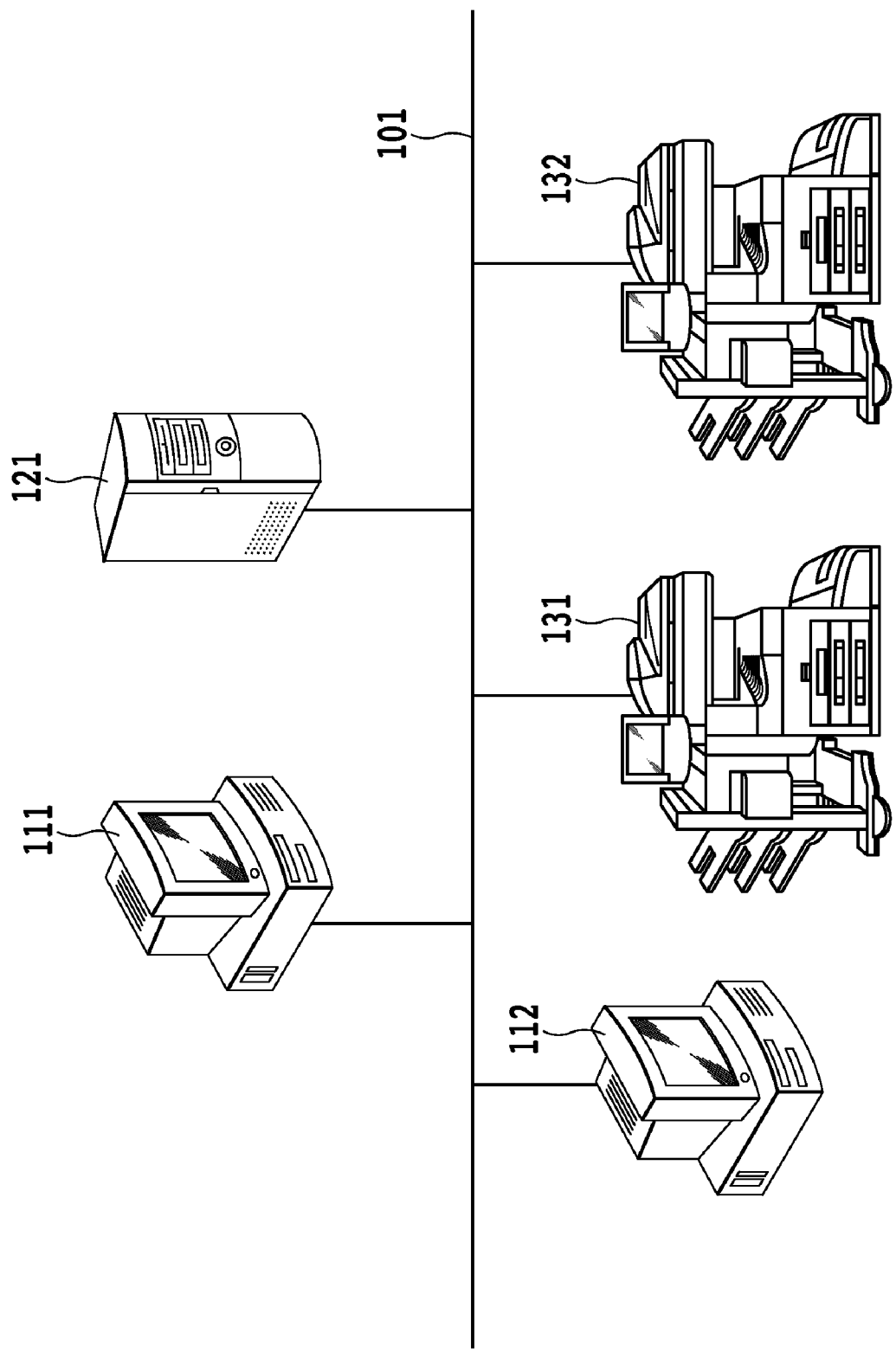
FIG. 1 is a diagram showing an overall layout of a system according to a first embodiment of the present invention.

FIG. 1 is a diagram describing an overall layout of a system according to a first embodiment of the present invention.

In FIG. 1, reference numerals 111 and 112 denote client PCs, 121 a print server, and 131 and 132 image forming apparatuses having a copy function and a print function. It is assumed that these apparatuses are connected to and communicate with each other via a LAN 101.

As a result of a user operating the client PC 111 or 112, the client PC 111 or 112 generates print data and transmits the generated print data to the print server 121.

The print server 121 retransmits the received print data to the image forming apparatus 131 or 132.

At the image forming apparatus 131 or 132, the print data received from the print server 121 is interpreted and converted into image data. Printing is performed on a printable medium, such as paper, based on the data to generate printed matter.

The above description presents a system configuration example. A configuration that does not include the print server 121 is also conceivable. In this case, the client PC 111 or 112 directly sends print data to the image forming apparatus 131 or 132. Additionally, instead of via the LAN 101, the apparatuses may be connected using a known local interface such as an IEEE 1284 interface, a USB (Universal Serial Bus) interface, or the like.

Next, overall operations of the present system will be briefly described with regard to an instruction for embedding copy restricting information or information for tracking print output and to a copy restricting operation.

Let us assume that, in the configuration shown in FIG. 1 described earlier, a user issues an instruction to embed a print output with additional security information for copy restriction or for tracking print output when operating the client PC 111 or 112. Consequently, the image forming apparatus 131 or 132 generates a print output embedded with additional security information, for example as a background image, for copy restriction or for tracking print output.

Figure 2:
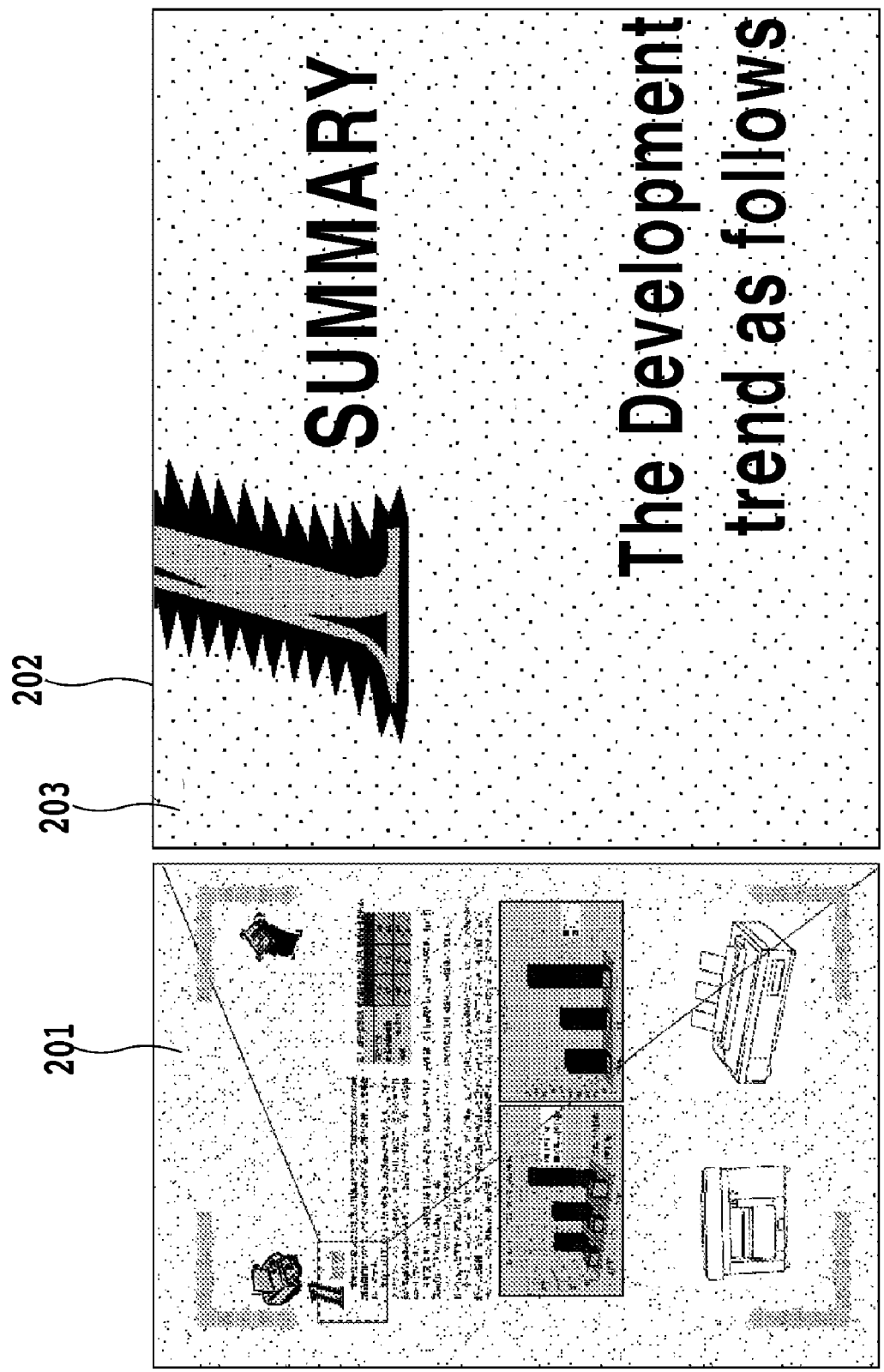
FIG. 2 is an image diagram showing an example of an original embedded with an LVBC according to the first embodiment of the present invention.

An example of a print output including such a background image is shown in FIG. 2. A detailed description on FIG. 2 will be given later. In addition, specific operations starting from an operation by the user up to the generation of a print output will be described later with reference to FIGS. 12 and 13.

As shown in FIG. 2, when the user attempts to copy an original including copy restricting information using the image forming apparatus 131 or 132, the image forming apparatus 131 or 132 detects that copy restricting information is included in the original and terminates the copy operation. Accordingly, the image forming apparatus 131 or 132 prevents an important document from being copied.

This concludes the brief description of some of the operations of the overall system. Hereinafter, a detailed description will be given as to how specifically the series of operations are to be performed.

<Specification of Copy Control Information or Tracking Information by a Client PC>

Figure 3:
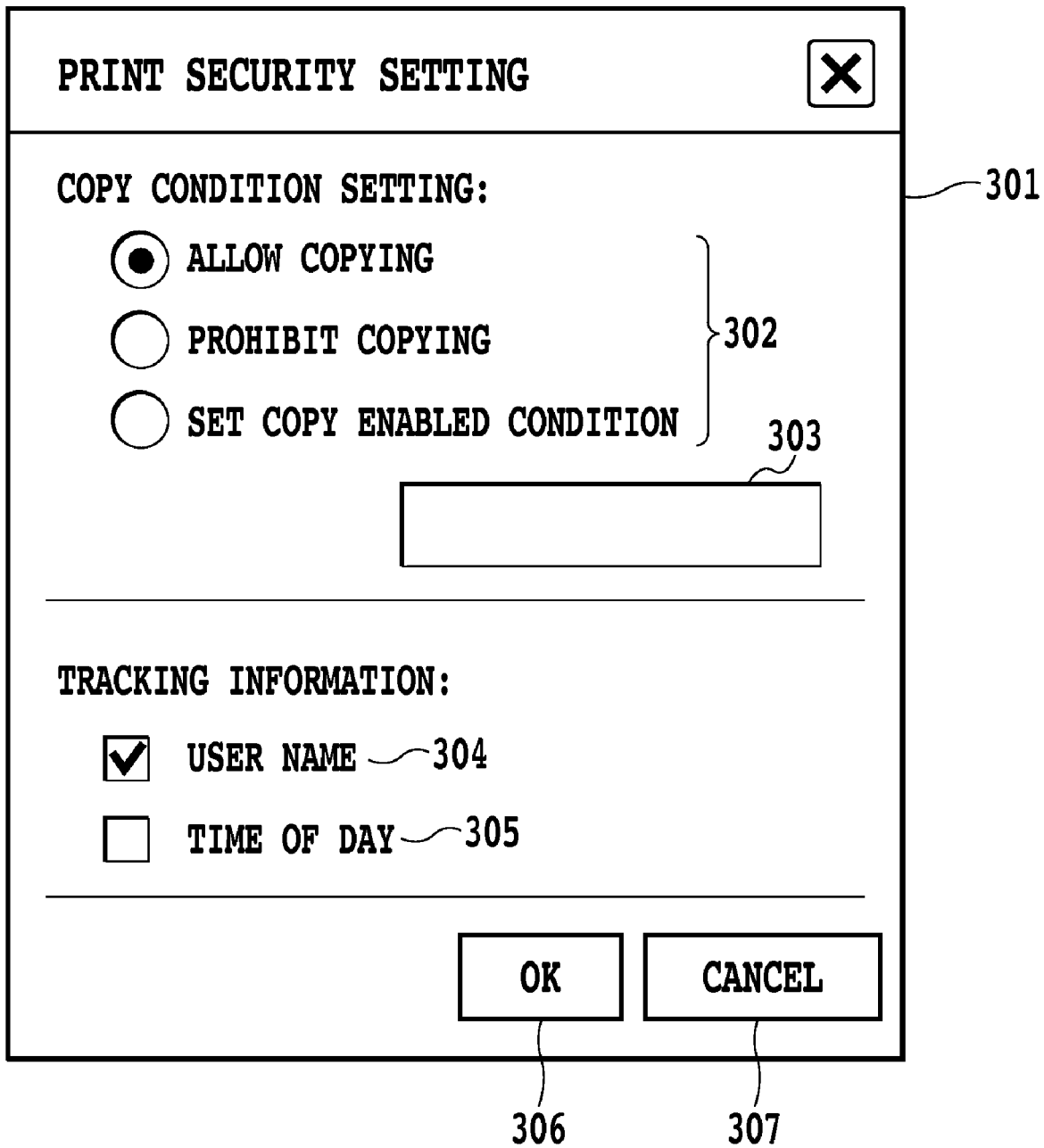
FIG. 3 is a diagram showing an example of a printer driver setting screen according to the first embodiment of the present invention.

FIG. 3 shows an example of a printer driver setting screen of the client PC 111 or 112.

In FIG. 3, reference numeral 301 denotes a print security setting dialog in the form of a box on the screen of the client PC 111 or 112. Via the dialog, the user is able to add additional security information by performing a setting operation to select a security setting that he/she wishes to embed into a print output. The print security setting dialog 301 is divided into two main portions: the upper half is a portion for setting a copy restriction and the lower half is a portion for setting tracking information.

First, a description will be given on the upper half portion for setting copy restriction.

In the present embodiment, the user operates a button 302 and selects one of three settings, namely, "allow copying", "prohibit copying", and "set copy enabled condition". When the third option, "set copy enabled condition", is selected, a state is entered in which a password input field 303 enables input, whereby the user can input a password to enable copying by releasing the copy prohibition. The password is to be included in tracking information described below.

Next, a description will be given on the portion for setting tracking information, that is the lower half of the print security setting dialog 301.

In the present embodiment, two checkboxes 304 and 305 are arranged. By checking the checkboxes, the user is able to respectively instruct embedding of a user name and/or time of day information.

While the two types of tracking information described above have been demonstrated in the present embodiment, tracking information can include any information as long as such information is reproducible by an image forming apparatus. For example, an IP (Internet Protocol) address, a MAC (Media Access Control) address, an installation site, an office/division name or the like, or information specific to the image forming apparatus 131 can be added as tracking information.

The various types of additional security information described above are stored in a job restricting information storage unit 1204, to be described later with reference to FIG. 12, when the user presses down on an OK button 306.

<Copy Restricting Operation of an Image Forming Apparatus>

Next, a description will be given on an example of an operation screen in a case where the image forming apparatus 131 or 132 detects that copy restricting information is included in an original. The screen is displayed on an operating unit 412 shown in FIG. 4 (a detailed description will be given later).

Figure 5:
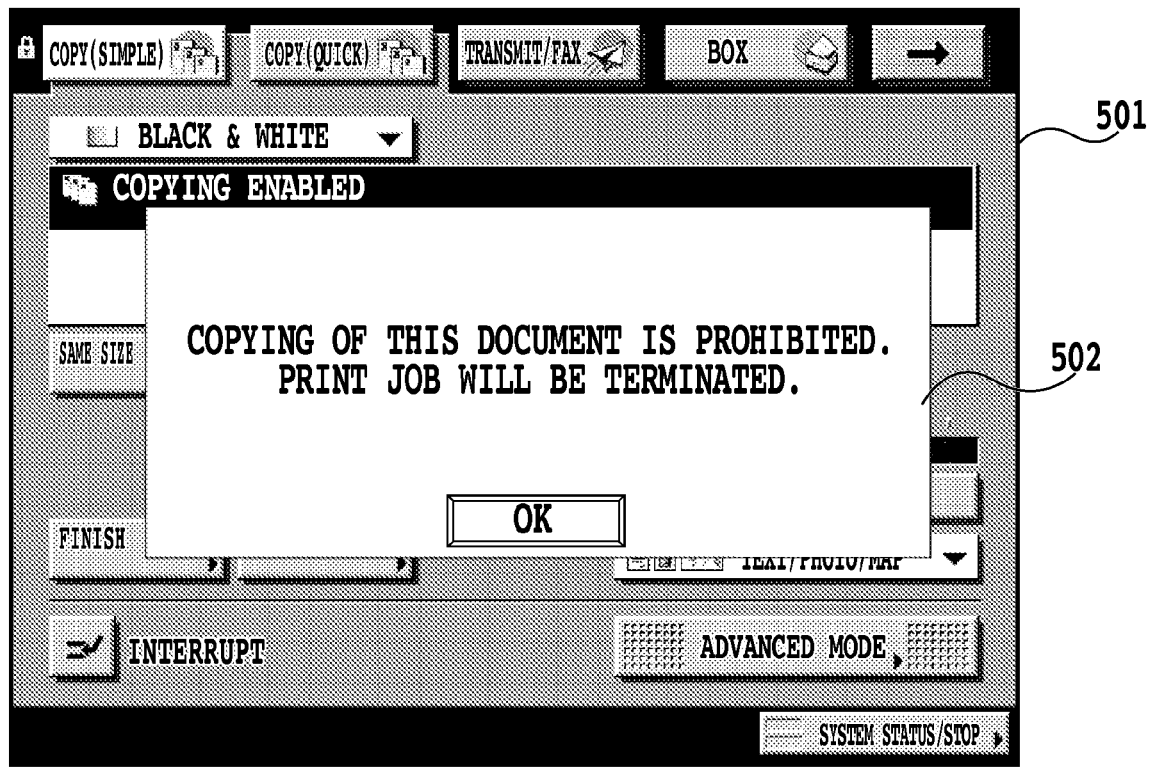
FIG. 5 is a diagram showing an example of a screen upon termination of a copy operation by an image forming apparatus according to the first embodiment of the present invention.
Figure 6:
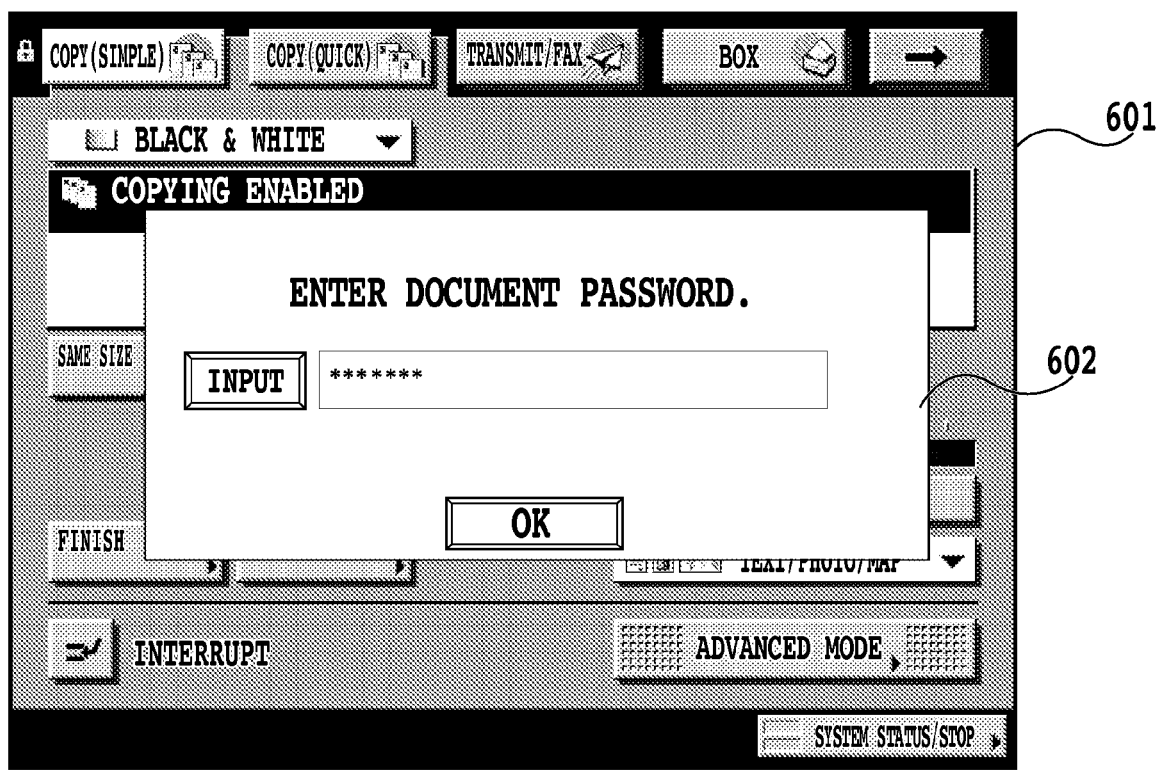
FIG. 6 is a diagram showing an example of a screen upon interruption of a copy operation by an image forming apparatus according to the first embodiment of the present invention.

FIGS. 5 and 6 respectively show display examples of screens when an image forming apparatus detects that copy restricting information is included in an original and terminates or interrupts the copy operation. In particular, FIG. 5 shows a screen example upon termination of a copy operation by the image forming apparatus in the case where copy restricting information to the effect of "prohibit copying" among the three copy prohibition settings described with reference to FIG. 3 is embedded in an original. In FIG. 5, reference numeral 501 denotes an operating screen on which a message to the effect that the copy operation is to be terminated is displayed by a message dialog 502.

FIG. 6 shows a screen example of a screen display upon interruption of a copy operation by the image forming apparatus in the case where copy restricting information to the effect of "set copy enabled condition" among the three copy prohibition settings described with reference to FIG. 3 is embedded in an original. In FIG. 6, reference numeral 601 denotes an operation screen on which is displayed an authentication dialog 602 for prompting input of a password. When the user inputs a password using a software keyboard, an IC card or the like, not shown, the image forming apparatus determines whether a password included in the background image of the original is consistent with the inputted password. If consistent, the image forming apparatus closes the authentication dialog 602 and continues the copy operation. On the other hand, if the password input is unsuccessful, the copy operation is terminated.

<Configuration of Client PC>

Figure 7:
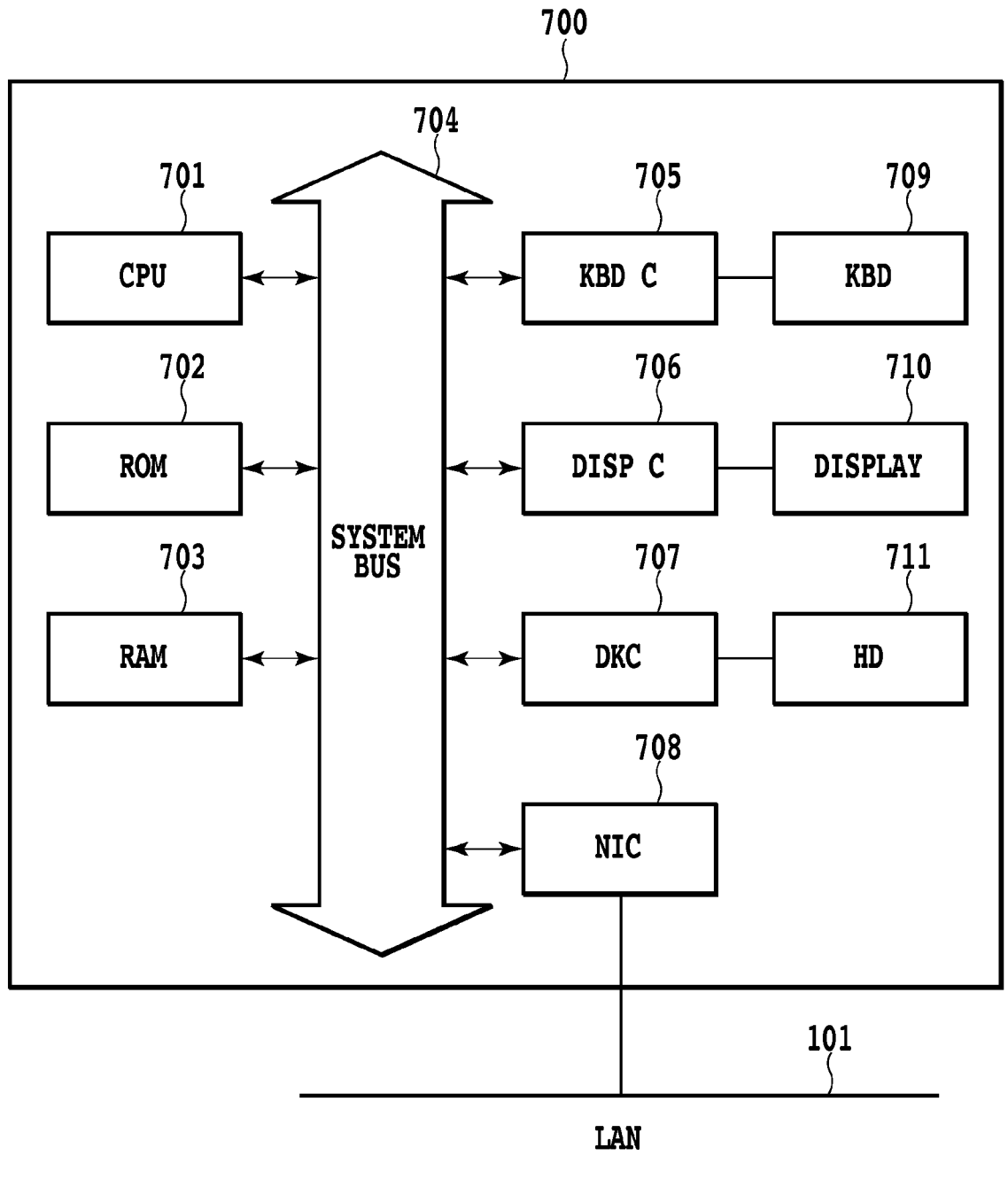
FIG. 7 is a block diagram showing an internal configuration of a client PC according to the first embodiment of the present invention.

FIG. 7 is a block diagram showing an example of an internal configuration of the client PC 111 or 112, or the print server 121.

In FIG. 7, reference numeral 700 denotes a PC in its entirety. The PC 700 includes a CPU 701 that executes software stored in a ROM 702 or a large-scale storage device 711 such as a hard disk. The CPU 701 comprehensively controls the respective devices connected to a system bus 704.

Reference numeral 703 denotes a RAM that functions as a main memory, a work area, and the like of the CPU 701. Reference numeral 705 denotes a keyboard controller (KBDC) which controls instruction input from a keyboard (KBD) 709 provided at the PC. Reference numeral 706 denotes a display controller (DISPC) which controls display on a display module (DISPLAY) 710 constituted by, for example, a liquid crystal display.

Reference numeral 707 denotes a disk controller (DKC) which controls a hard disk (HDD) 711 that is a mass storage device. Reference numeral 708 denotes a network interface card (NIC) which bi-directionally exchanges data with other devices via the LAN 101.

<Exterior Appearance of Image Forming Apparatus>

Figure 4:
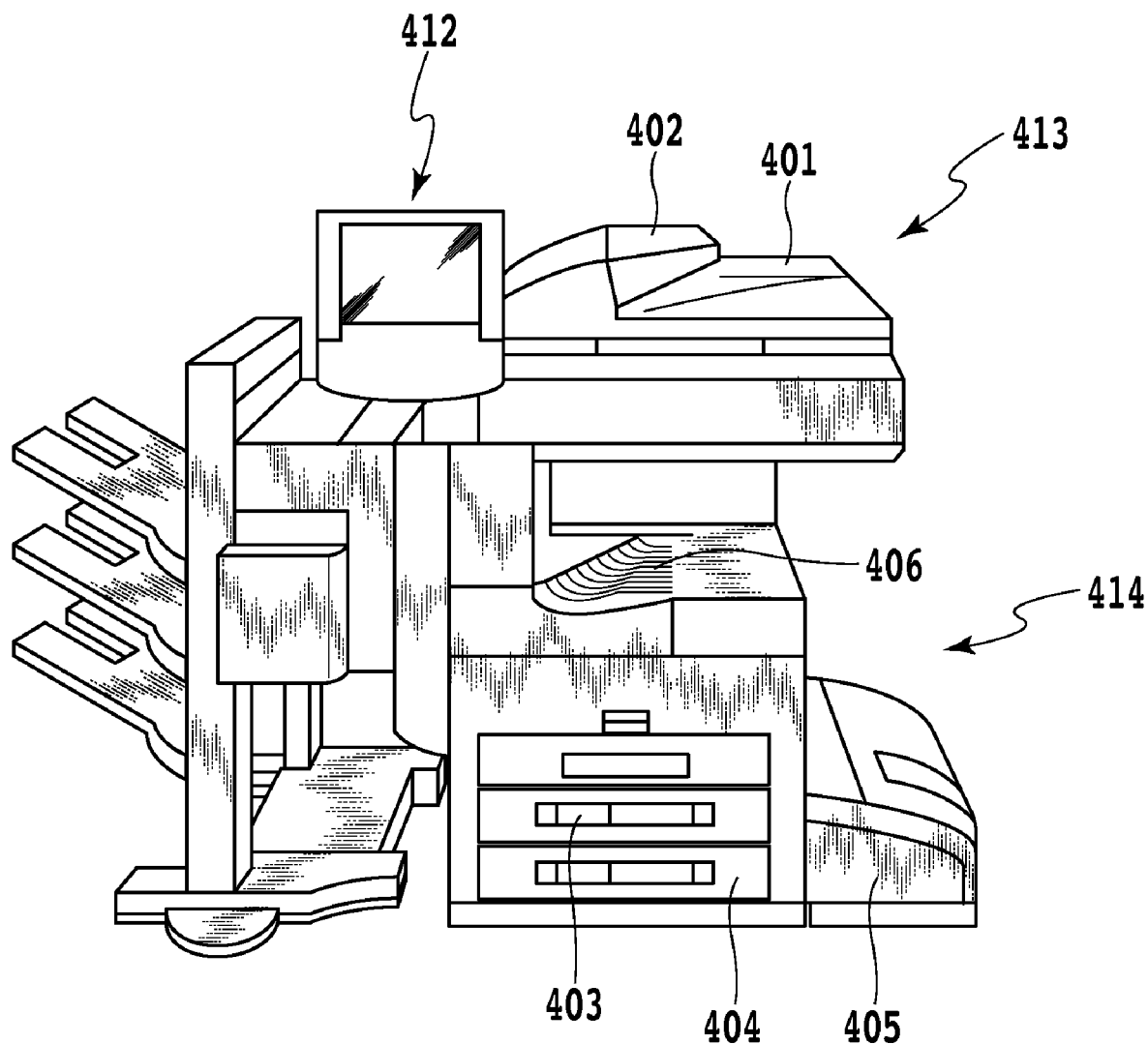
FIG. 4 is an exterior view of an image forming apparatus according to the first embodiment of the present invention.

FIG. 4 is an exterior view of the image forming apparatus 131 or 132.

A scanner unit 413 converts image information into an electric signal by inputting reflected light obtained by exposure-scanning an image on an original into a photosensitive element such as a CCD (Charge Coupled Device) or a CIS (Contact Image Sensor). The scanner unit 413 further converts the electric signal into a luminance signal made up of the respective colors of R, G and B, and outputs the luminance signal as image data to a controller 411, not shown in FIG. 4, which will be described later with reference to FIG. 8.

The original is set in a tray 402 of an original feeder 401. When the user instructs reading to be started from the operating unit 412, an original read instruction is issued from the controller 411 to the scanner unit 413. Upon receiving the instruction, the scanner unit 413 feeds one original sheet at a time from the tray 402 of the original feeder 401 to perform a read operation of the original. Instead of an automatic feed system by the original feeder 401, the original read method may involve scanning the original by placing the same on a glass surface, not shown, and moving an exposure unit, not shown.

A printer unit 414 is an image forming device that reproduces image data received from the controller 411 onto a printable medium such as paper. While the present embodiment assumes that the image forming system is an electrophotographic system that uses a photoreceptive drum or a photoreceptive belt, the present invention is not limited thereto. For example, an inkjet system in which ink is discharged from a minute nozzle array to print on paper is also applicable. In addition, the printer unit 414 is provided with a plurality of paper cassettes 403, 404 and 405 which enable selection of different paper sizes or different paper orientations. After printing, paper is ejected to a catch tray 406.

<Detailed Description of Controller>

Figure 8:
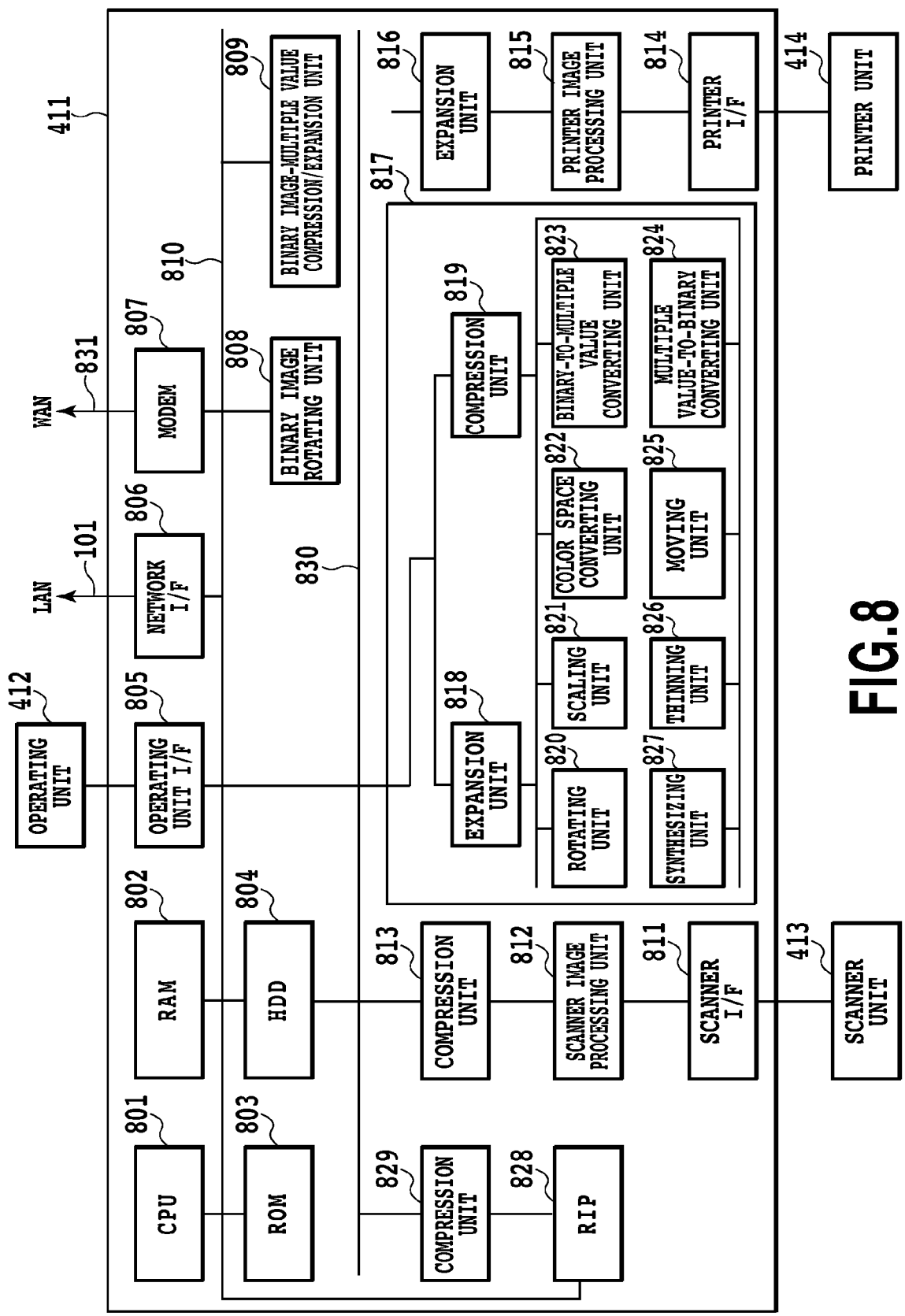
FIG. 8 is a block diagram showing an internal configuration of an image forming apparatus according to the first embodiment of the present invention.

FIG. 8 is a block diagram for describing the controller 411 of the image forming apparatus 131 or 132 in greater detail.

The controller 411 is electrically connected to the scanner unit 413 and the printer unit 414, and is also connected to the print server 121, external devices and the like via the LAN 101 or a WAN 831. This enables input and output of image data and device information.

A CPU 801 comprehensively controls access to various devices currently in connection, based on a control program or the like stored in a ROM 803, and also comprehensively controls various processing performed within the controller. A RAM 802 is a system work memory for the CPU 801 to operate and is also a memory for temporarily storing image data. The RAM 802 is constituted by a non-volatile SRAM that retains stored contents even after power is turned off and a DRAM whose stored contents are erased after power is turned off. The ROM 803 stores a boot program for the apparatus, and the like. An HDD 804 is a hard disk drive that is capable of storing system software and image data.

An operating unit I/F 805 is an interface unit for connecting a system bus 810 and the operating unit 412. The operating unit I/F 805 receives image data to be displayed on the operating unit 412 from the system bus 810 and outputs the image data to the operating unit 412, and outputs information inputted via the operating unit 412 to the system bus 810.

A network I/F 806 is connected to the LAN 101 and the system bus 810 and performs information input/output. A modem 807 is connected to the WAN 831 and the system bus 810 and performs information input/output. A binary image rotating unit 808 converts the direction of image data prior to transmission. A binary image compression/expansion unit 809 converts the resolution of image data prior to transmission to a predetermined resolution or to a resolution in accordance with the capability of another party. Compression and expansion are performed using schemes such as JBIG, MMR, MR, and MH. An image bus 830 is a transmission channel for exchanging image data and is constituted by a PCI bus or an IEEE 1394 bus.

A scanner image processing unit 812 performs correction, processing, and editing on image data received from the scanner unit 413 via the scanner I/F 811. The scanner image processing unit 812 determines whether the received image data is a color original or a black and white original, a text original or a photograph original, or the like. The scanner image processing unit 812 attaches the determination result to the image data. Such attached information shall be referred to as attribute data. Details of processing performed at the scanner image processing unit 812 will be described later.

Figure 9:
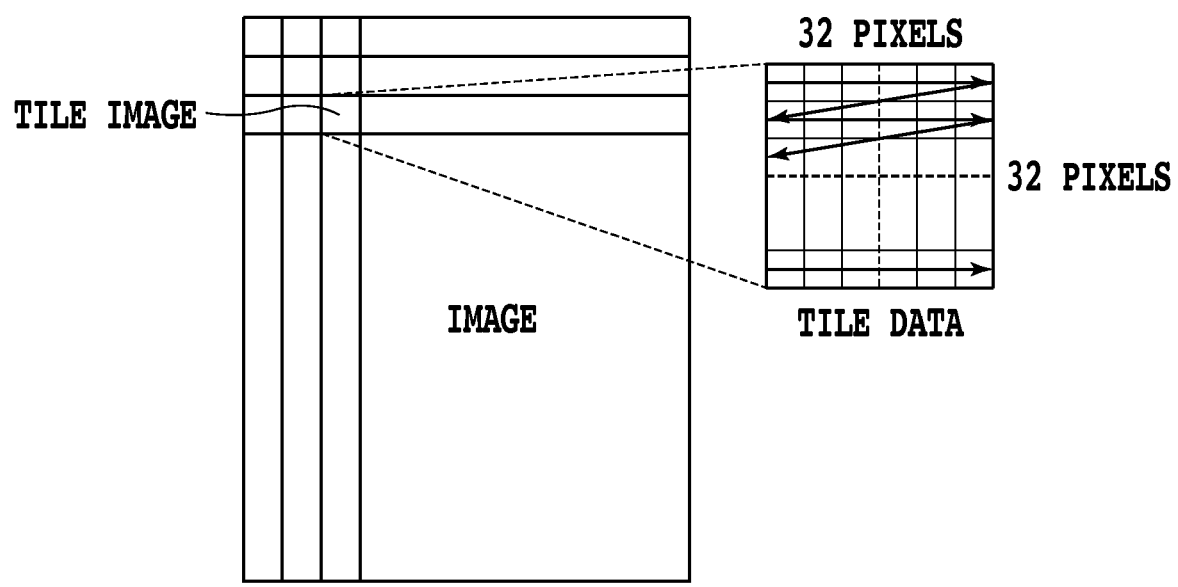
FIG. 9 is a conceptual diagram showing tile data according to the first embodiment of the present invention.

A compression unit 813 receives image data and divides the image data into units of blocks consisting of 32 pixels×32 pixels. Image data consisting of 32 pixels×32 pixels shall be referred to as tile data. FIG. 9 is a conceptual representation of such tile data. An area in an original document (e.g. paper medium prior to reading) corresponding to tile data shall be referred to as a tile image. Average luminance information of the 32×32 pixel block that is tile data and coordinate information of the image on the original are added as header information to the tile data. Furthermore, the compression unit 813 compresses image data consisting of a plurality of units of tile data. An expansion unit 816 expands image data consisting of a plurality of units of tile data, and subsequently raster-expands and sends the image data to a printer image processing unit 815.

The printer image processing unit 815 receives image data sent from the expansion unit 816, and performs image processing on the image data while referencing attribute data attached to the image data. The image data after image processing is outputted to the printer unit 414 via the printer I/F 814. Details of processing performed at the printer image processing unit 815 will be described later.

An image converting unit 817 performs predetermined conversion processing on image data. The image converting unit 817 is constituted by processing units arranged as described below.

An expansion unit 818 expands received image data. A compression unit 819 compresses received image data. A rotating unit 820 rotates received image data. A scaling unit 821 performs resolution conversion processing (e.g., from 600 dpi to 200 dpi) on received image data.

A color space converting unit 822 converts the color space of received image data. The color space converting unit 822 is capable of performing known background removal processing using a predetermined matrix or table, known Log conversion processing (RGB to CMY), and known output color correction processing (CMY to CMYK).

A binary-to-multiple value converting unit 823 converts received 2-tone image data into 256-tone image data. Conversely, a multiple value-to-binary converting unit 824 converts received 256-tone image data into 2-tone image data using a known method such as error diffusion processing.

A synthesizing unit 827 synthesizes two units of received image data to generate one unit of image data. When synthesizing two units of image data, a method in which an average of luminance values of pixels in a synthesis object is used as a synthesized luminance value or a method in which a luminance value of a pixel having a higher luminance level is used as a post-synthesis pixel luminance value is applied. In addition, a method in which a darker pixel is used as a post-synthesis pixel can also be utilized. Furthermore, methods that determine a post-synthesis luminance value by a logical OR operation, a logical AND operation, an exclusive-OR operation or the like of pixels in a synthesis object can also be applied. All of such synthesis methods are known methods.

A thinning unit 826 performs resolution conversion by thinning pixels of received image data to generate image data whose resolution is ½, ¼, ⅛ or the like of the original resolution. A moving unit 825 attaches a margin to received image data or deletes a margin therefrom.

An RIP 828 receives intermediate data generated from PDL code data transmitted from the print server 121 or the like to generate bitmap data (multiple value). A compression unit 829 compresses bitmap data generated by the RIP 828.

<Detailed Description of Scanner Image Processing Unit 812>

Figure 10:
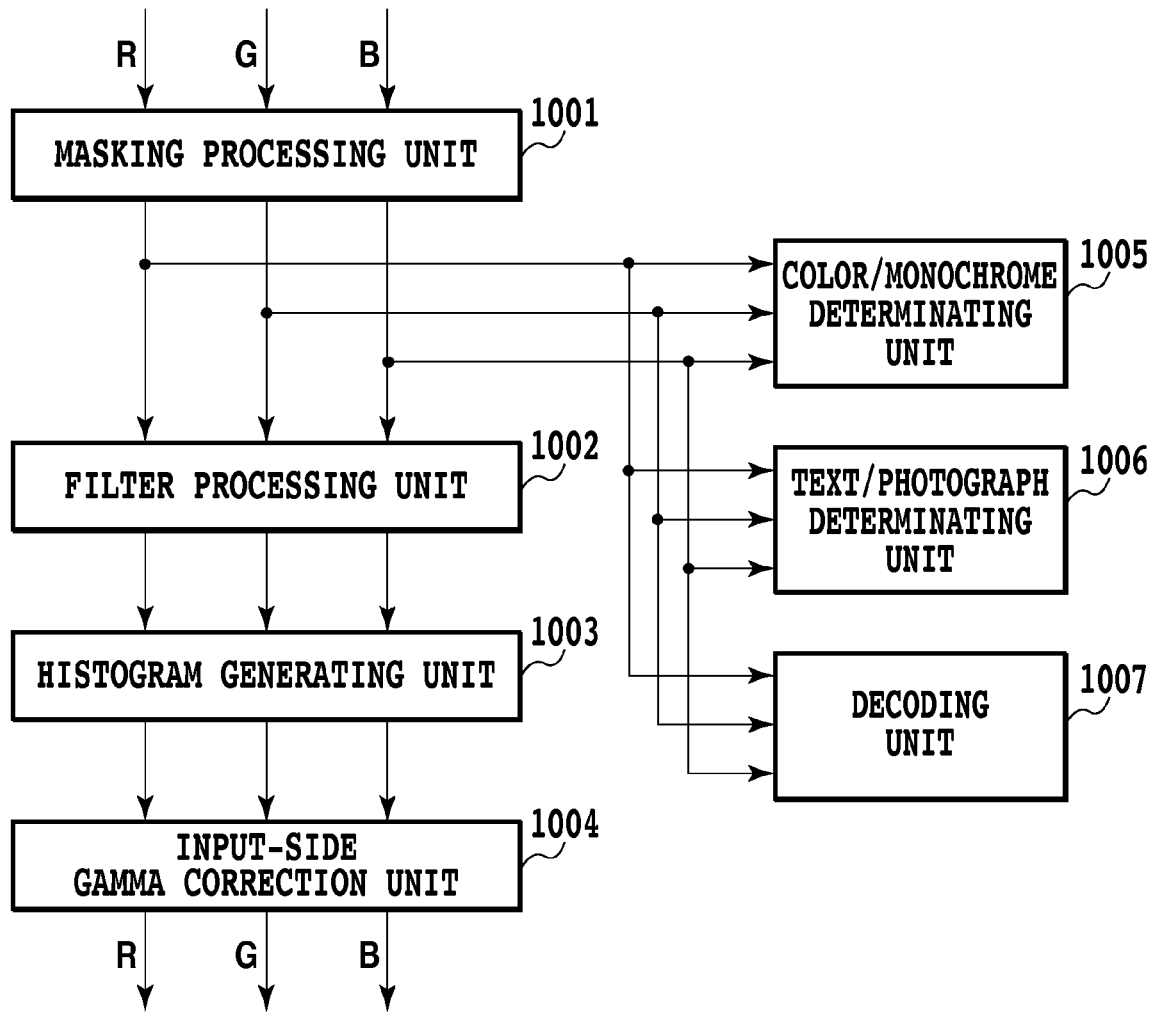
FIG. 10 is a block diagram showing an internal configuration of a scanner image processing unit according to the first embodiment of the present invention.

FIG. 10 shows an internal configuration of the scanner image processing unit 812.

The scanner image processing unit 812 receives image data consisting of a luminance signal having 8 bits each of R, G and B. The luminance signal is converted by a masking processing unit 1001 into a standard luminance signal that is independent of a filter color of a photosensitive element such as a CCD.

A filter processing unit 1002 arbitrarily corrects a spatial frequency of received image data. The processing unit performs arithmetic processing using, for example, a predetermined 7×7 matrix on received image data. With a copier or a multifunctional printer, a user is able to select a text mode, a photograph mode or a text/photograph mode as a copy mode by operating the operating unit 412. When the text mode is selected by the user, the filter processing unit 1002 applies a text filter to the entire image data. In addition, when the photograph mode is selected, the filter processing unit 1002 applies a photograph filter to the entire image data. Furthermore, when the text/photograph mode is selected, the filter processing unit 1002 adaptively switches between filters for each pixel in accordance with a text/photograph determination signal (a part of attribute data) to be described later. In other words, whether the photograph filter or the text filter is to be applied is determined per each pixel. A coefficient that causes smoothing to be applied only on a high frequency component is set for the photograph filter. This is done in order to make image roughness less perceptible. In addition, a coefficient that causes edge reinforcement to be performed relatively strongly is set for the text filter. This is done to ensure sharpness of characters.

A histogram generating unit 1003 samples luminance data of each pixel representing received image data. To describe this in greater detail, luminance data within a rectangular area enclosed by lines extending from respectively specified starting points in a main scanning direction and a vertical scanning direction to ending points are sampled at a certain pitch in the main scanning direction and the longitudinal scanning direction. Histogram data is then generated based on the sampling result. The generated histogram data is used to estimate a background level when performing background removal processing. An input-side gamma correction unit 1004 performs conversion into luminance data having non-linear characteristics using a predetermined table or the like.

A color/monochrome determining unit 1005 determines whether each pixel representing received image data is colored or not, and attaches the determination result to image data as a color/monochrome determination signal (a part of attribute data).

A text/photograph determining unit 1006 determines whether each pixel representing image data is a pixel making up a character, a pixel making up a halftone dot, a pixel making up a character in a halftone dot, or a pixel making up a solid image based on the pixel value of each pixel and the pixel values of pixels surrounding each pixel. A pixel that is none of the aforementioned is a pixel making up a white area. The text/photograph determining unit 1006 then attaches the determination result to the image data as a text/photograph determination signal (a part of attribute data).

A decoding unit 1007 detects a presence of encoded image data if such exists in image data outputted from the masking processing unit 1001. The decoding unit 1007 then decodes the detected encoded image data and retrieves information.
<Detailed Description of Printer Image Processing Unit 815>

Figure 11:
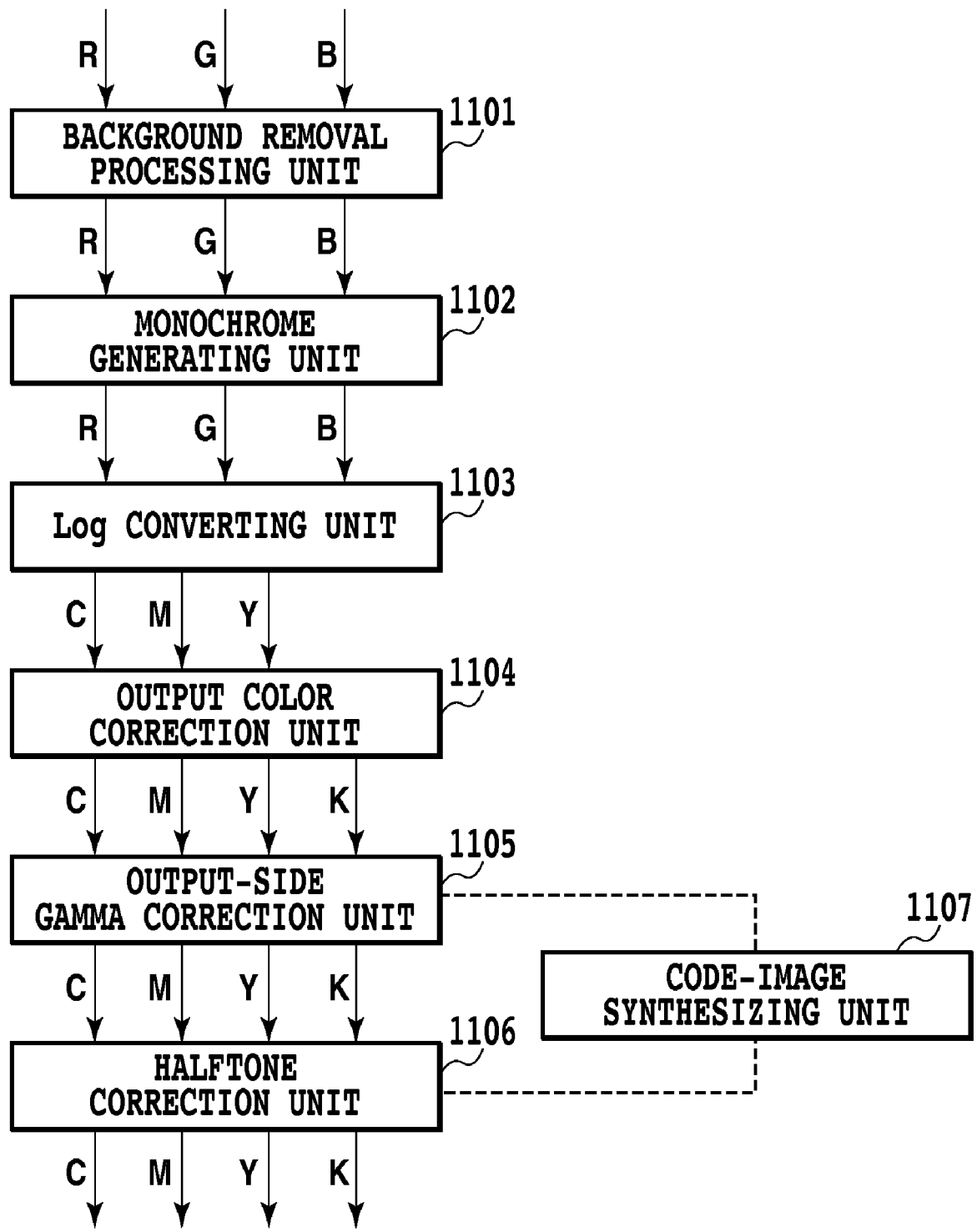
FIG. 11 is a flowchart showing processing performed by a printer image processing unit according to the first embodiment of the present invention.

FIG. 11 shows a flow of processing performed at the printer image processing unit 815.

A background removal processing unit 1101 removes a background color of image data using a histogram generated by the scanner image processing unit 812. A monochrome generating unit 1102 converts color data into monochrome data. A Log converting unit 1103 performs luminance density conversion. For example, the Log converting unit 1103 converts image data inputted as RGB into CMY image data. An output color correction unit 1104 performs output color correction. For example, the output color correction unit converts image data inputted as CMY into CMYK image data using a predetermined table or matrix. An output-side gamma correction unit 1105 performs correction so that a signal value inputted to the output-side gamma correction unit 1105 becomes proportional to a reflected density value after copy output. An encoded image synthesizing unit 1107 synthesizes background image data generated by a meta-information image generating unit, to be described later, with (original) image data. A halftone correction unit 1106 performs halftone processing in accordance with the number of tones of the printer unit that performs output. For example, the halftone correction unit 1106 performs binarization or 32-bit digitization on received high tone image data.

The respective processing units of the scanner image processing unit 812 and the printer image processing unit 815 are also capable of outputting received image data without performing respective processing thereon. Having data passed through a processing unit without subjecting the data to processing as described above is also referred to as "passing data through a processing unit".
<Generation Operation of Print Output Including Copy Restricting Information or Tracking Information>

The manner in which a print output including additional security information is generated by the configuration shown in FIG. 1 will now be described in greater detail with reference to FIGS. 12 and 13.

There are two methods of generating a background image, namely, a method in which a background image of a print output is generated at the client PC-side and a method in which a background image of a print output is generated at the image forming apparatus-side. Hereinafter, the former method will be described with reference to FIG. 12 and the latter method will be described with reference to FIG. 13.

Figure 12:
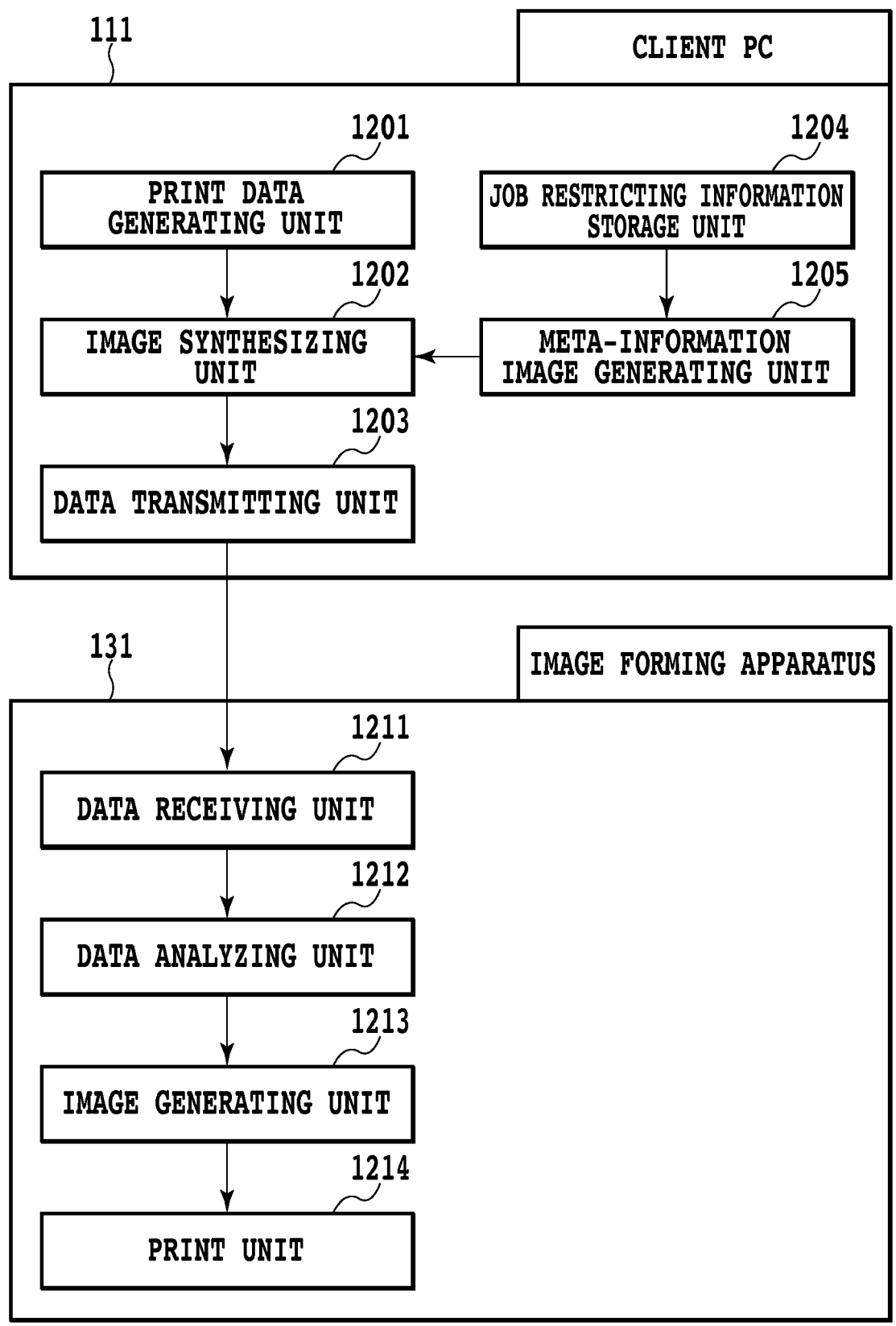
FIG. 12 is a data flowchart describing generation of an image including copy restricting information according to the first embodiment of the present invention.
Figure 13:
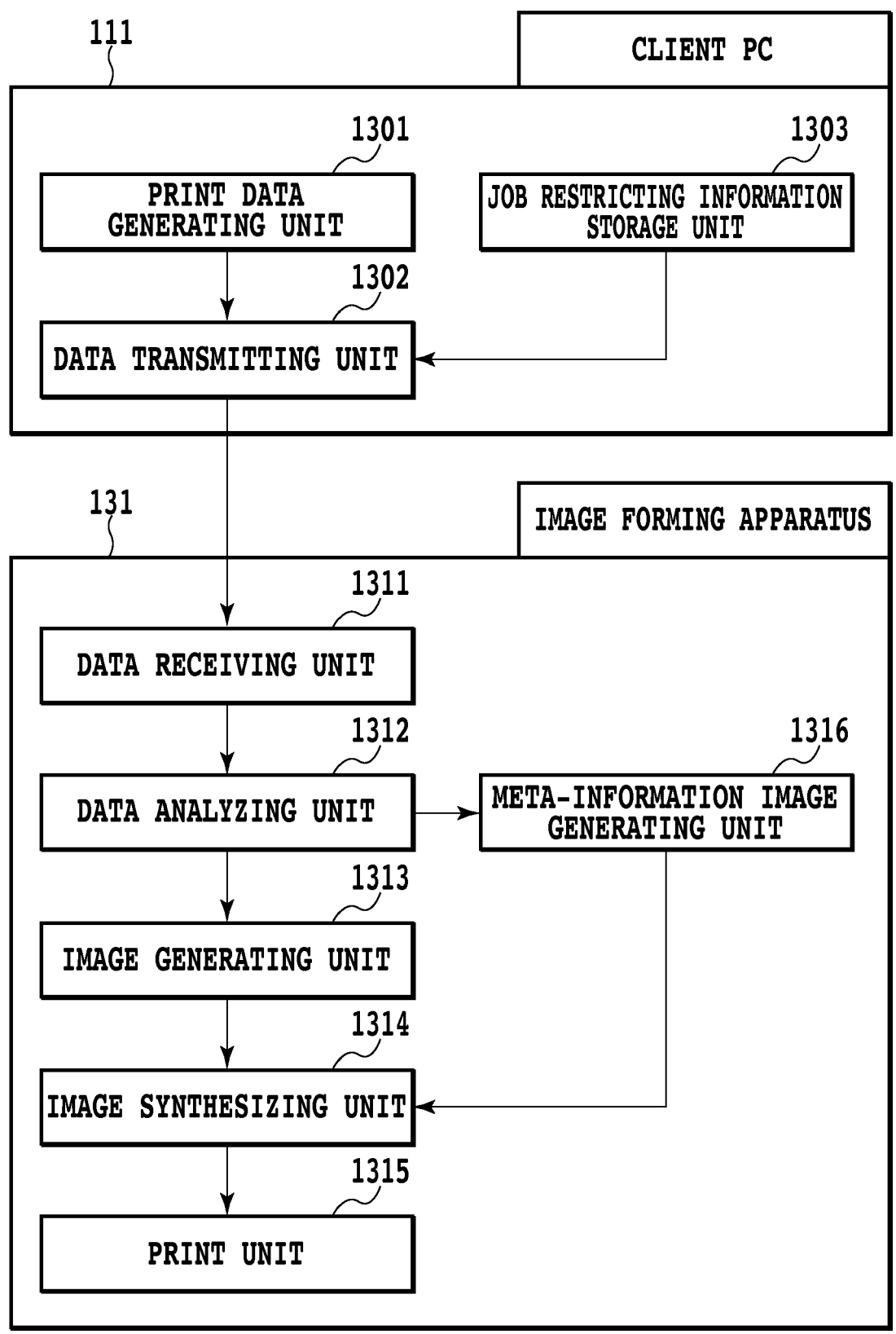
FIG. 13 is a data flowchart describing generation of an image including copy restricting information according to the first embodiment of the present invention.

FIGS. 12 and 13 have been drawn as logical configuration diagrams representing flows of data processing at the client PC and the image forming apparatus. As such, the respective blocks thereof are not necessarily in one-to-one correspondence with physical components of the client PC or the image forming apparatus. In the following description, determination and execution are performed by the CPU 701.

Generating a background image, encoding additional security information, for a print output at the client PC-side FIG. 12 is a data flow diagram showing generation of a print output when adopting an implementation method in which a background image of a print output is generated at the client PC-side.

In FIG. 12, the upper half of the diagram represents the client PC 111. At the client PC 111, a print instruction operation performed by the user activates a print data generating unit 1201. The print data generating unit 1201 is realized by a print subsystem in which a printer driver and an OS operate in cooperation with each other. The print data generating unit 1201 converts a document for which the user has specified printing to a collection of drawing instructions to the image forming apparatus. More specifically, the conversion is realized by generating, for example, a PDL (Page Description Language). The print data generating unit 1201 sends generated print data to an image synthesizing unit 1202.

In addition, a job restricting information storage unit 1204 sends job restricting information retained as a result of the user having operated the aforementioned security setting dialog shown in FIG. 3 described above to a meta-information image generating unit 1205.

The meta-information image generating unit 1205 generates a background image including copy restricting information or tracking information based on job restricting information received from the job restricting information storage unit 1204. Methods of creating the background image include a method using an LVBC (Low Visibility Barcode). An LVBC will be described later. The meta-information image generating unit 1205 sends a generated background image to the image synthesizing unit 1202.

The image synthesizing unit 1202 synthesizes print data received from the print data generating unit 1201 with the background image received from the meta-information image generating unit 1205, and creates an instruction to the image forming apparatus such that the background image is included in each page of the print data. More specifically, applicable methods include embedding the background image as overlay form information into PDL. The image synthesizing unit 1202 sends the synthesized print data to the data transmitting unit 1203.

The data transmitting unit 1203 controls the network interface (NIC) 708 (see FIG. 7) to send the synthesized print data to the print server 121 (see FIG. 1) or to the image forming apparatus 131 or 132 (see FIG. 1). Since FIG. 12 illustrates a logical flow of data, even when data flows via the print server 121, the print server 121 has been omitted from FIG. 12.

Next, operations at the image forming apparatus-side represented by the lower half of FIG. 12 will be described.

A data receiving unit 1211 awaits data from the LAN 101 (see e.g. FIG. 8) by controlling the network interface 806 (see FIG. 8). The data receiving unit 1211 detects that data has been sent from another node on the LAN, and delivers the received data to a subsystem appropriate for the type of data. For example, when the communication scheme is TCP/IP, data type identification is generally performed according to port numbers. Generally used port numbers include No. 515 used by lpr (Line PRinter daemon) and No. 9100 used by raw. In the present embodiment, the received data is print data including a print instruction for the image forming apparatus. It is assumed that, upon identifying that the received data is print data, the data receiving unit 1211 delivers the data to a data analyzing unit 1212.

The data analyzing unit 1212 retrieves a rendering instruction (PDL) from the data received from the data receiving unit 1211, interprets the rendering instruction, and generates intermediate data to be internally used by the image forming apparatus. The data analyzing unit 1212 then sequentially sends generated intermediate data to an image generating unit 1213.

The image generating unit 1213 controls the RIP 828 (see FIG. 8) to convert intermediate data received from the data analyzing unit 1212 to a bitmap image. The image generating unit 1213 compresses the bitmap image using the compression unit 829 (see FIG. 8) and then sequentially sends the compressed bitmap image to a print unit 1214.

The print unit 1214 controls the expansion unit 816 (see FIG. 8), the printer image processing unit 815 (see FIG. 8), the printer I/F 814 (see FIG. 8) and the printer unit 414 (see FIG. 4) to print the bitmap image received from the image generating unit 1213 on a paper medium.

Generating a background image, encoding additional security information, for a print output at the image forming apparatus-side FIG. 13 is a data flow diagram showing generation of a print output when adopting an implementation method in which a background image of a print output is generated at the image forming apparatus-side.

In FIG. 13, the upper half of the diagram represents the client PC 111. At the client PC 111, a print instruction operation performed by the user activates a print data generating unit 1301. Since the operation of the print data generating unit 1301 is the same as that of the print data generating unit 1201 shown in FIG. 12, further description thereof will be omitted. The print data generating unit 1301 sends generated print data to a data transmitting unit 1302.

In addition, a job restricting information storage unit 1303 sends job restricting information, retained as a result of the user having operated the security setting dialog shown in FIG. 3, to the data transmitting unit 1302.

The data transmitting unit 1302 unites the print data received from the print data generating unit 1301 and the job restricting information received from the job restricting information storage unit 1303 and configures the same as print instruction data to the image forming apparatus. Furthermore, the data transmitting unit 1302 controls the network interface (NIC) 708 (see FIG. 7) to send the print instruction data configured as described above to the print server 121 (see FIG. 1) or to the image forming apparatus 131 or 132 (see FIG. 1). Since FIG. 13 describes a logical flow of data, even when data flows via the print server 121, the print server 121 has been omitted in FIG. 13.

Next, operations at the image forming apparatus-side represented by the lower half of FIG. 13 will be described.

Since the operation of a data receiving unit 1311 is the same as that of the data receiving unit 1211 shown in FIG. 12, further description thereof will be omitted.

A data analyzing unit 1312 respectively retrieves the aforementioned job restricting information and the rendering instruction (PDL) from data received from the data receiving unit 1311. The data analyzing unit 1312 then sends the retrieved job restricting information to a meta-information image generating unit 1316.

Meanwhile, since an operation for processing the rendering instruction retrieved by the data analyzing unit 1312 is the same as the operation of the data analyzing unit 1212 shown in FIG. 12, further description thereof will be omitted.

Since an image generating unit 1313 is the same as the image generating unit 1213 shown in FIG. 12, a description thereof will be omitted. However, the image generating unit 1313 sends a generated bitmap to an image synthesizing unit 1314.

The meta-information image generating unit 1316 interprets job restricting information received from the data analyzing unit 1312 and generates a background image in accordance with the job restricting information using a technique for embedding information into an image (e.g., an LVBC). The meta-information image generating unit 1316 then sends the generated background image to the image synthesizing unit 1314.

The image synthesizing unit 1314 synthesizes the bitmap received from the image generating unit 1313 with a background image received from the meta-information image generating unit 1316 and sends a bitmap that is the synthesis result to a print unit 1315.

Since the operation of the print unit 1315 is the same as that of the print unit 1214 shown in FIG. 12, a description thereof will be omitted.

<Detailed Description of Copy Restricting Operation of an Image Forming Apparatus>

Figure 14:
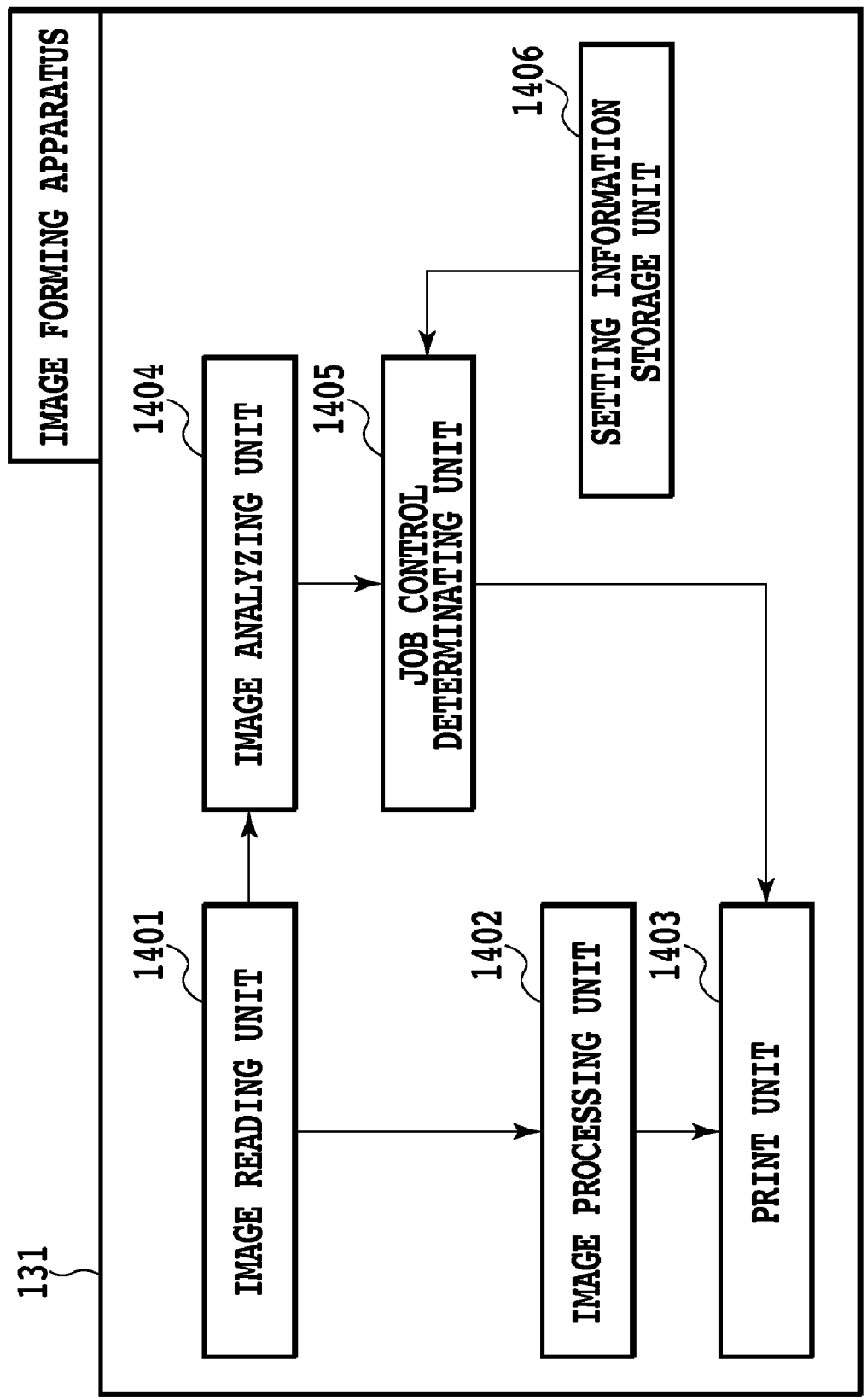
FIG. 14 is a block diagram describing a copy restricting operation of an image forming apparatus according to the first embodiment of the present invention.

FIG. 14 is a block diagram describing a copy restricting operation of an image forming apparatus. In this case, it is assumed that a copy restriction condition that is a condition for terminating a copy operation (time and date or user authentication information) or the like has been preset and retained in a setting information storage unit 1406.

When the user places an original including copy restricting information on the scanner unit 413 and operates the operating unit 412 to instruct copying to be started, an image reading unit 1401 is activated to start a copy operation. The image reading unit 1401 controls the scanner unit 413 (see FIG. 4), the scanner I/F 811 (see FIG. 8), the scanner image processing unit 812 (see FIG. 8) and the compression unit 813 (see FIG. 8) to read the original image, and sends the image data to an image processing unit 1402 as well as to an image analyzing unit 1404.

The image analyzing unit 1404 controls the decoding unit 1007 (see FIG. 10) to retrieve copy restricting information included in the image received from the image reading unit 1401. The image analyzing unit 1404 sends the retrieved copy restricting information to a job control determining unit 1405.

The job control determining unit 1405 compares the copy restricting information received from the image analyzing unit 1404 with the copy restricting condition retained by the setting information storage unit 1406 to determine whether or not the copy operation should be terminated.

Let us assume that, for example, the button 302 shown in FIG. 3 has been set to "set copy enabled condition". When a password character string inputted to the text box 303 is consistent with a password character string inputted to the dialog 602 shown in FIG. 6, printing is continued. In this case, the background image originally included in the original is to be copied, as-is.

In the case where the job control determining unit 1405 determines that the copy operation should be terminated (i.e. when the two passwords described above are not consistent), the job control determining unit 1405 issues an instruction to terminate the copy operation to the print unit 1403. The job control determining unit 1405 then controls the operating unit I/F 805 (see FIG. 8) to display the message described with reference to FIG. 5 on the operating unit 412.

While the print unit 1403 generates a print output by printing image data received from the image processing unit 1402 on paper, the print unit 1403 terminates a print operation even when a job is in progress upon receiving an instruction for operation termination from the job control determining unit 1405.

<Embedding Security-Related Information During a Copy Operation of the Image Forming Apparatus>

The description regarding FIG. 13 was premised on the user issuing a file print instruction from the client PC when the image forming apparatus generates a print output including copy restricting information. However, a print instruction from the client PC need not be the only way to include copy restricting information in the background of a print output. The image forming apparatus can be configured so that the background of a print output includes copy restricting information when copying a paper original.

In this case, the image reading unit 1401 performs the role of the client PC 111 shown in FIG. 13. In addition, the image bus 830 (see FIG. 8) inside the image forming apparatus replaces the data transmitting unit 1302 and the data receiving unit 1311, which are network interfaces, shown in FIG. 13.

<LVBC>

Next, an LVBC (Low Visibility Barcode) will be described as a preferred example of an additional security information embedding technique in accordance with the present invention.

The term "information embedding technique" as used here refers to a technique which adds and prints required encoded additional security information, in addition to an image to be printed in the first place, onto an image forming medium (hereinafter referred to as a sheet) such as paper or an OHP sheet.

An information embedding technique preferably includes one or more of the requirements listed below.

Capable of embedding data whose quantity of information is sufficient to provide tracking information and/or for implementing copy restriction if necessary Capable of subsequently extracting information, embedded using a color material (toner, ink, or the like) into a sheet, as digital information in a reliable manner Possessing a certain level of tolerance towards factors that hinder information extraction when copying an original image on a sheet, such as signal degradation or contamination due to rotation, enlargement, reduction, partial deletion, and copying of an original Possessing realtime capability enabling extraction during copying or a reduced high-speed capability in order to prevent copying of a copy restricted original The information embedding technique using an LVBC according to the present embodiment satisfies the requirements described above.

FIG. 2 is an image diagram showing an example of an original embedded with an LVBC.

Reference numeral 201 represents an entire sheet while reference numeral 202 represents an enlarged view of 201. Reference numeral 202 shows a large number of dots (e.g., reference numeral 203) seemingly embedded randomly into the original in addition to the image to be rendered in the first place. Information to be added will be embedded or encoded in these dots. The term "dot" used herein is not limited to a circular element but includes a square, rectangular, triangular, octagonal etc element.

<Two Areas>

Next, in regards to areas in which additional security information is to be embedded, a first area and a second area will be described.

FIG. 15 is a table for describing a difference in characteristics between the first area and the second area.

Additional security information is divided into two types of areas with different characteristics depending on how the information is to be used, and is embedded so as to be respectively extractable. The first area stores information requiring high-speed extraction during a copy operation by a normal scan, such as information indicating a copy restriction. Since extraction processing is invariably performed regardless of original type, a delay in the extraction processing affects the entire copy speed. Therefore, the analysis speed is required to be comparable with, for example, scan processing. On the other hand, since information needed to implement copy restriction can be minimal, the data size of additional security information to be embedded can be small.

The second area stores tracking information. Since tracking information is extracted when a manager performs analysis processing upon discovery of an information leakage, tracking information is not required for normal copy operations. As such, the entire copy speed is not necessarily affected, and a certain degree of speed degradation of the printed tracking information is permissible. Since tracking information requires that a large volume of information be embedded, data size becomes relatively large. Information to be embedded as tracking information conceivably includes: an individual name or an organization name of a user having created the relevant original; a machine number, an IP (Internet Protocol) address, a MAC (Media Access Control) address, or the like of the apparatus having performed image formation, and the like. Furthermore, information such as an installation site, a print time and date enabling a print period to be identified, a print time of day, or the like may be used as tracking information.

In an LVBC according to the present embodiment, in order to accommodate these different requirements, the first area and the second area can be mixed and embedded as additional security information. As described above, on a case by case basis, the user can select from extracting only the first area, extracting only the second area, and extracting both areas. Moreover, when extracting only the first area, analysis speed is increased so as to enable extraction processing at a speed that does not affect productivity during a copy operation.

Figure 16:
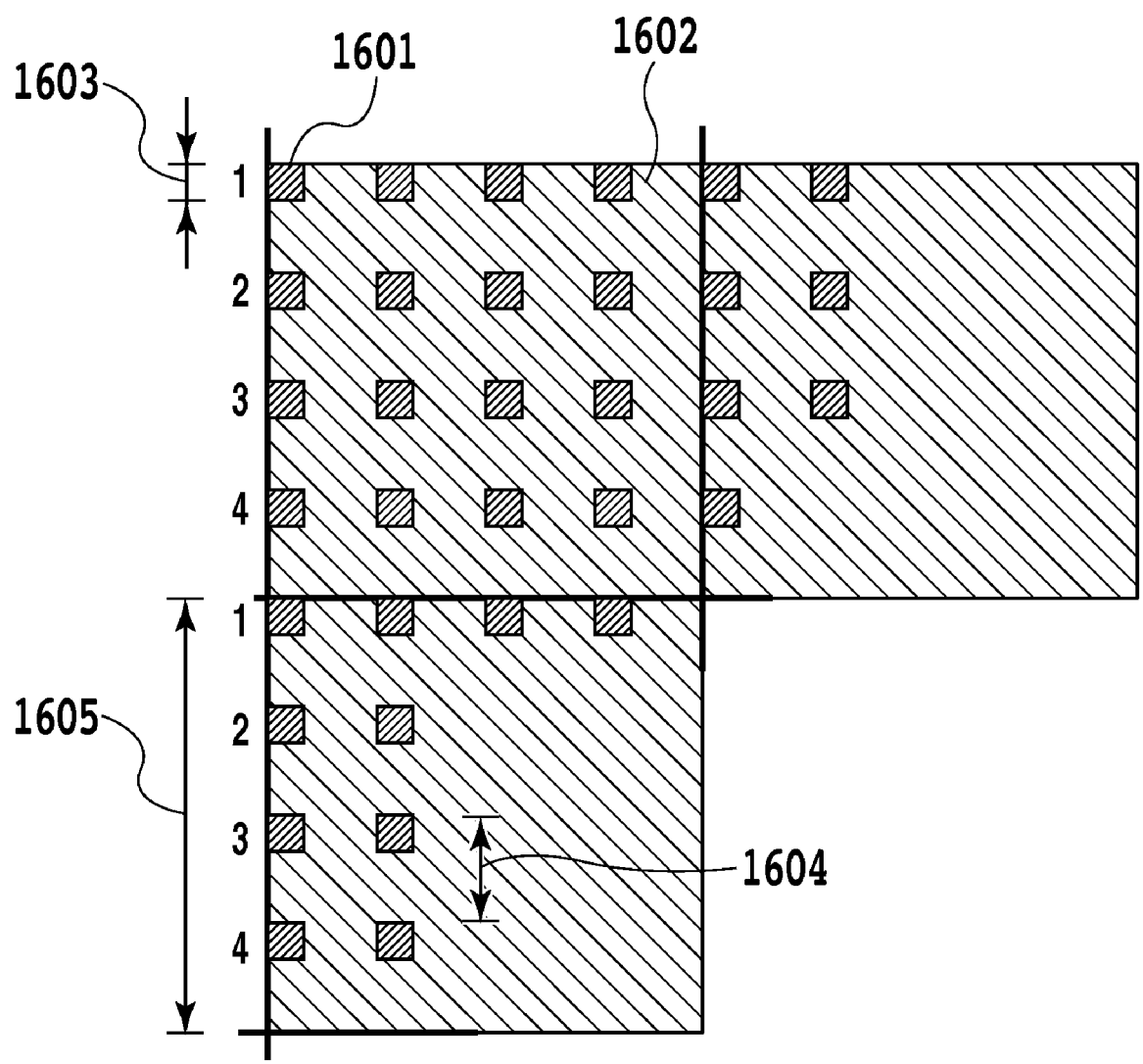
FIG. 16 is a diagram describing an arrangement of a first area and a second area when embedding information into a sheet according to the first embodiment of the present invention.

FIG. 16 is a schematic diagram showing an arrangement of the first area and the second area when embedding information into a sheet. The square area denoted by reference numeral 1601 represents the first area. Similar squares embedded in intervals all store the same data. By repetitively embedding the first area, redundancy increases to improve reliability towards noise and errors. The square area denoted by reference numeral 1602 represents the second area. Similarly, for the second area, the same squares are embedded at intervals. Information of the second area will never be written into the first area 1601, and writing into the respective areas are to be performed exclusively so there is no overlap. Reference numeral 1603 denotes a size of the first area, 1604 a repetition interval of the first area, and 1605 a size of the second area.

<LVBC Embedding Method>

Next, an LVBC embedding method will be described.

With an LVBC, in addition to the image to be printed on a sheet, a dot pattern is printed in order to embed additional security information. In FIG. 2, a dot 203 represents an example of a dot forming part of the dot pattern. Forming the dot pattern involves the steps of first forming a virtual grid of regularly spaced parallel virtual longitudinal grid lines and regularly spaced virtual longitudinal grid lines which are parallel to each other and orthogonal to the virtual lateral grid lines. Each intersection of a virtual lateral and a virtual longitudinal line forms a virtual grid point. Additional security information is inputted as binary (two-valued) data within a virtual grid of a certain size. The binary data is embedded by displacing, from a particular virtual grid point, each of the dots forming the pattern in one of eight rotational directions spaced at 45 degree intervals. These rotational directions may be considered, for convenience only, to be the compass directions of north, north east, east, south east, south, south west, west and north west, where the virtual lattice lines extend north to south and east to west.

Figure 17:
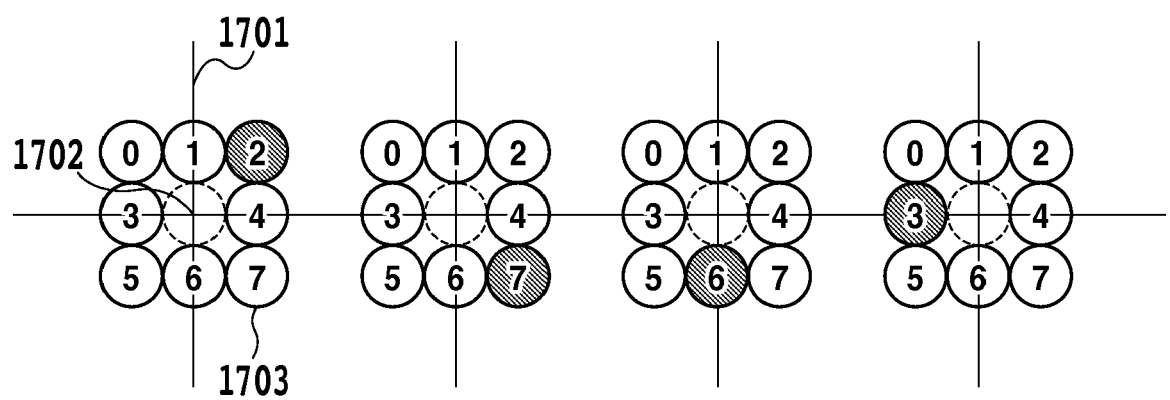
FIG. 17 is a diagram showing an example in which binary data 010111110011b is embedded as additional security information according to the first embodiment of the present invention.

FIG. 17 is a diagram showing an example in which binary data 010111110011b is embedded as additional security information. In FIG. 17, lateral/longitudinal lines 1701 represent virtual guide lines indicating the position of the grid. Reference numeral 1702 denotes a virtual grid point, at an intersection of lateral/longitudinal lines 1701. Dots are arranged displaced at particular positions situated around the virtual grid point 1702, such as at the position denoted by reference numeral 1703.

Although in an LVBC a dot will not be placed at a virtual grid point for codes other than an LVBC, as shown in the below-mentioned FIG. 24 etc., a dot may be placed at a virtual grid point.

010111110011b is decomposed into 3-bit sections of 010, 111, 110, and 011. Decimal conversion is performed on the respective 3-bit sections which are converted to 2, 7, 6 and 3. As shown in the lower diagram in FIG. 17, each dot constituting the pattern is capable of representing information by being displaced in any of eight directions of upward, downward, leftward, and rightward and the intermediate positions thereof, depending on the particular numerical value. In this case, 2, 7, 6 and 3 enable information embedding by being respectively displaced towards upper right, lower right, below and left. By repeating such processing, an LVBC becomes capable of embedding additional security information of around a maximum of 2,000 bytes into a single sheet. Furthermore, repetitively embedding dots expressing additional security information into a sheet increases redundancy and enables improvement in reliability towards false recognition with respect to an image, as well as contamination, wrinkles and partial destruction occurring in the sheet. Details of LVBC analysis shall be provided in "LVBC analysis method" below.

Analyzing an LVBC requires that the pattern position be accurately studied. In addition, dot displacement desirably occurs in the eight directions from the virtual grid points at equal probability. However, there are cases where the data to be embedded requires that specific data such as 0 be embedded many times, creating a possibility that equal probability may not be realized. In light of this, the present embodiment is arranged so as to perform scrambling with reversibility on information to be embedded (for example, common key cryptographic processing using a fixed key) and to perform embedding after randomizing dot displacement. The additional security information is generated at the meta-information image generating unit 1316. Since LVBC embedding is a digital to analogue (DA) conversion for recording additional security information that is digital data onto a sheet as analogue data, LVBC embedding can be realized by a relatively simple mechanism.

Embedding of the two areas described earlier is performed by applying the embedding method described above. The first area 1601 and the second area 1602 shown in FIG. 16 are to be synthesized when configuring data to be embedded. Since the synthesis result is treated as a single unit of embedding data, as shown in FIG. 17, there is no difference in the sense that embedding is performed after conversion into displacements of individual dots. Enlarging the two areas shown in FIG. 16 to show units of dots reveal that information is embedded by the displacement of each dot, as shown in FIG. 17. The additional security information dot pattern is synthesized by the image synthesizing unit 1314 and printed by the print unit 1315.

<LVBC Analysis Method>

Next, an LVBC analysis method will be described.

Figure 18:
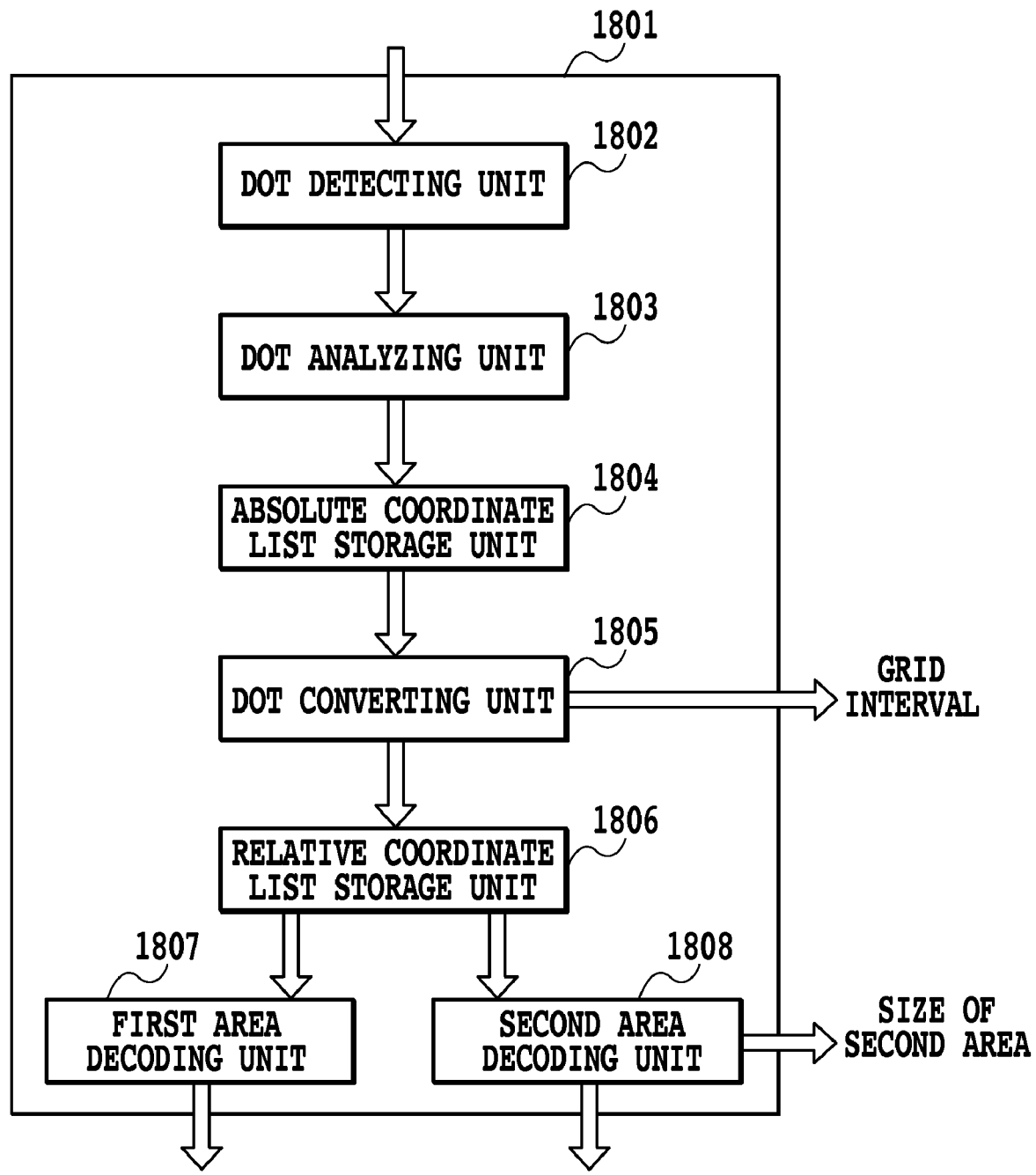
FIG. 18 is a block diagram of a data analyzing unit which analyzes an LVBC according to the first embodiment of the present invention.

FIG. 18 shows a block diagram of a data analyzing unit 1801 which analyses an LVBC.

The data analyzing unit 1801 is equivalent to the data analyzing unit 1212 shown in FIG. 12 and the data analyzing unit 1312 shown in FIG. 13. The data analyzing unit 1801 is further constituted by sub-modules.

In FIG. 18, reference numeral 1802 denotes a dot detecting unit that extracts arbitrary dots from the additional security information-embedded image (a mixture of the original image and additional security information) and converts the dots into coordinates.

Reference numeral 1803 denotes a dot analyzing unit that removes unnecessary dots unrelated to additional security information such as dots constituting a halftone from dots detected by the dot detecting unit 1802.

Reference numeral 1804 denotes an absolute coordinate list storage unit that stores absolute coordinates of a plurality of dots that is the output result of the analysis performed by the dot analyzing unit 1803.

Reference numeral 1805 denotes a dot converting unit that detects a rotational angle and a pattern interval from the absolute coordinate list stored by the absolute coordinate list storage unit and performs conversion into relative coordinates from the virtual grid position. The pattern interval detected at this point is to be used to determine the destruction of additional security information when performing enlargement/reduction.

Reference numeral 1806 denotes a relative coordinate list storage unit that stores the relative coordinates of the plurality of dots from the virtual grid position as analyzed by the dot converting unit 1805.

Reference numeral 1807 denotes a first area decoding unit that extracts the first area among the embedded additional security information and outputs the extraction result to a subsequent stage.

Reference numeral 1808 denotes a second area decoding unit that extracts the second area among the embedded additional security information and outputs the extraction result to a subsequent stage.

The size of the second area detected at this point is to be used to determine destruction of additional security information when an image processing apparatus performs functions such as area specification or moving (described below). In addition, the "subsequent stage" as used herein refers to functional modules that utilize additional security information. For example, relevant functional modules include a functional module that stops printing when copy restricting information is extracted as additional security information or a functional module that displays owner information of a sheet on an operation display when tracking information is extracted.

<Dot Detection>

Next, the dot detecting unit 1802 will be described.

Figure 19:
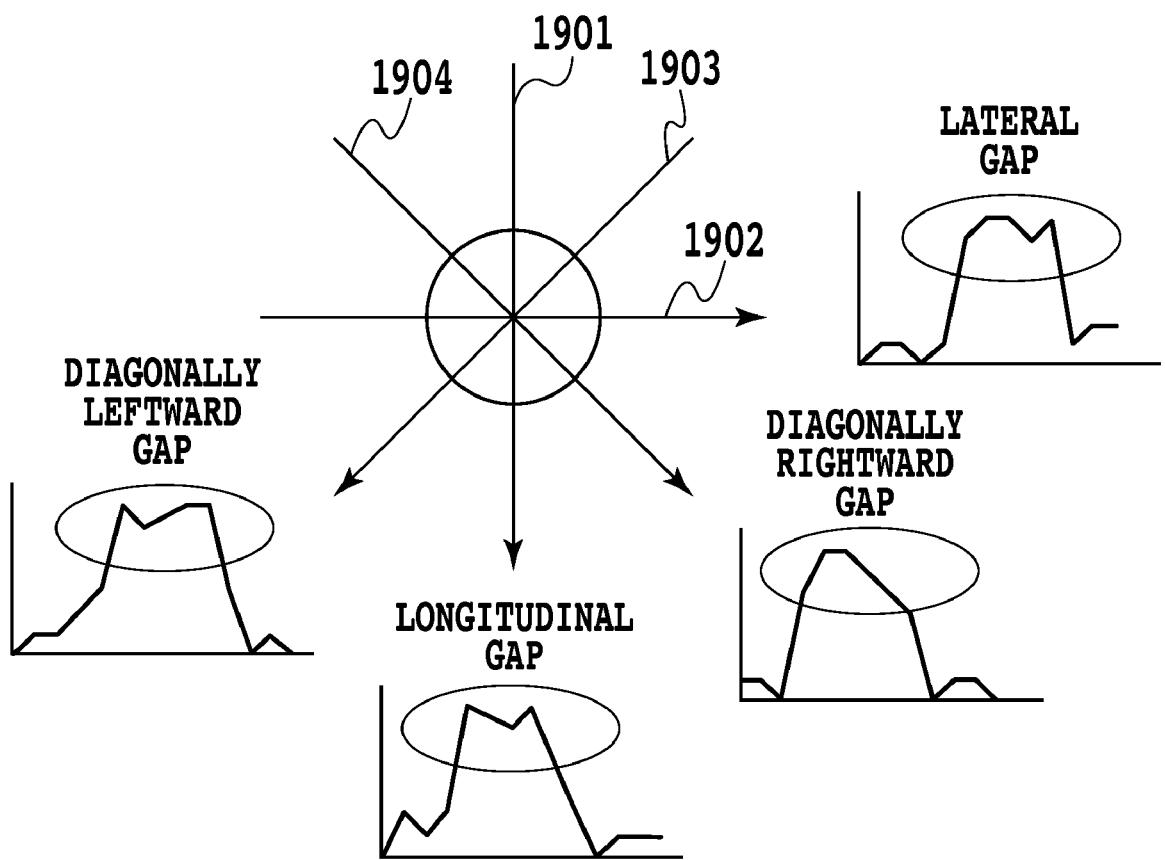
FIG. 19 is a conceptual diagram describing dot detection by a dot detecting unit according to the first embodiment of the present invention.

FIG. 19 is a conceptual diagram for describing dot detection at the dot detecting unit 1802.

The dot detecting unit 1802 receives an image read by an optical scanner in a multi valued monochromatic image format. While information embedding by an LVBC is performed with monochrome binary dots, a signal is received in a slightly degraded state due to influences such as toner bonding characteristics and sheet handling during embedding and the influence of an optical system during scanning. Therefore, with an LVBC, in order to eliminate such influences, extraction accuracy is increased by detecting a particular point and recognizing a centroid or central position of the particular dot as its coordinate position.

In order to examine whether a particular point is a dot on the image, an examination of gaps is performed on the image from four directions. Reference numerals 1901 to 1904 respectively denote directions in which the presence of a particular point is examined. For example, when an examination in the longitudinal direction 1901 yields a result of "white", "white", "black", "black", "white" and "white", it is possible that the black portion is a dot. However, the result alone does not eliminate the possibility of the black portion forming a line in a lateral direction. In a similar manner, even when a possibility of a dot is determined solely by an examination in a lateral direction 1902, it is possible that the apparent dot is actually a longitudinal line. In the present embodiment, examination accuracy is increased by having the dot detecting unit 1802 respectively perform an examination of a particular point in four directions 1901 to 1904. In the case where a determination of a possible dot is simultaneously made in the four directions 1901 to 1904 for a given area, it is possible to identify the presence of a dot at this position.

<Dot Analysis>

Next, processing performed by the dot analyzing unit 1803 will be described.

There may be cases where dots detected by the dot detecting unit 1802 are dots other than those constituting an LVBC. For example, such dots include dot patterns for expressing a halftone included in an image of the original, a dot intrinsically included in the original (e.g., a period or full stop "."), or the like. Halftone removal processing must be performed in order to delete these dots that are not dots constituting the LVBC.

Figure 20:
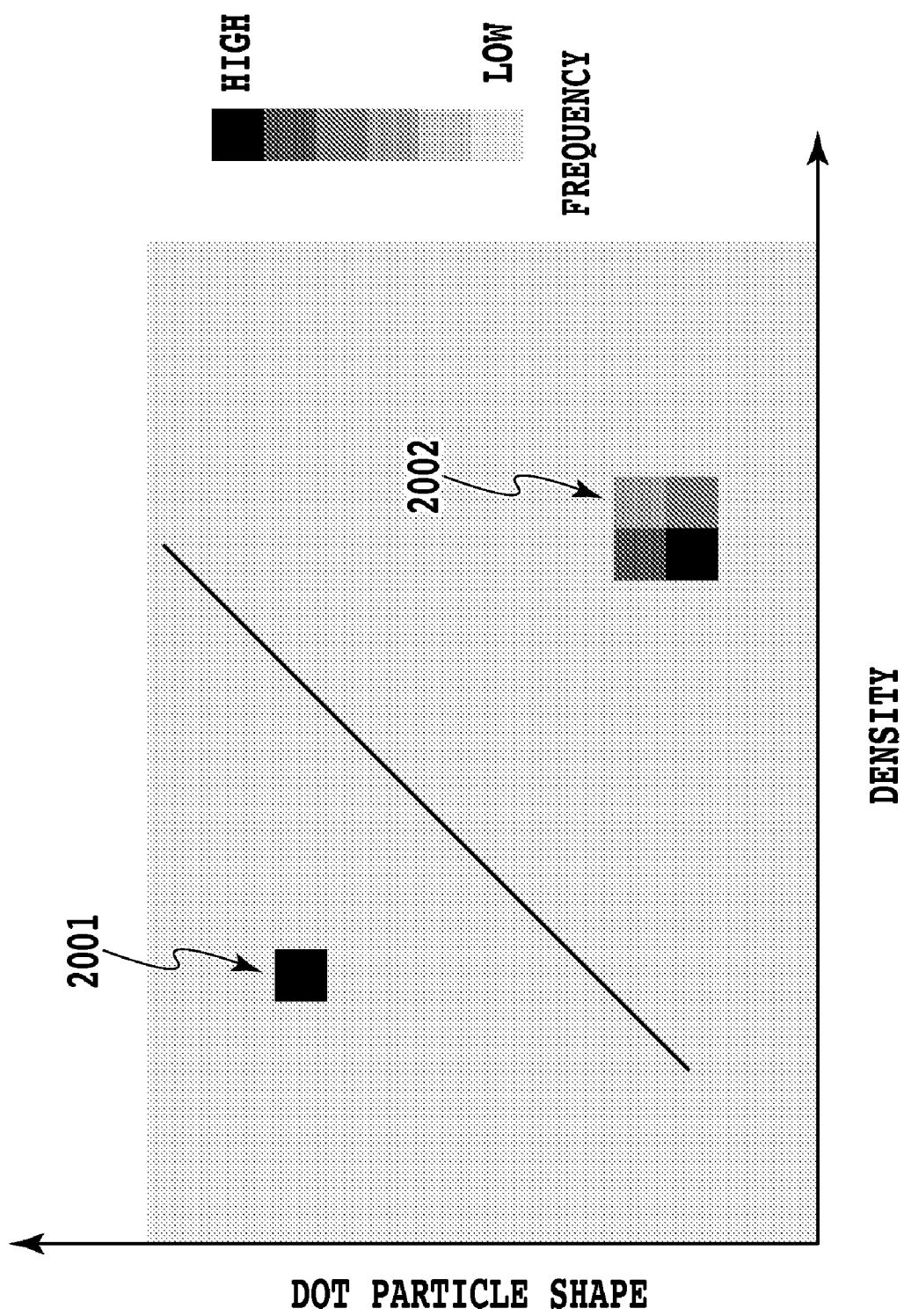
FIG. 20 is a graph for describing halftone removal according to the first embodiment of the present invention.

A graph for describing halftone removal is shown in FIG. 20. In the diagram, the ordinate represents dot particle shape while the abscissa represents dot density, and a histogram representing dot occurrence frequency is shown. A denser dot density (more black) indicates a higher occurrence frequency. In the case of an LVBC dot, since embedding is performed with uniform dot shapes and printing density, the occurrence frequency of LVBC dots peaks at a narrow position on the graph (reference numeral 2001 in FIG. 20). Meanwhile, since halftone dot particle shapes and density are not normalized, halftone dots have a greater density range and the occurrence frequency thereof is relatively low. Using this characteristic, positions indicating peaks and whose occurrence frequency is narrow are identified as LVBC dots and stored as such in the absolute coordinate list storage unit 1804, while other dots are removed. Due to this processing, it is possible to exclude nearly all non-LVBC dots such that LVBC dots are almost the only dots to be recorded in the absolute coordinate list storage unit 1804.

In the present embodiment (as well as in subsequent embodiments), a determination on whether dots fall within an allowable range of dot sizes (dot size allowable range) can be performed prior to creating the histogram shown in FIG. 20 in order to determine whether dots are LVBC dots with greater accuracy. In other words, the histogram shown in FIG. 20 may only be created and subsequent processing performed when the number of dots falling within the dot size allowable range (neither too small nor too large) and found in the original image exceeds a threshold. On the other hand, when the number of dots within the dot size allowable range is equal to or less than the threshold, it is determined that LVBC-format additional information is not included and the processing is terminated. Such an arrangement reduces excess load due to processing. For example, the load due to creating the histogram shown in FIG. 20 can be eliminated.

The allowable range regarding dot size (dot size allowable range) exists under the following assumption. That is, it is assumed that the system embedding additional information will not create dots with excessively small dot sizes or dots with excessively large dot sizes. This is an extremely rational assumption.

The reason for this is that using dots whose sizes are excessively large reduces the amount of information that can be embedded as additional information and also contaminates the original image. In addition, using dots whose sizes are excessively small may result in embedded additional information being erased by the slightest contamination. Moreover, another consequence is that the degree of displacement of the centroid position is minute, making it difficult to analyze additional information with accuracy.

<Dot Conversion>

Next, processing performed by the dot converting unit 1805 will be described.

Since the angle at which an LVBC dot pattern was embedded at the time of printing and the angle in the scanned image may differ due to, for example, a difference in the orientation of the original on the scanner or minute analog-level angular misalignment, it is necessary to perform detection and correction of rotational angles. In addition, with an LVBC, since displacement from a position of a virtual grid point to which a dot belongs represents information, it is necessary to accurately determine a pattern interval correlating to the virtual grid interval because the original virtual grid must be reproduced.

A method of measuring a pattern interval will now be described.

Figure 21:
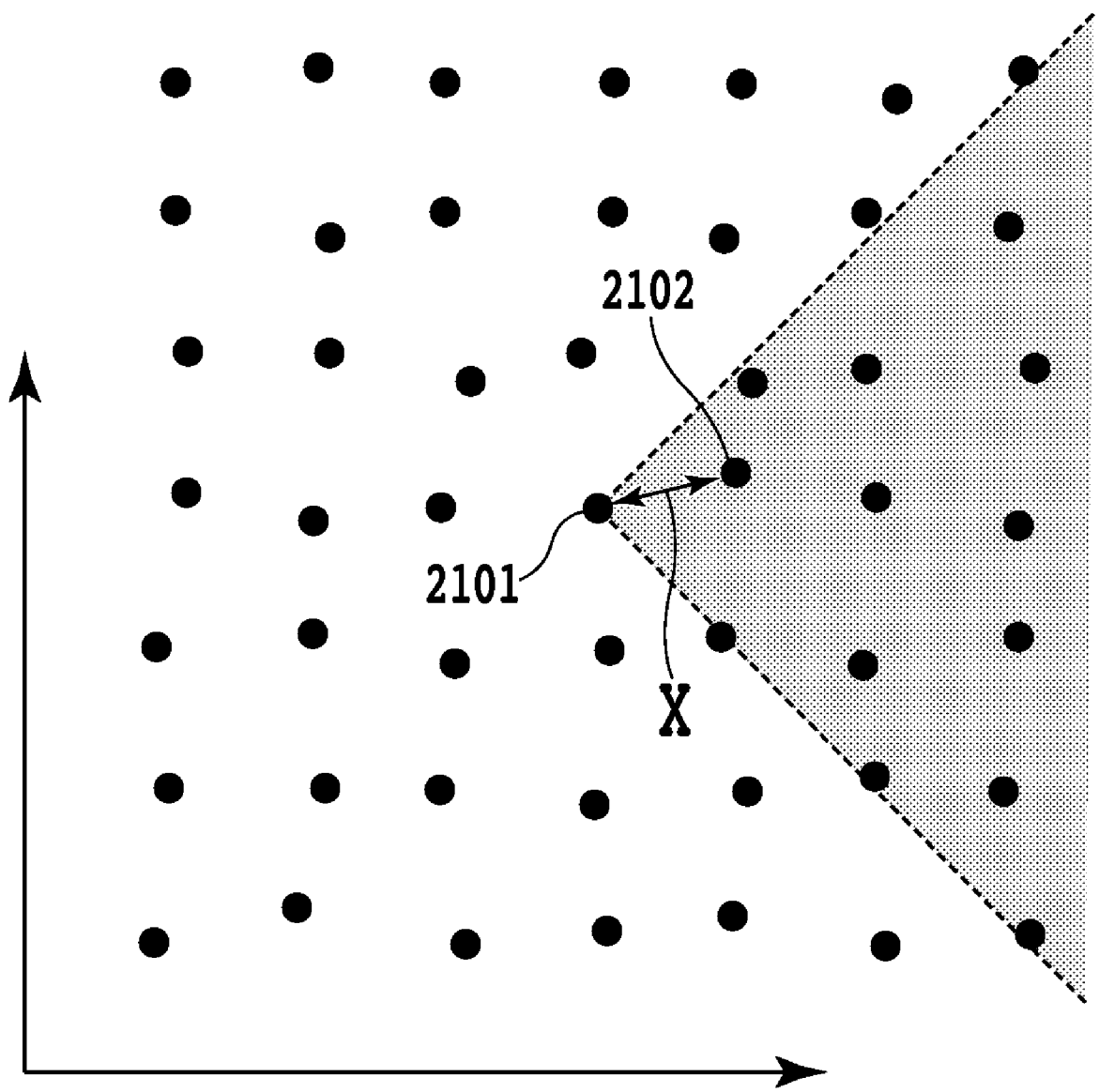
FIG. 21 is a schematic diagram describing a method for measuring a pattern interval according to the first embodiment of the present invention.

FIG. 21 is a schematic diagram describing a method for measuring a pattern interval.

A distance X from a dot 2101 currently under examination (referred to as the attention dot) to a neighbouring or adjacent dot 2102, herein referred to as a pattern interval, analogizes the virtual grid interval.

While there are four dots—above, below, left and right—that are neighbouring the attention dot, in the present embodiment, for the purpose of reducing load due to calculation, the periphery of the attention dot 2101 is divided into 90-degree units whereby only the 90-degree range on the right side of the attention dot 2101 is to be used as an object for adjacent dot retrieval. More specifically, with an arbitrary dot (a, b) other than the attention point (x, y), if $$a-x \leq 0 \text{ or } |a-x| \leq |b-y|$$

is true, then the dot (a, b) will not be considered for calculation. The dot converting unit 1805 assumes a calculation object dot (a, b) for which the distance to the attention dot (x, y) is minimum to be an adjacent neighbor dot and calculates a distance X between the two dots as a pattern interval candidate.

In this case, both the attention dot 2101 and the adjacent dot 2102 have been displaced to allow for embedding information. Therefore, there is a possibility that the distance between the attention dot 2101 and the adjacent dot 2102 differs from the original virtual grid interval. In addition, both the attention dot 2101 and the adjacent dot 2102 may simply be halftone dots which the dot analyzing unit 1803 failed to remove. To this end, for all dots (x, y), the dot converting unit 1805 measures distances between attention dots and adjacent dots using techniques such as described above, and creates a histogram presenting frequency by distance to an adjacent dot for all attention dots.

Figure 22:
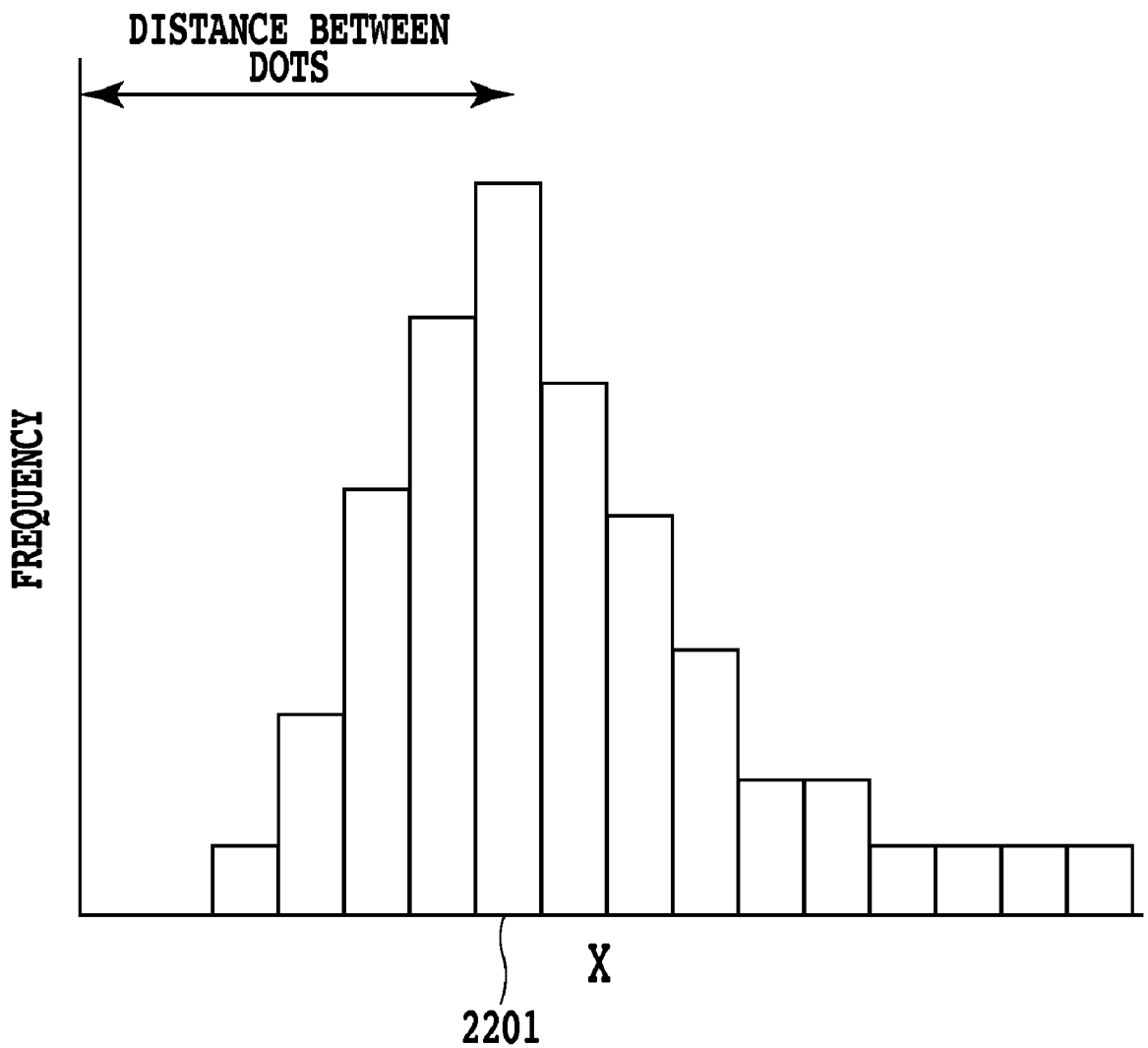
FIG. 22 is an example of a histogram showing frequencies of distances between dots according to the first embodiment of the present invention.

FIG. 22 shows an example of a histogram showing the frequency of distances between attention dots and adjacent dots. The abscissa represents values of the distance X representing the distance between attention dots and adjacent dots while the ordinate represents occurrence frequencies thereof. According to FIG. 22, the distance X denoted by reference numeral 2201 is identified as having the highest occurrence frequency. The pattern interval X is delivered to a destruction determining unit, to be described later.

Next, correction of a rotational angle of the pattern will be described with reference to FIG. 23.

Figure 23:
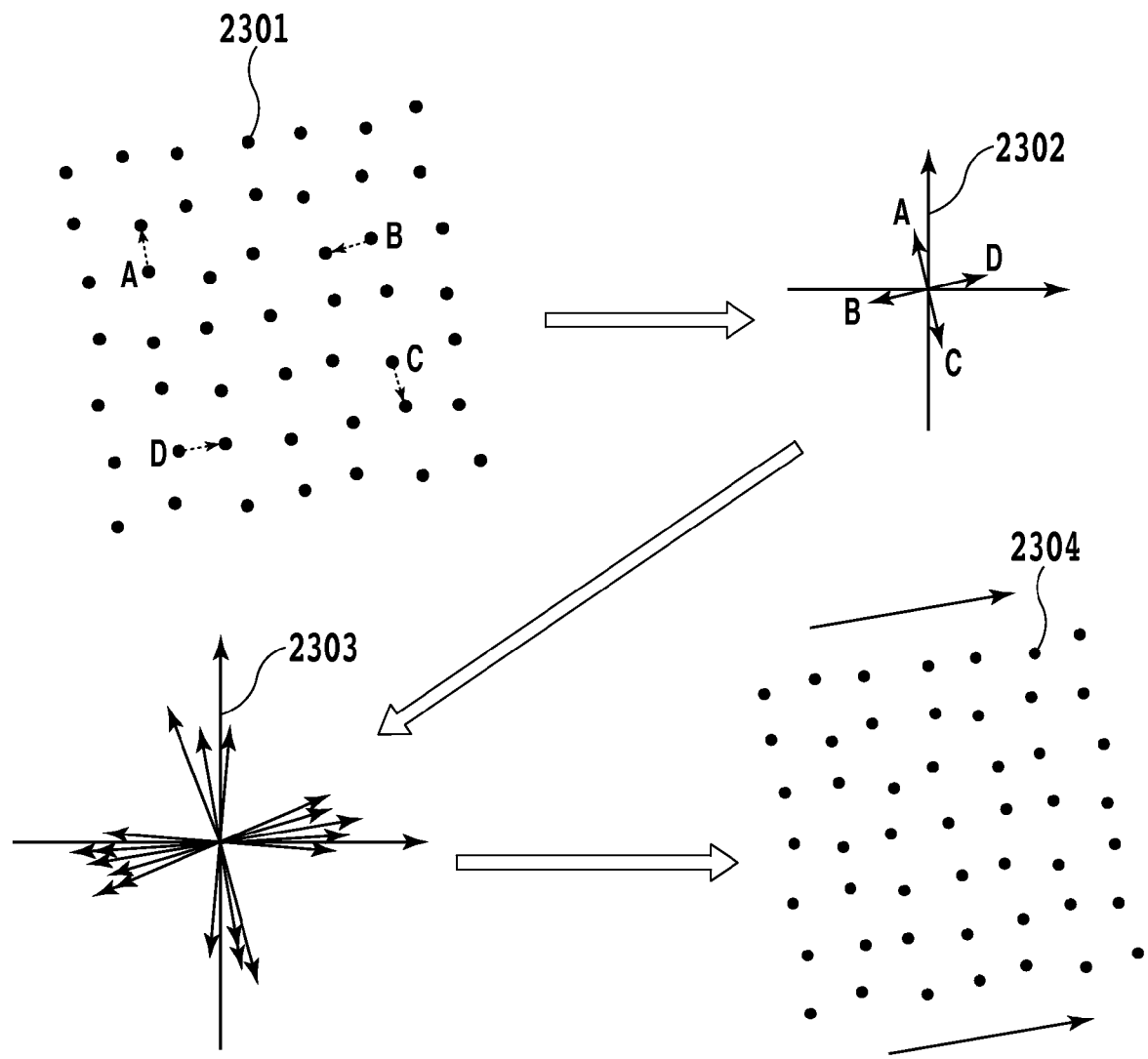
FIG. 23 is a diagram describing rotational angle correction of a pattern according to the first embodiment of the present invention.

FIG. 23 is a diagram for describing correction of a rotational angle of this pattern.

Reference numeral 2301 indicates a dot. Angles to nearest adjacent dots are to be measured for all dots.

The angle from an attention dot to an adjacent dot can be approximated to one of 0 degrees, 90 degrees, 180 degrees and 270 degrees. In this case as well, if a vector from an attention dot extending towards an adjacent dot is expressed as (dx, dy), the angle θ between the attention dot and the adjacent dot can be expressed by the following formula:

$$\theta = \text{atan } 2(dy, dx)$$

The diagram denoted by reference numeral 2302 shows vectors A, B, C and D from four attention dots to respective adjacent dots. However, since, in actuality, attention dots and adjacent dots alike are slightly displaced from the virtual grid points to allow information embedding, the angle θ is similarly calculated for all attention points. Assuming that the probability of occurrence of displacement positions of the attention dot 2101 and the adjacent dot 2102 shown in FIG. 21 from respective virtual grid points are equal both longitudinally and laterally, the rotational angle of the pattern can be measured averagely by adding the angular displacements of all attention points. The diagram denoted by reference numeral 2303 illustrates the vectors of several attention dots. As can be seen, superimposing these vectors approximates the rotational angle of the pattern (in other words the angle of the arrows shown in the diagram denoted by reference numeral 2304).

More specifically, a reference vector is re-calculated for the angle θ of each individual attention point, and a total angle φ is determined from the summation result of all reference vectors. If the reference vector summation result is expressed as (A,B), then A, B can be calculated by the following formulas.

$$A = \sum_i \cos(4\theta_i)$$

$$B = \sum_i \sin(4\theta_i)$$

In addition, the virtual grid rotational angle φ can be approximated by the following formula.

$$\phi = \text{atan } 2(B, A)$$

At this point, a rotation correction corresponding to the rotational angle of the pattern is performed on the absolute coordinate list stored in the absolute coordinate list storage unit 1804 to correct the pattern angle.

While rotational angle correction has been narrowed down to 90-degree units, in actuality, rotational angle correction is not narrowed down to any of the four angles of 0 degrees (i.e. correct orientation), 90 degrees, 180 degrees and 270 degrees. The narrowing down will be described later.

Figure 24:
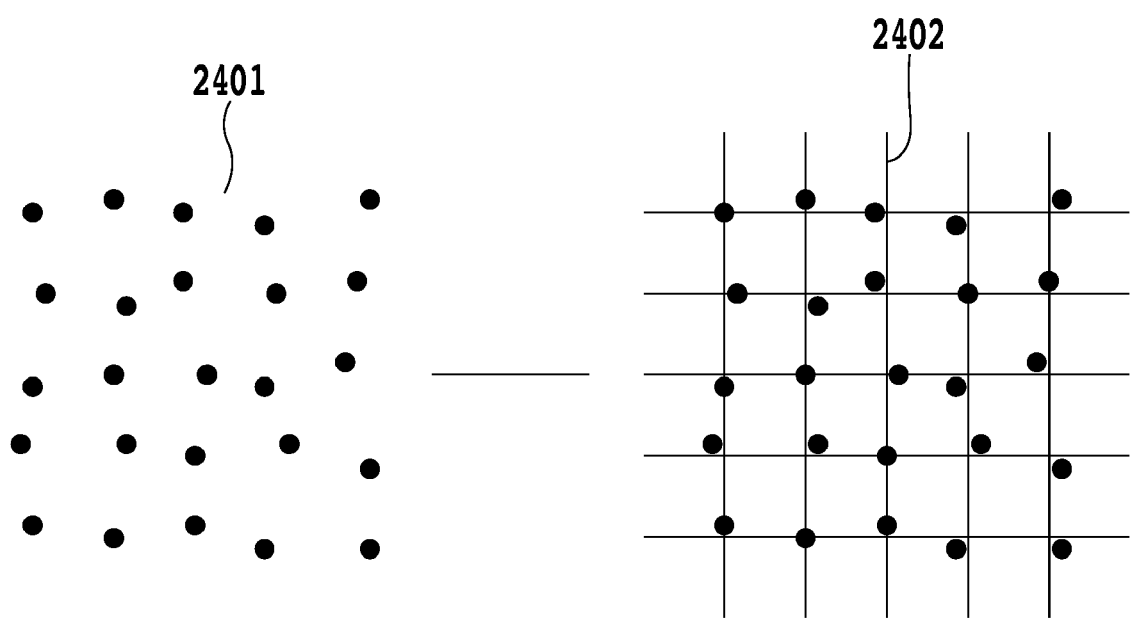
FIG. 24 is a diagram showing a result of rotational correction and a result of virtual delineation on a pattern according to the first embodiment of the present invention.

FIG. 24 shows a rotational correction result as well as a pattern position after correction.

In FIG. 24, reference numeral 2401 denotes an LVBC dot pattern for which rotational correction has been completed. In addition, as indicated by reference numeral 2402, virtual grid lines are respectively drawn in the X and Y directions at each pattern interval determined by the dot converting unit 1805, whereby the intersections of the lines are assumed to form a virtual grid. Displacements of actually placed dots from the virtual grid positions are measured. Embedded information can be obtained from displacements measured in this manner.

Figure 25:
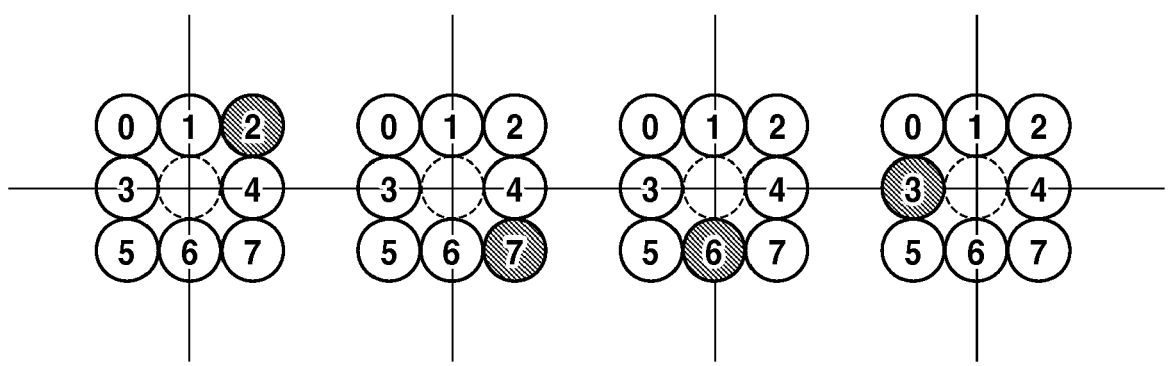
FIG. 25 is a diagram describing a conversion from virtual grid displacement to actual data according to the first embodiment of the present invention.

FIG. 25 is an explanatory diagram of a conversion of a displacement of a dot from the pattern into actual data.

As shown in FIG. 25, displacements from the virtual grid respectively represent information of 0 to 7 both longitudinally and laterally. In the case of FIG. 25, since 2, 7, 6, 3 can be extracted, three bits are respectively collected therefrom, whereby 010111110011 becomes the embedded data extracted from these dots. By similarly performing the extraction processing described above on all dots, the embedding of several tens to several thousands of bytes can be performed.

In the present embodiment, an average dot size is determined after determining pattern intervals. An average dot size refers to an average (average size) of the sizes (largeness) of the respective dots displaced from the virtual grid. The respective dots represent data by their displacements from the virtual grid, as described above. The average dot size need not necessarily be a size determined from the sizes of the respective dots through a complete average value calculation, where weighting coefficients are all "1". Instead, the average dot size may be a size determined by a weighted average value calculation (where weighting coefficients may be different among dots).

Therefore, a dot size determined by a complete average value calculation and a dot size by a weighted average value calculation are both average dot sizes. This is because a complete average value calculation and a weighted average value calculation are nevertheless both processing for calculating an average value.

<Decision of First Area>

Next, the decision of the aforementioned first area and the second area will be described.

Since the size 1603, repetitive interval 1604 and position of the first area described in FIG. 16 are all unknowns, these values will be determined.

First, the repetitive interval 1604 of the first area 1601 is determined. Since the data contained within the first area denoted by reference numeral 1601 is periodically repeated, it is possible to study the autocorrelation of dot groups at a predetermined offset with respect to the longitudinal direction which reveals that the autocorrelation characteristic rises when the offset value is consistent with the repetitive interval 1604. It is therefore possible to determine the repetitive interval 1604 based thereon.

Figure 26:
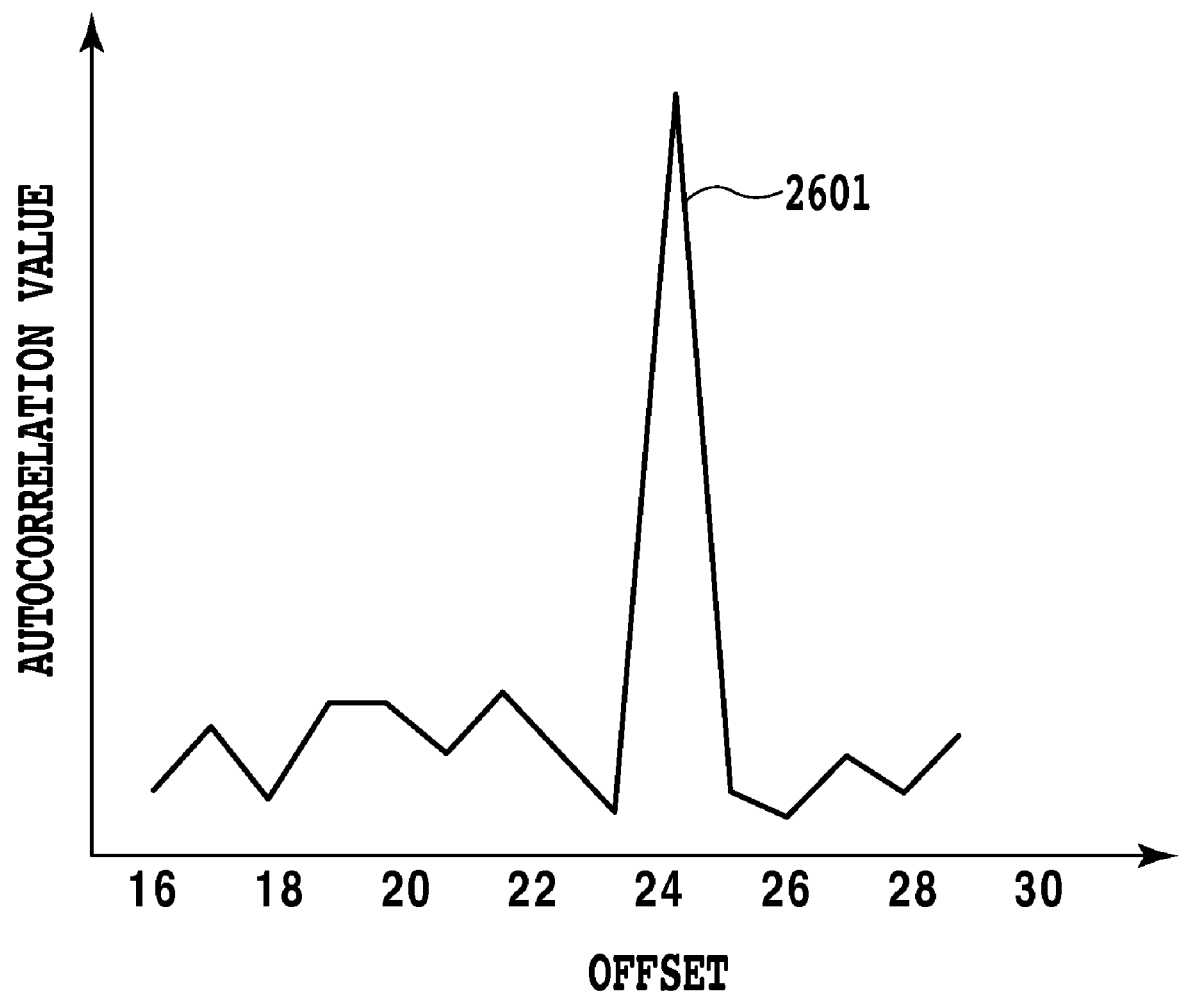
FIG. 26 is a graph showing a calculation example of autocorrelation values corresponding to offset values in a first area according to the first embodiment of the present invention.

FIG. 26 is a graph showing an example of a calculation of autocorrelation values in correspondence with offset values. "Autocorrelation" as used herein refers to a method for evaluating a periodic occurrence frequency of specific embedded data, and an "autocorrelation value" refers to a numerical value that evaluates a similarity of embedded data at a specific offset value.

An autocorrelation function COR(A, B) for calculating an autocorrelation value can be expressed by the following arithmetic expression.

$$COR(A, B) = \text{bitcount}(\text{not}(A \text{ xor } B)),$$

where "xor" denotes an exclusive OR of the two terms and "not" denotes negation. "bitcount" is a function for counting the number of bits of 1 in a bit string. For example, if A is 010b and B is 011b, then not(A xor B)=not(001b)=110b, resulting in a bitcount of 2.

Now, let us assume that the first area is a matrix having a predetermined width and height, and that a bit string for evaluating the first area is expressed as CELL (x, y), where x, y respectively denote lateral and longitudinal coordinates. For example, if the size of the first area is expressed as width=8, height=8, then for the first area having x, y as the upper left corner thereof, the bit string length of CELL(x, y) is determined as 3 bits×8×8=192 bits.

The autocorrelation value of all coordinates at a given offset is expressed by the following function:

$$\text{Autocorrelation value (Offset)} = \sum_x \sum_y COR(\text{CELL}(x, y), \text{CELL}(x, y - \text{offset}))$$

For example, let us assume that the size 1603 of the first area is 8 and the repetitive interval 1604 thereof is 8×3=24. In determining the autocorrelation value in this case, since the autocorrelation value at offset=24 peaks at reference numeral 2601 shown in FIG. 26, it is possible to determine the offset=24 to be the repetitive interval 1604.

Next, the position and the size of the first area 1601 are determined. While the repetitive interval of the first area has been determined by calculating the autocorrelation values of all coordinates, it is now necessary to determine at which position among the coordinates the first area exists and also the size of the first area.

Figure 27:
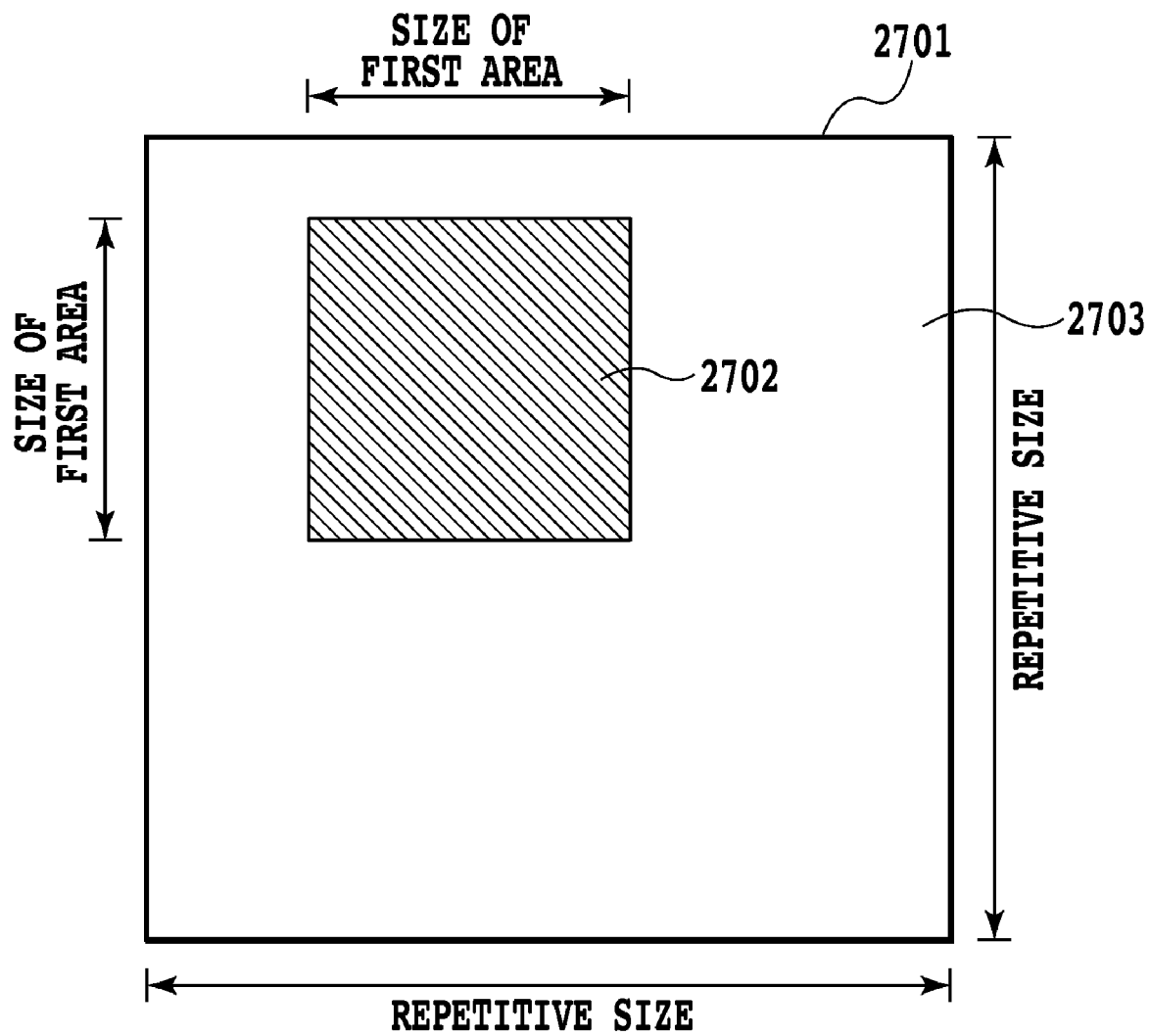
FIG. 27 is a schematic diagram showing a method of determining a position of a first area according to the first embodiment of the present invention.

FIG. 27 is a schematic diagram showing a method of determining a position of the first area. Since the repetitive interval has been determined in advance, an area 2701 corresponding to an arbitrary repetitive interval is clipped from the relative coordinate list storage unit 1806. Subsequently, an autocorrelation value of the area 2701 is calculated, an autocorrelation value of an area adjacent to the area 2701 is calculated, an autocorrelation value of an area further adjacent thereto is calculated, and so on. Among such areas, the portion corresponding to the first area 2702 has a high correlation since the same data appears with the period of the repetitive interval. Otherwise, the second area 2703 has a low correlation since the same data does not appear at the repetitive interval described above. Taking advantage of this characteristic, it is now possible to determine the start position of a high-correlation portion to be the start position of the first area and the size up to the end of the high-correlation portion to be the size of the first area.

<Decoding of First Area>

Data embedded in the first area is decoded based on the position and size of the first area confirmed as described above. At this point, since using only a single area may result in an erroneous determination due to a measuring error or noise, aggregation is performed on positions of all dots written into the first area, whereby a mode value with the highest occurrence frequency is adopted as described below.

Figure 28:
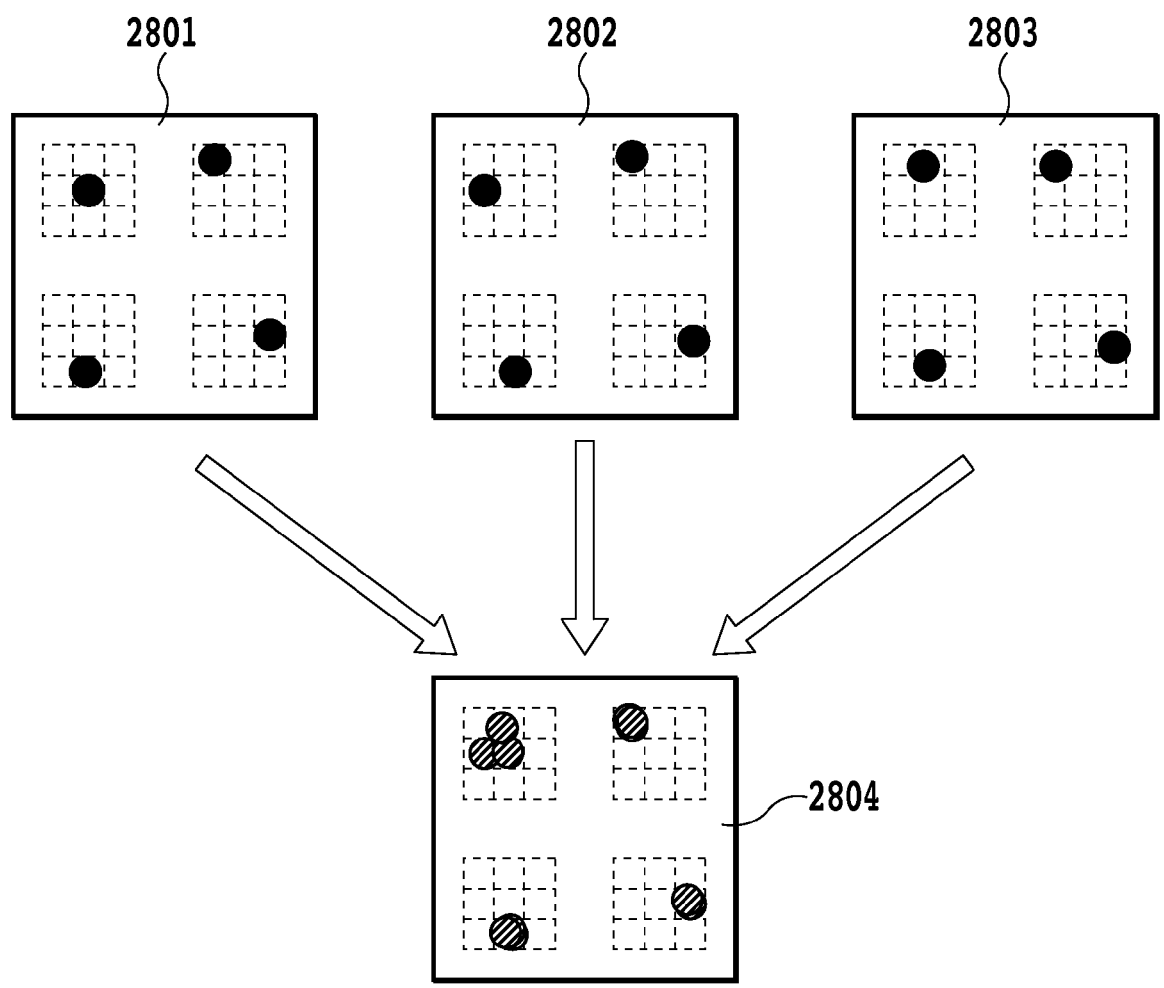
FIG. 28 is a schematic diagram for describing an aggregation of positions of dots written into a first area according to the first embodiment of the present invention.

FIG. 28 is a schematic diagram for describing aggregation of positions of dots written into the first area. In FIG. 28, reference numerals 2801 to 2803 denote the first area written at different positions. Reference numeral 2804 denotes an aggregation result thereof. While misalignment due to noise or error exists, since a mode value is determined based on the aggregation result of all areas, the value can be adopted.

Next, actual decoding is performed. At this stage, since the influence of noise and error cannot be eliminated, decoding is performed by subjecting the decoding result to error correction processing. First, as described with reference to FIG. 25, a data string embedded into the first area is extracted by extracting a displacement from the pattern and converting the same into data corresponding to the displacement position from the virtual grid. In addition to copy restricting information to be actually used, the data string also records an error correction code for detecting and, if possible, restoring data destroyed in embedding.

While numerous error correction codes exist as known techniques, the LDPC (Low Density Parity Check) scheme will be used herein. LDPC is known for its extremely high error correction capability and for exhibiting characteristics approaching the Shannon limit. A detailed description of LDPC will be omitted. In addition, any error correction coding scheme other than LDPC may be used as long as such a scheme is provided with error correction capabilities. By using an error correction code, it is now possible to extract embedded data even if a certain degree of error or noise is included in the extracted grid.

In addition, as described in regard to rotational angle correction, since rotational angle correction processing is performed at 90-degree units, the extracted data may be any of the following four: correct data, the correct data rotated by 90 degrees, the correct data rotated by 180 degrees, and the correct data rotated by 270 degrees. In light of this, decoding is performed on the extracted data, in which error correction by LDPC has been respectively and prospectively performed on the results of no rotation, a 90-degree rotation, a 180-degree rotation and a 270-degree rotation. The error correction code functions only with the correct rotational angle to enable normal data extraction.

Decoding in consideration of rotation and which is accompanied by error correction will now be described with reference to FIG. 29.

Figure 29:
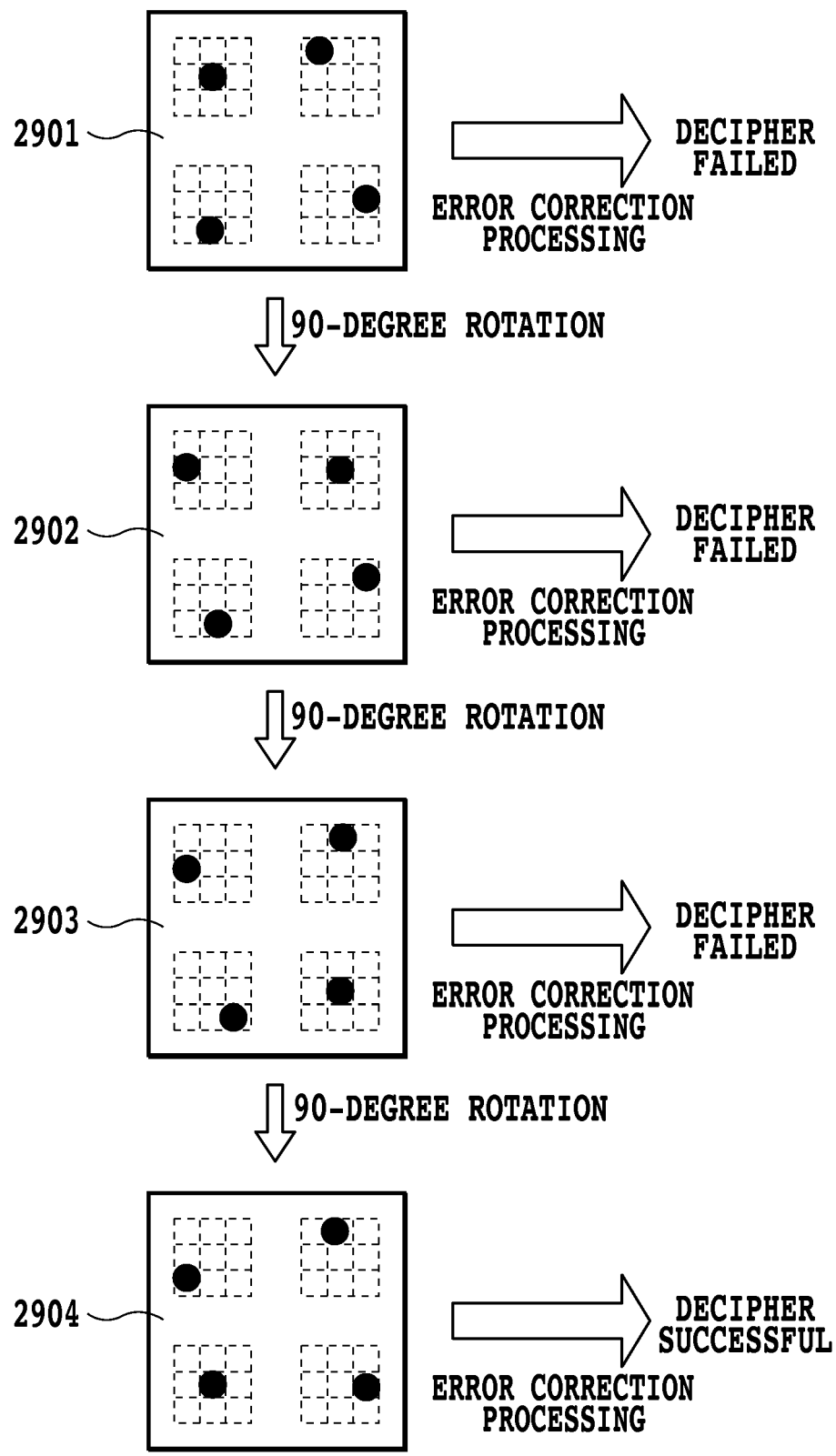
FIG. 29 is an explanatory diagram for describing decoding that takes rotation into consideration and which is accompanied by error correction, according to the first embodiment of the present invention.

With the example shown in FIG. 29, let us assume that the result of a 270-degree rotation has been extracted in correspondence to the correct data. First, as denoted by reference numeral 2901, error correction processing is performed as-is on the extracted data. Although correct data includes an error correction code, since the data is rendered meaningless by rotation, error correction is no longer possible. Next, as denoted by reference numeral 2902, error correction processing is performed on data resulting from a 90-degree rotation of reference numeral 2901. Since error correction similarly fails, data cannot be extracted. Next, as denoted by reference numeral 2903, error correction processing is performed on data resulting from a 90-degree rotation of reference numeral 2902. Since error correction similarly fails, data cannot be extracted. Finally, as denoted by reference numeral 2904, error correction processing is performed on data resulting from a 90-degree rotation of reference numeral 2903. Since the data is in the correct orientation, error correction processing is successful, enabling the data to be adopted as extracted data.

In a case where error correction processing as denoted by reference numeral 2904 also fails, the failure to extract data can conceivably be attributed to a multitude of errors or noise.

According to the above, extraction of embedded data stored in the first area can be performed.

<Decision of Second Area>

As described earlier, the second area is an area used for registering tracking information and the like which is not necessarily required when performing a copy operation. Therefore, if not necessary, a reduction in overall processing speed can be avoided by omitting the step of decoding the data embedded in the second area.

A method for determining the second area will be described below.

First, in order to determine the second area, autocorrelation values are calculated in the same manner as when determining the first area. Since the second area is embedded at an interval that is a multiple of the repetitive interval of the first area, calculating autocorrelation values at any of multiple units of the repetitive interval of the first area (in the example, 24, 48, 72, . . . ) will suffice, thereby enabling calculations to be omitted. Furthermore, with the second area, the repetitive interval becomes equal to the size of the second area.

Figure 30:
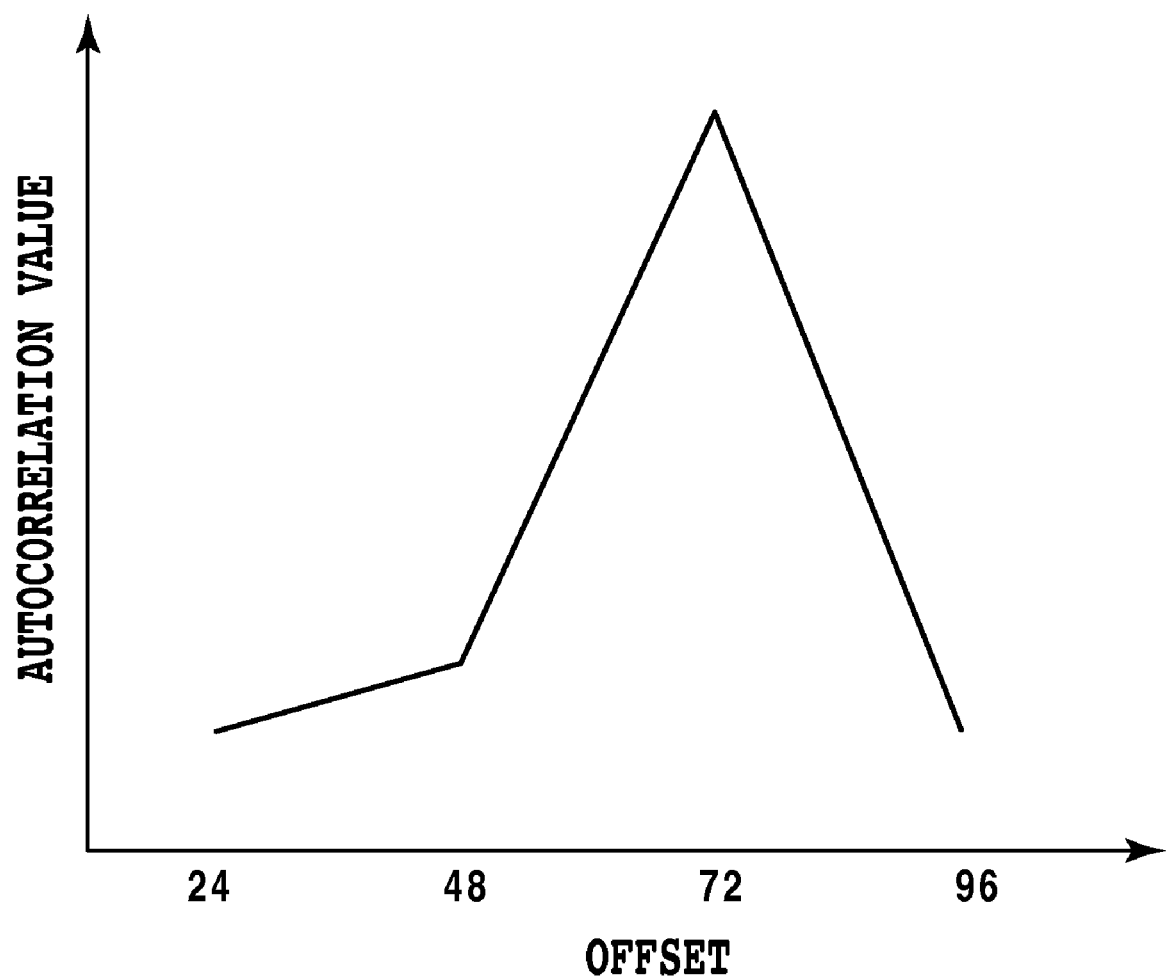
FIG. 30 is a graph showing a calculation example of autocorrelation values corresponding to offset values in a second area according to the first embodiment of the present invention.

A graph providing, as an example, calculations of autocorrelation values corresponding to offset values in the second area is shown in FIG. 30. As shown in the diagram, autocorrelation values peak at a specific offset value.

Finally, the start position of the second area is identified. Since the start position of the first area and the start position of the second area are matched up when embedding an LVBC dot, the start position of the second area can be narrowed down to any of the start positions of the first area.

An error correction code is used to determine the position of the second area. With the second area, in a similar manner to the first area, an error correction code is also added to embedded data. Since the size of the second area is known, error correction processing is sequentially performed beginning at the start position of the first area.

Figure 31:
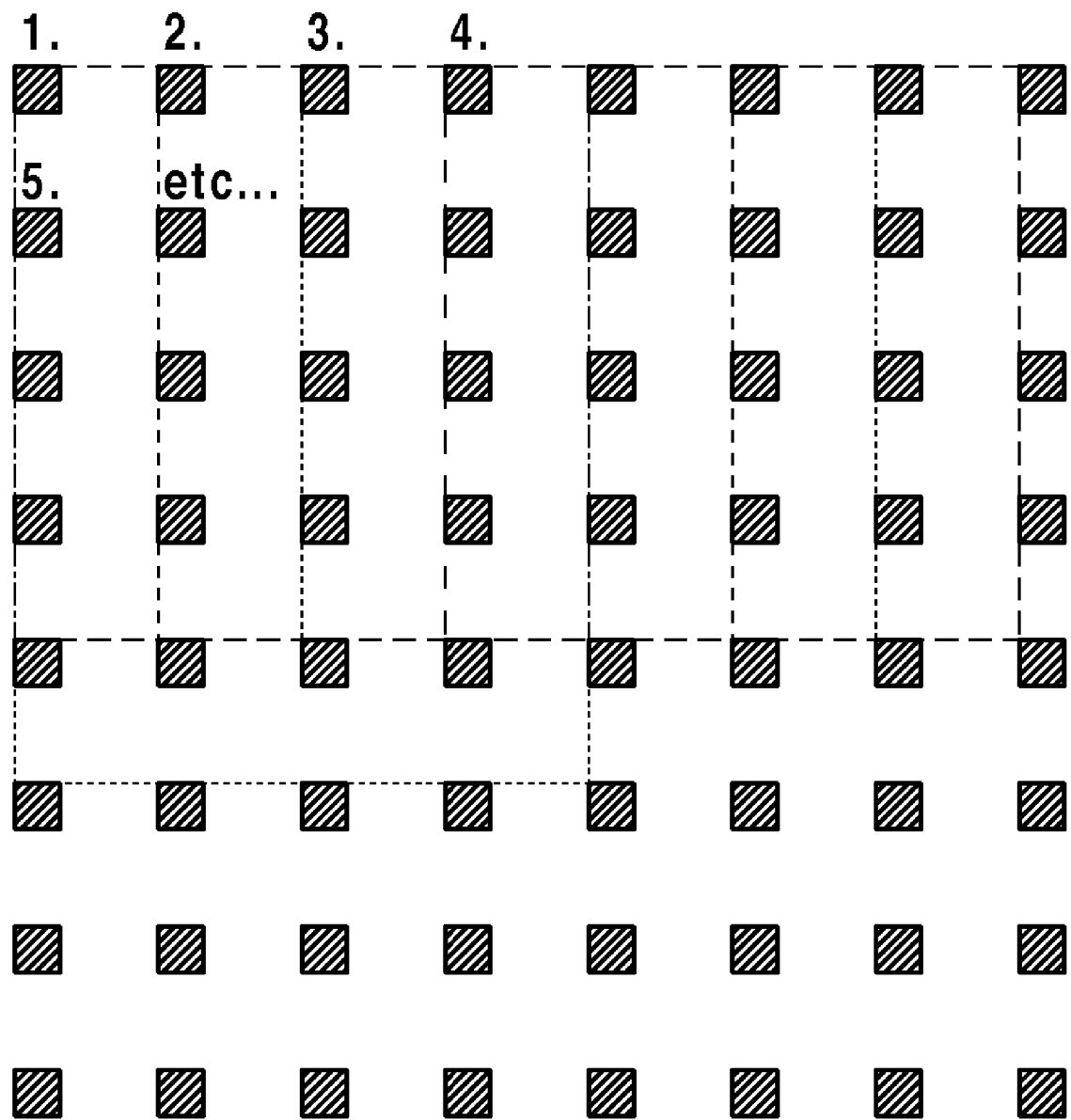
FIG. 31 is a schematic diagram for describing a method of determining a position of a second area according to the first embodiment of the present invention.

FIG. 31 is a schematic diagram for describing a method of determining a position of the second area. In FIG. 31, the calculated autocorrelation value indicates that the size of the second area is four times the repetitive interval of the first area. In this case, since any of 4×4=16 start positions of the first area becomes the start position of the second area, error correction processing is applied by shifting the position by 1, 2, 3, 4, 5 and so on. In the case the error correction processing is successful, the position can be adapted as the second area. The longitudinal and lateral sizes of the second area can be calculated from the determined repetitive intervals and magnification. The longitudinal and lateral sizes of the second area are transmitted to the destruction determining unit, to be described later.

According to the above, extraction of embedded data stored in the second area can be performed.

Next, a description will be given of a feature of the present invention that facilitates, where possible, the usage of enlarging/reducing and advanced modes in the presence of additional security information.

<Settings for Enlarging/Reducing and Advanced Modes>

Figure 32:
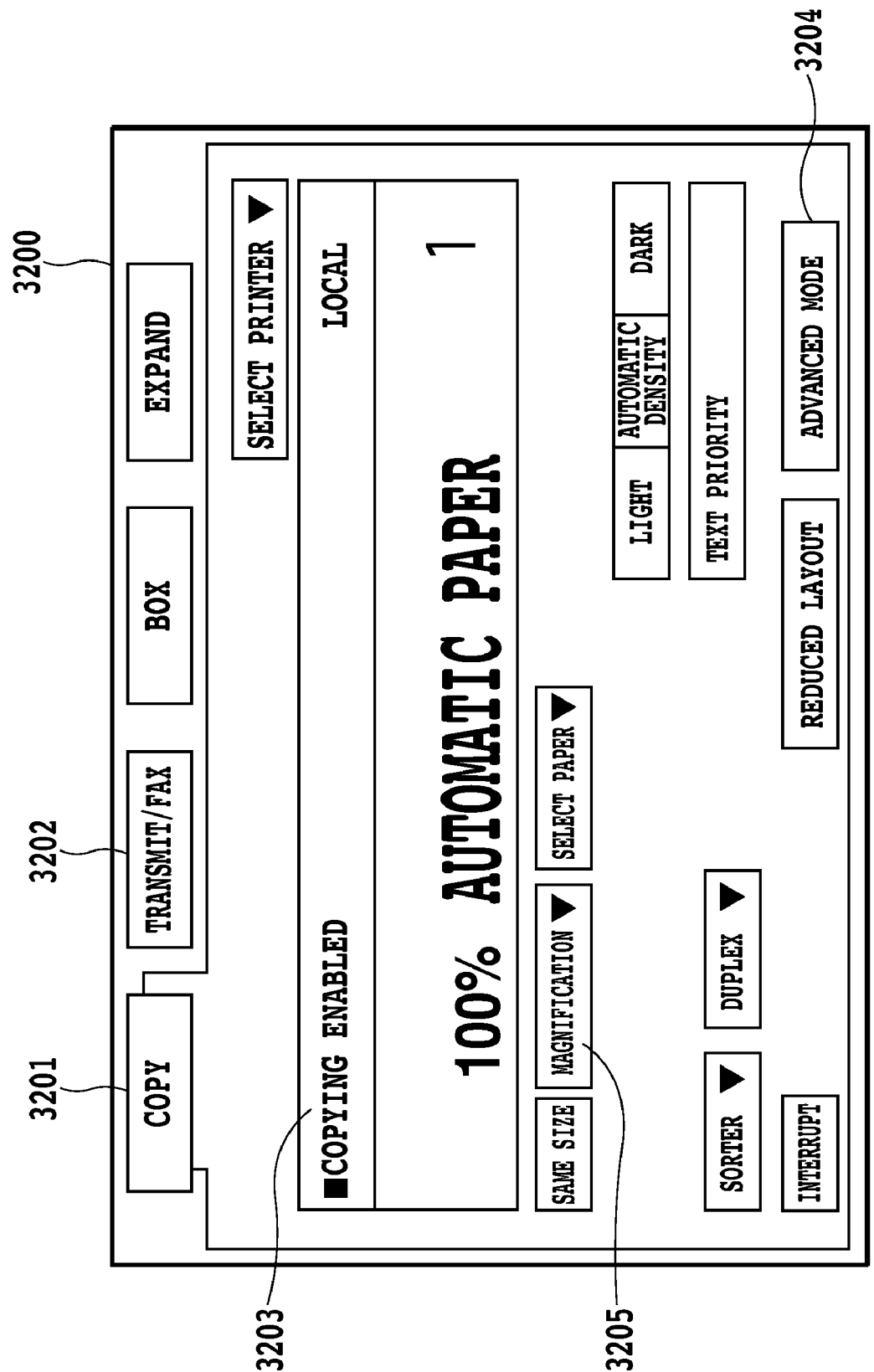
FIG. 32 is a GUI diagram showing a normal copy screen on an operating unit of a digital multifunctional printer according to the first embodiment of the present invention.

FIG. 32 is a GUI diagram showing a normal copy screen on the operating unit 412 of a digital multifunctional printer. In FIG. 32, reference numeral 3200 denotes a screen itself of a UI unit, 3201 denotes a copy tab indicating that copying has been selected, and 3202 a transmit tab for selecting transmission or a fax function. For the present embodiment, only a description on the copy tab 3201 will be given. Other tabs are not relevant and therefore will not be described. Reference numeral 3203 denotes a state display window for displaying a copy setting, 3204 denotes an advanced mode button for performing further processes during copying, and 3205 denotes a specify magnification button for selecting enlarging/reducing of an output result of an inputted original.

Figure 33:
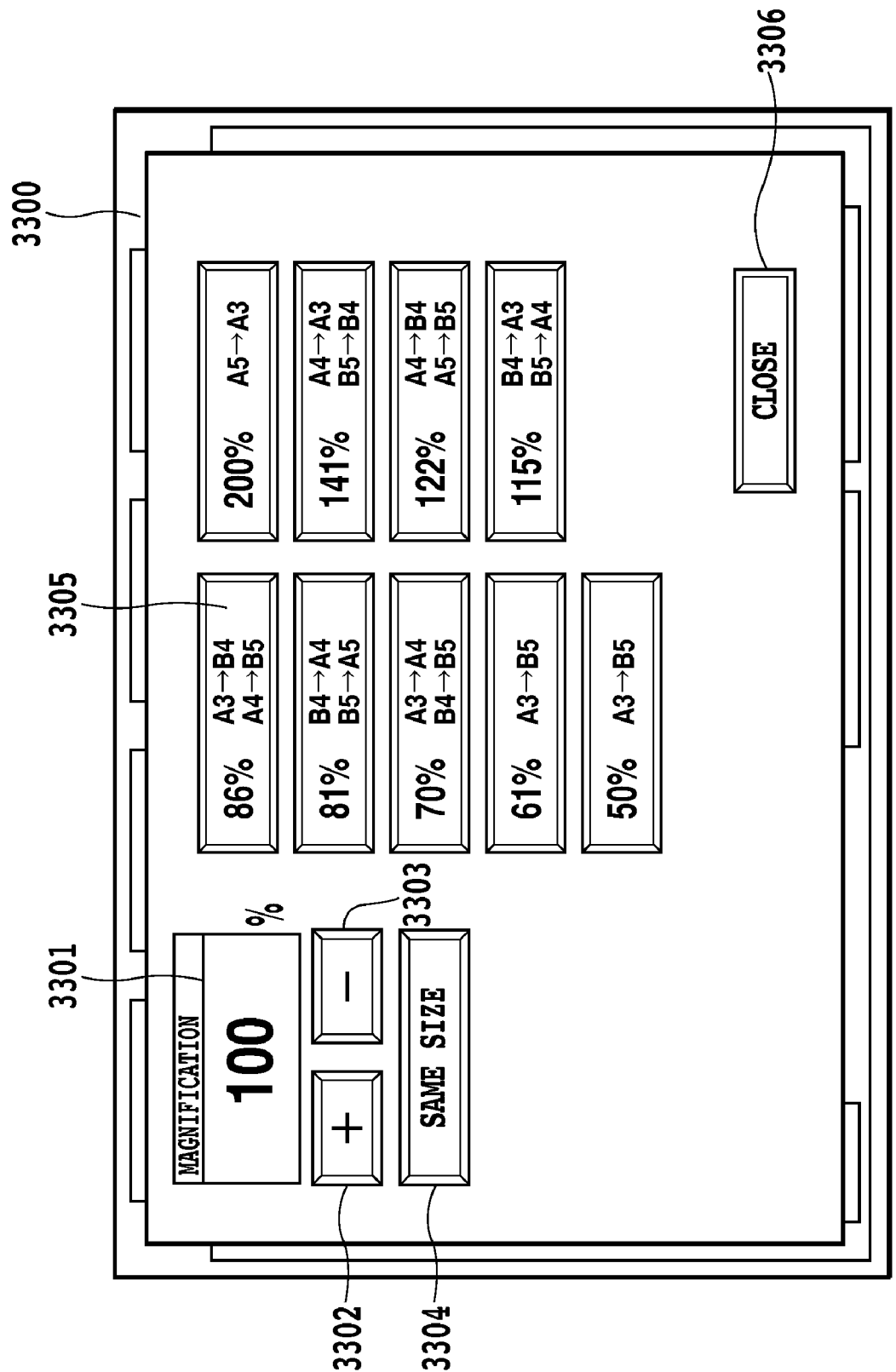
FIG. 33 is a GUI diagram showing a magnification specification dialog displayed when pressing down a specify magnification button according to the first embodiment of the present invention.

FIG. 33 is a GUI diagram showing a magnification specification dialog 3300 displayed on activating the specify magnification button 3205. In FIG. 33, reference numeral 3301 denotes a magnification display that displays a magnification (scaling factor), while 3302 and 3303 respectively denote an increase magnification button and a decrease magnification button which increases/decreases the scale by one point increments/decrements per activation of the button. Reference numeral 3304 denotes a "same size" button that reverts the magnification to the same size or 100%, while the remaining nine buttons beginning with that denoted by reference numeral 3305 represent fixed magnification buttons for enlarging/reducing a particular prescribed paper size (A series, B series) to a different prescribed paper size. Reference numeral 3306 denotes a close button for activation on completion of setting the magnification specification. When a required enlarging/reducing scale is set, the scaling unit 821 (see FIG. 8) operates during printing, thereby enabling a print result to be obtained at a desired magnification.

Figure 34:
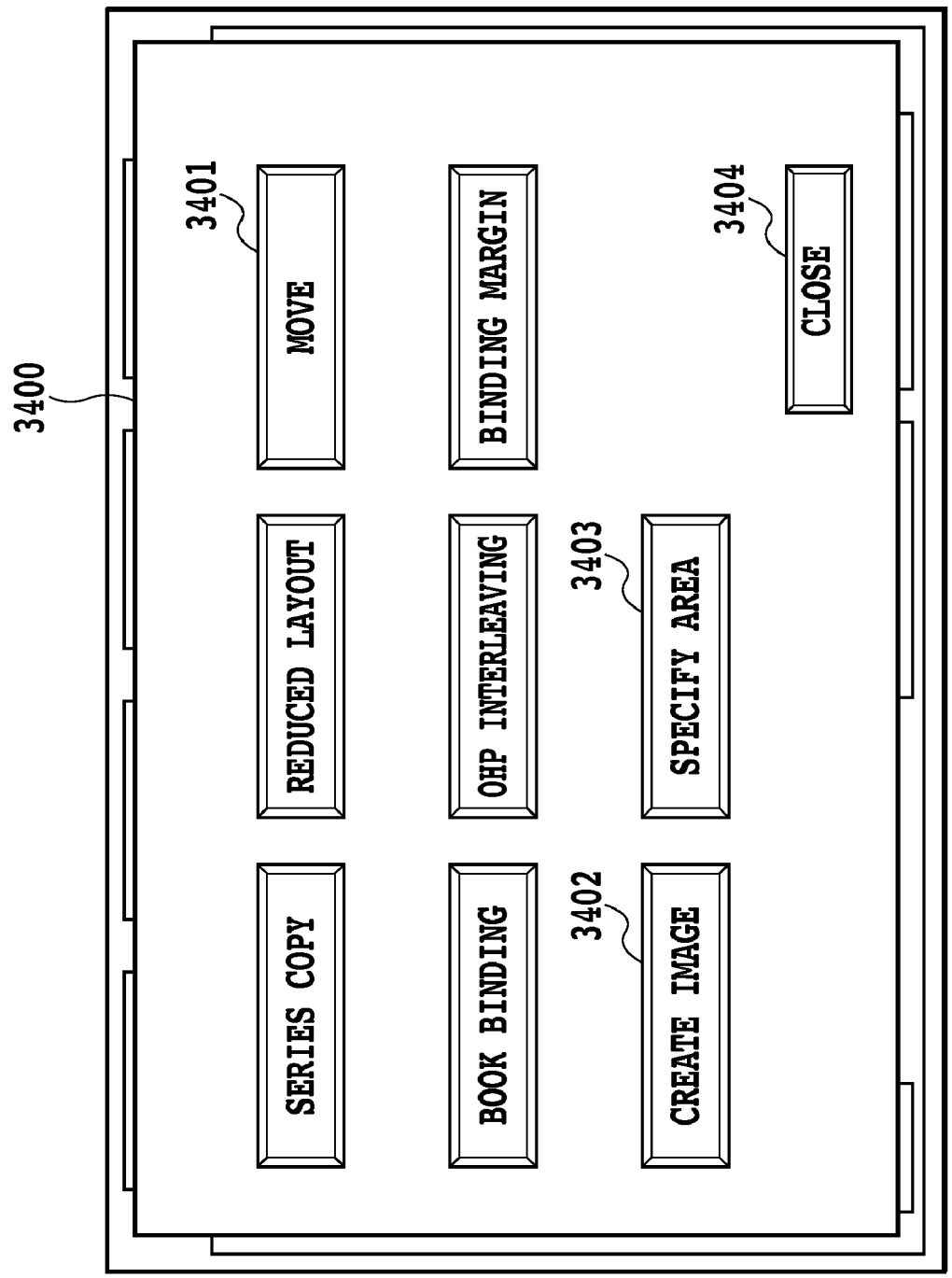
FIG. 34 is a GUI diagram showing an advanced mode dialog displayed when pressing down an advanced mode button according to the first embodiment of the present invention.

FIG. 34 is a GUI diagram showing an advanced mode dialog 3400 displayed on activation of the advanced mode button 3204 (see FIG. 32). Although present-day image forming apparatuses enable settings in numerous advanced modes, in the present instance, only the modes most likely to produce visible effects will be described. As such, descriptions of other possible settings will be omitted.

Reference numeral 3401 denotes a move button for printing a result of a longitudinal/lateral movement with respect to an original. Reference numeral 3402 denotes a create image button for performing various processing on an image. Reference numeral 3403 denotes a specify area button for clipping out an arbitrary rectangular area from the original or for specifying deletion thereof. Reference numeral 3404 denotes a close button for activation on completion of advance mode specification by a user.

Figure 35:
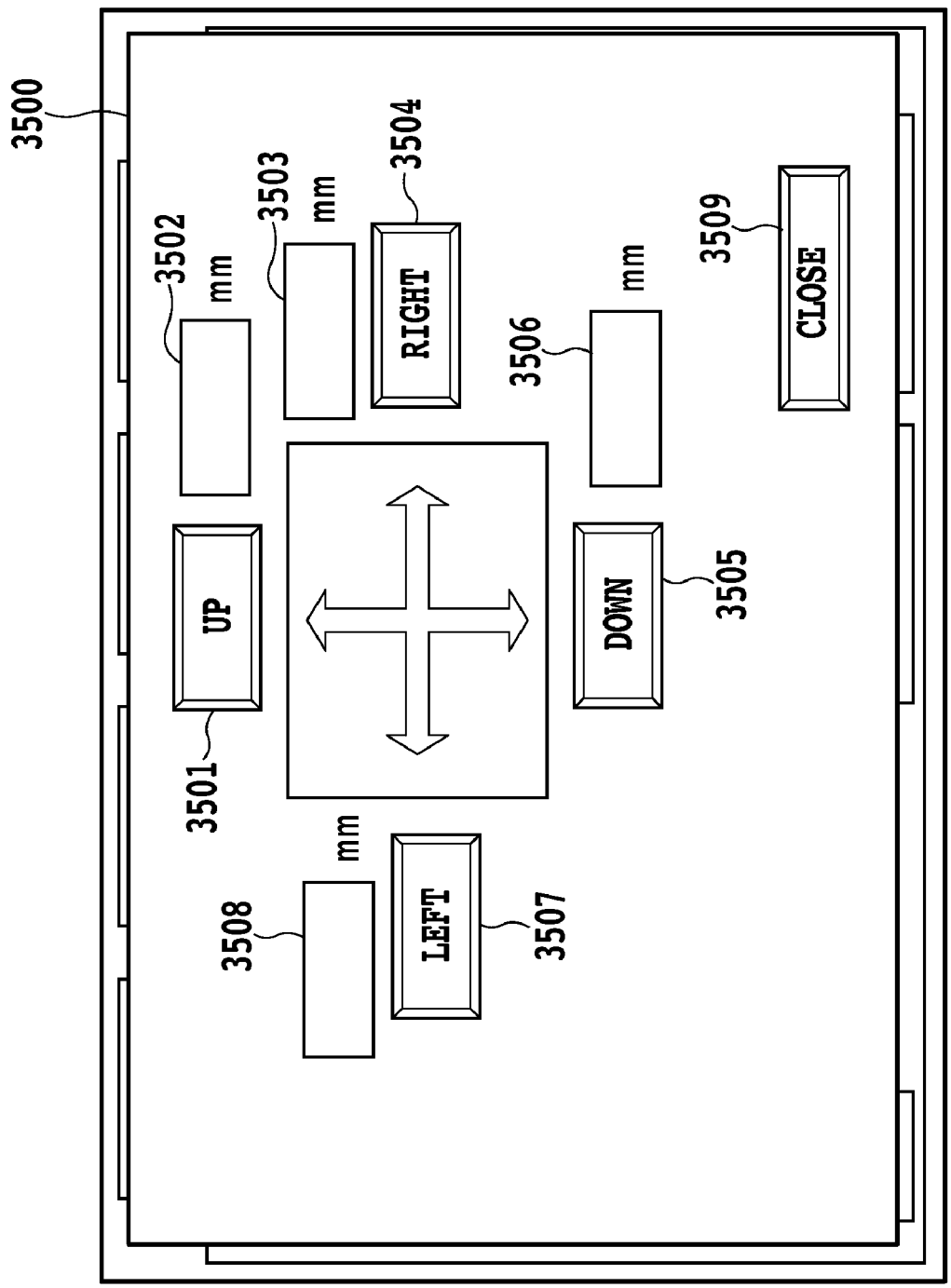
FIG. 35 is a GUI diagram showing a move specification dialog displayed when pressing down a move button according to the first embodiment of the present invention.

FIG. 35 is a GUI diagram showing a move specification dialog 3500 displayed on activation of the move button 3401. In FIG. 35, reference numeral 3501 denotes a move upward button for specifying an upward travel distance by a positive number in mm (millimeter) units. Reference numeral 3502 denotes an upward travel distance display unit that displays an upward travel distance. In the same manner, reference numerals 3504 and 3503 respectively denote a move rightward button and a rightward travel distance display unit, 3505 and 3506 a move downward button and a downward travel distance display unit, and 3507 and 3508 a move leftward button and a leftward travel distance display unit. Reference numeral 3509 denotes a close button for activation on completion of the move specification. When any of the move buttons is pressed down, a numerical value input dialog box, not shown, is displayed on the GUI, whereby a travel distance can be inputted via a numerical keypad provided at the operating unit 412. Alternatively, a travel range may be entered using a pointing device such as a touch panel or a mouse to represent the travel range visually. When a moving requirement is set, the setting affects the operation of the moving unit 825 (see FIG. 8) during printing, thereby enabling a print result to be obtained reflecting a desired movement result.

Figure 36:
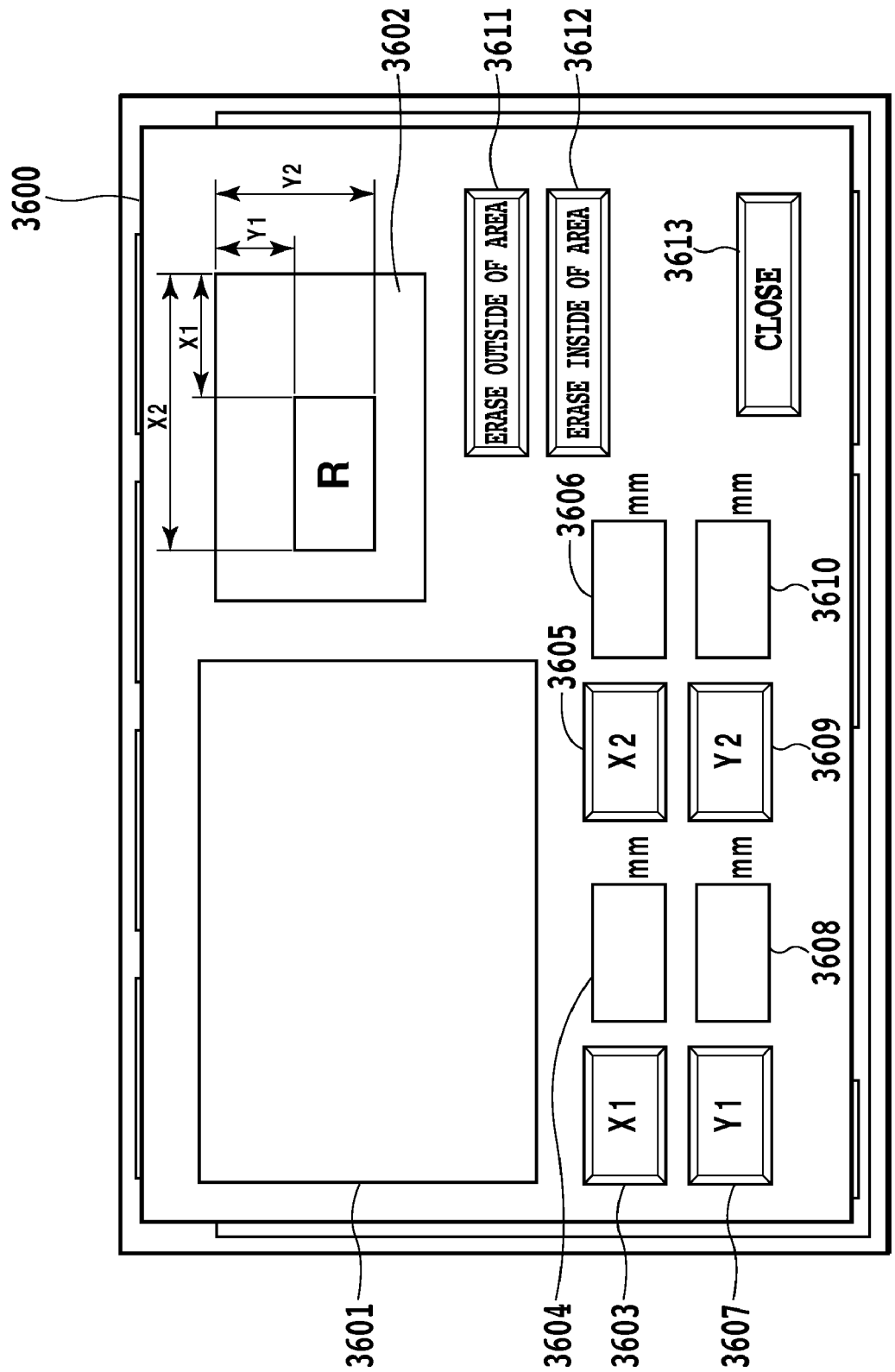
FIG. 36 is a GUI diagram showing an area specification dialog displayed when pressing down a specify area button according to the first embodiment of the present invention.

FIG. 36 is a GUI diagram showing an area specification dialog 3600 displayed on activation of the aforementioned specify area button 3403. In FIG. 36, reference numeral 3601 denotes a range display unit that indicates a range specification result. Reference numeral 3602 denotes a unit indicating a specification method. According to reference numeral 3602, using the upper right of the paper as a base point, a range from the position of coordinates (X1, Y1) and specified by coordinates (X2, Y2) becomes the specified area.

Reference numeral 3603 denotes an X1 input button for inputting X1 that is the X coordinate of a start point while 3604 denotes an X1 display unit that displays the input result in mm (millimeter) units. Similarly, reference numerals 3605 and 3606 respectively denote an X2 input button and an X2 display unit, 3607 and 3608 a Y1 input button and a Y1 display unit, and 3609 and 3610 a Y2 input button and a Y2 display unit.

Reference numeral 3611 denotes an erase outside-of-area button for erasing the outside of a range specified by coordinates (X1, Y1) and coordinates (X2, Y2), and reference numeral 3612 denotes an erase inside-of-area button for erasing the inside of the range specified by coordinates (X1, Y1) and coordinates (X2, Y2). When the respective input buttons are activated, a numerical value input dialog, not shown, is displayed, whereby a travel distance can be inputted via a numerical keypad provided at the operating unit 412. Alternatively, an area specification may be entered using a pointing device such as a touch panel or a mouse to represent the area specification visually.

Reference numeral 3613 denotes a close button for activation on completion of the area specification step. When an area specification is set, the setting affects the operation of the synthesizing unit 827 (see FIG. 8) during printing, thereby enabling a print result to be obtained for a desired area specification result.

Figure 37:
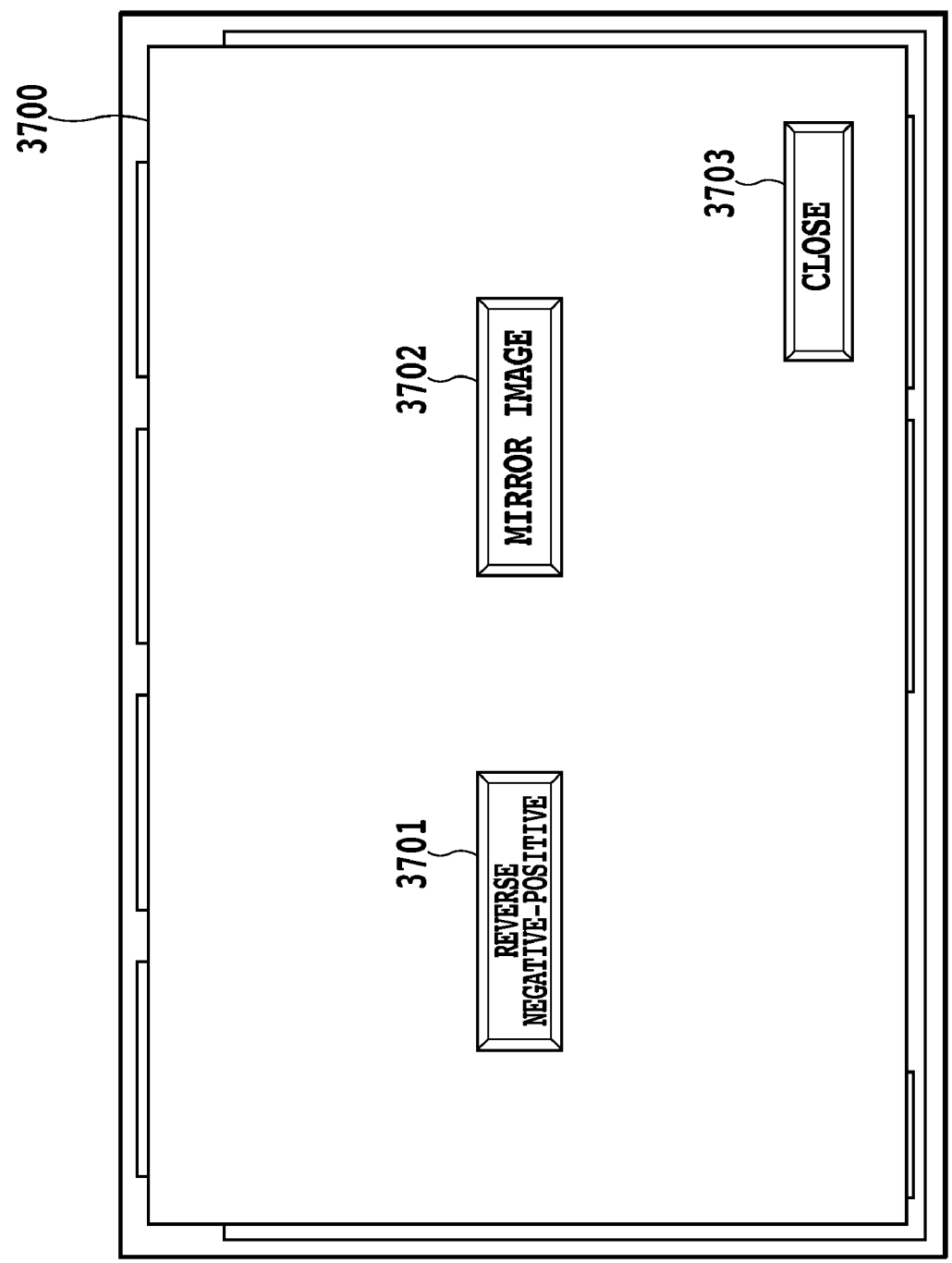
FIG. 37 is a GUI diagram showing an image creating specification dialog displayed when pressing down a create image button according to the first embodiment of the present invention.

FIG. 37 is a GUI diagram showing an image creating specification dialog 3700 displayed on activation of the aforementioned create image button 3402 (see FIG. 34). In FIG. 37, reference numeral 3701 denotes a reverse negative-positive button for performing a negative-positive reversal (i.e., reversing black and white) with respect to an original, while reference numeral 3702 denotes a mirror image button for instructing a left-right mirror image reversal with respect to an original. The reverse negative-positive button 3701 and the mirror image button 3702 do not retain further dialogs; instead, ON/OFF is set as a toggle by activating on the buttons. When image creating is set, the setting affects the operation of an image creating unit, not shown, during printing, thereby enabling a print result to be obtained for a desired processing specification result. Reference numeral 3703 is a close button for activation on completing the image creating setting.

<Destruction of Additional Security Information Embedded Range Due to Enlarging/Reducing>

Now, the destruction of additional security information that may be caused on performing an enlargement/reduction process will be described.

Figure 38:
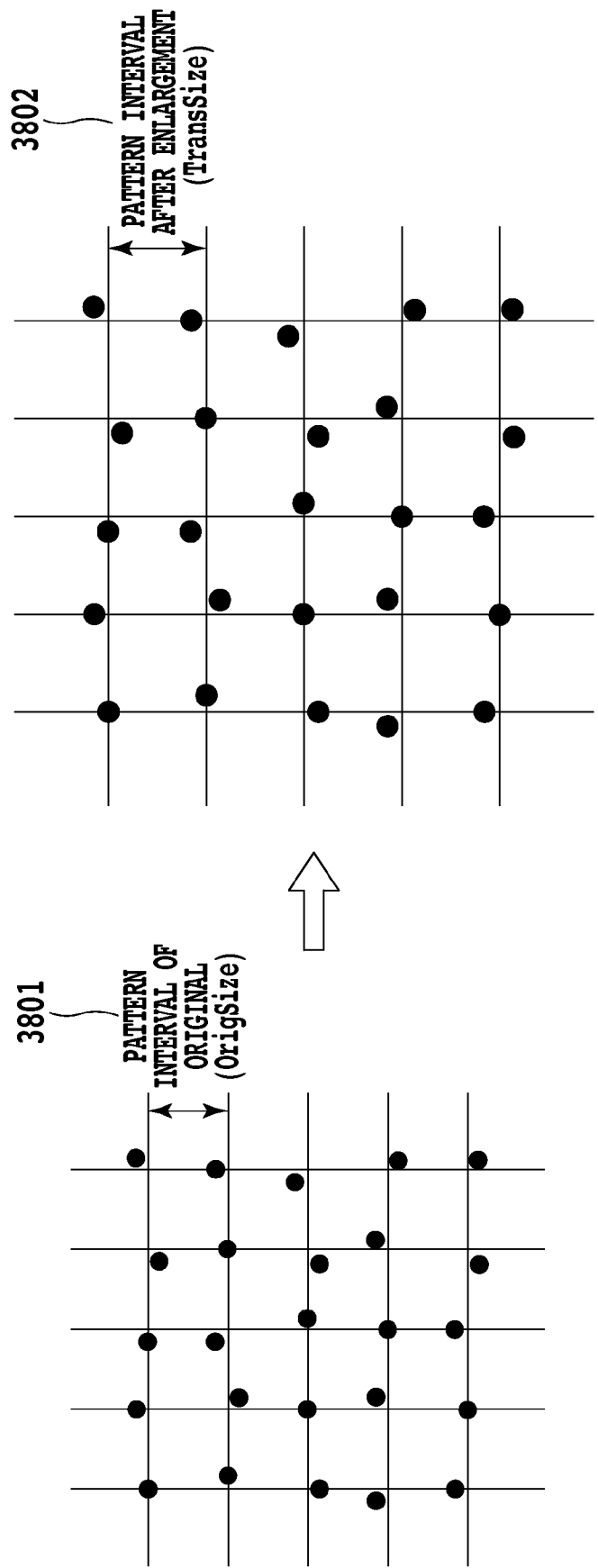
FIG. 38 is a schematic diagram showing that a pattern interval in additional security information embedded in an original increases when enlarging, according to the first embodiment of the present invention.

FIG. 38 is a schematic diagram showing that pattern intervals of the first area and the second area, which include the additional security information as embedded in an original, increase when enlargement processing is performed. In FIG. 38, reference numeral 3801 represents the virtual grid interval prior to enlargement while 3802 represents a virtual grid interval after enlargement. As is apparent from reference numeral 3802, an enlargement processing is accompanied by an increase in the virtual grid interval while a reduction processing results in a decrease in the virtual grid interval.

With additional security information that is to be embedded through an information embedding technique, in reality, a size restriction exists upon extraction thereof. Below, a size restriction in the case where an LVBC is used as a two-dimensional code including additional security information will be described.

As shown in FIG. 22, described earlier, when extracting an LVBC, the dot converting unit 1805 creates a histogram of intervals between individual attention dots and adjacent dots and determines a pattern interval based on occurrence frequencies thereof. Since the range of X (i.e., distance values representative of distances between the attention dots and adjacent dots) in the histogram is not infinite, a restriction exists in pattern intervals in accordance with the measurement range. In addition, since the amount of expressible additional security information data decreases relatively when using an excessively large pattern interval, objectives such as the embedding of tracking information cannot be achieved. On the other hand, the use of an excessively small pattern interval increases measurement error of the grid interval and increases the risk of occurrence of an error in which extraction of embedded additional security information fails. Furthermore, in the case where the pattern interval is excessively small, there is a problem in that the distinction between dots becomes lost such that two adjacent dots are connected to become one dot, thereby disrupting the original dot arrangement and preventing the extraction of desired information. In other words, a certain restriction exists in the size range of the pattern interval.

Such a restriction in the size of the pattern interval is not limited to an LVBC. Even with a QR code (ISO/IEC18004), switching to a small pattern results in a decrease in the embedding accuracy of pattern elements constituting the QR code due to problems of analog constraints such as the bonding of toner or ink described above. As a result, the increase in error renders error correction ineffective and makes information extraction impossible. On the other hand, in the case of an excessively large QR code, there is a problem in that an increase of the number of detection sizes to be anticipated leads to a decrease in calculation speed and a reduction in the volume of information that can be embedded. As shown, there is a certain restriction on the range of sizes of patterns in an information embedding technique.

Whether or not additional security information can be extracted once again from a printing output result of an original embedded with additional security information by an LVBC (or another two-dimensional code such as a QR code), when the original has been subjected to enlargement/reduction processing, can be determined as described below.

First, a post-scaling pattern interval that is a product of the pattern interval of the former original and the magnification is calculated. In other words, post-scaling pattern interval (TransSize)=magnification×pattern interval of former original (OrigSize) is determined.

Now, in a case where
MinSize=minimum identifiable pattern interval
MaxSize=maximum identifiable pattern interval
are assumed as constrained conditions, if
MinSize≦TransSize≦MaxSize
is true, then additional security information can be extracted from the post-scaling original.

For example, in a case where the constrained conditions are MinSize=10 pixels, MaxSize=40 pixels and the former original has an OrigSize of 30 pixels, a magnification of 122% will result in a TransSize of 36.6 pixels, thereby enabling extraction. On the other hand, a magnification of 141% will result in a TransSize of 42.3 pixels, thereby disabling extraction.

OrigSize used at this point is calculated upon determining the pattern interval of the first area in the course of the image analyzing unit 1404 analyzing additional security information from the former original. The calculation is a result of performing re-copying using a first generation copy as an original, and extraction is possible even for a second generation as well as subsequent generations, i.e., regardless of the generation of the copy, as long as the post-scaling pattern interval satisfies the condition.

In addition, when using a two-dimensional code other than an LVBC, a determination on whether or not information extraction is possible can be made by, for example, considering that the central point of each pattern element constituting a pattern encoding additional security information are the dots described in the present embodiment. Clearly, the data extraction techniques required to extract data from a pattern may vary depending on the form of the pattern.

<Limit of Embedding Range of Additional Security Information Due to Area Specification/Movement>

Destruction of additional security information due to area specification or movement will now be described.

Figure 39:
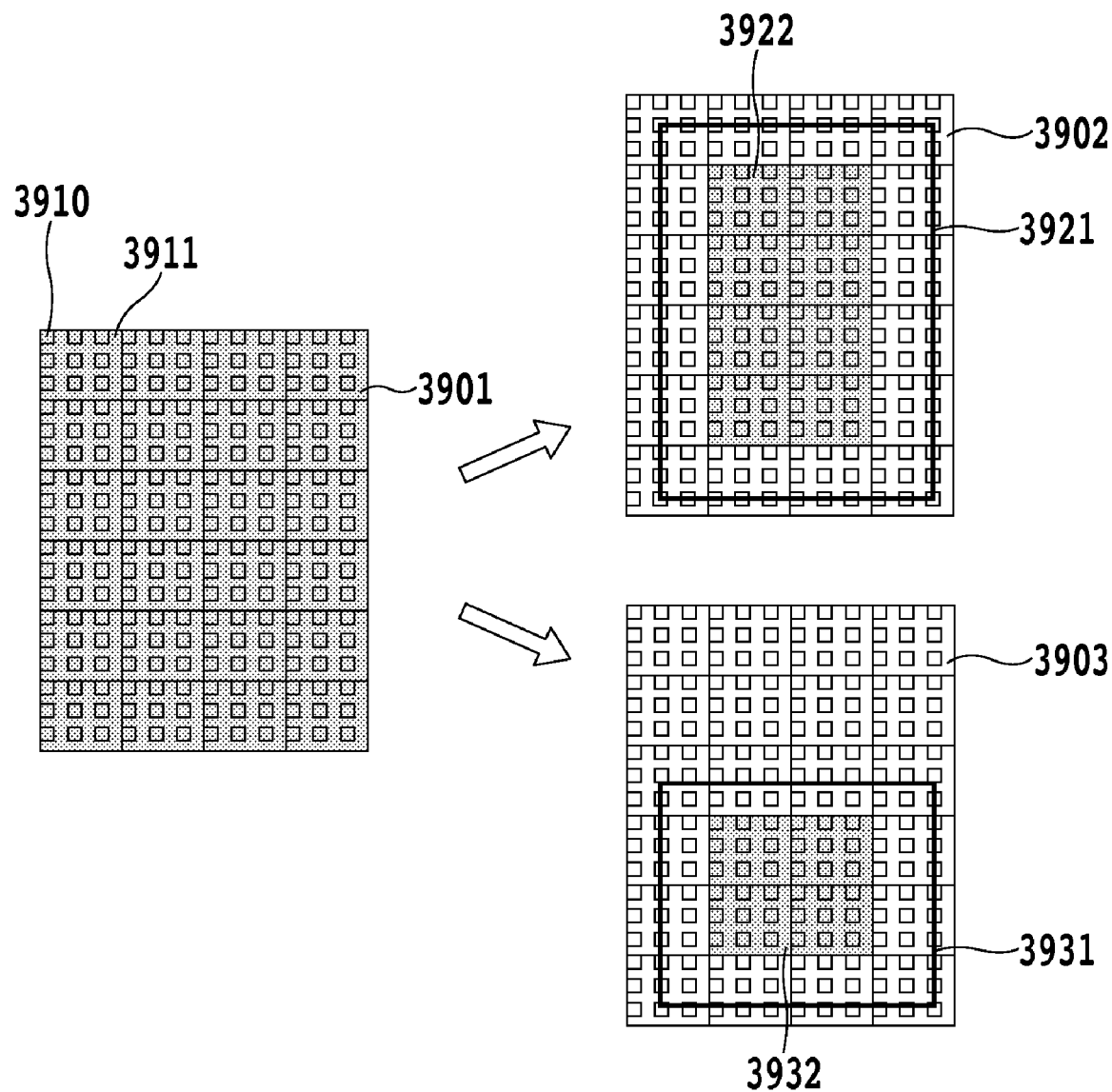
FIG. 39 is a schematic diagram showing that some additional security information embedded in an original is lost when performing area specification processing in an advanced mode, according to the first embodiment of the present invention.

FIG. 39 is a schematic diagram showing that additional security information embedded in an original will be lost when performing area specification in the advanced mode. In FIG. 39, reference numeral 3901 denotes a former original on which area specification is to be performed. Reference numeral 3910 denoting the first area and 3911 denoting the second area are periodically embedded into the former original 3901. An image of an original, not shown, is printed on the former original 3901. Through repetitive and periodic embedding, the latency of the additional security information consisting of the first and second areas increases and enhances resistance of the image of the former image to destruction.

By performing area specification on the former original 3901 using the area specification GUI shown in FIG. 36 and pressing down on the erase outside-of-area button 3611 so as to erase the outside of the specified range, printing is performed in a state where the outside of the area range is erased. Reference numeral 3902 represents a schematic drawing of a case where the outside of an area range is to be erased. Reference numeral 3921 denotes a frame indicating an area range and which signifies that the image outside of the frame is to be erased. A greyed out area denoted by reference numeral 3922 represents additional security information that remains after area specification. Reference numeral 3922 shows that eight second areas (eight periods worth) remain.

As another example, reference numeral 3903 represents a schematic drawing of a case where the outside of an area range is to be erased when the specified area is narrower. Reference numeral 3931 denotes a frame indicating an area range and which signifies that the image outside of the frame is to be erased. A greyed out area denoted by reference numeral 3932 represents additional security information that remains after area specification. Reference numeral 3932 shows that four second areas (four periods worth) remain.

As described above, in order to increase resistance of an image to the destruction of additional security information, the latency of additional security information is arranged to be increased by periodically embedding the same additional security information. In a case where embedding is only performed at a certain number of periods or less, it is possible that the additional security information will not be correctly extracted. For example, assuming that the threshold of a minimum number of repetitive periods for accurately extracting additional security information is 5, it can be determined that while the case represented by reference numeral 3902 corresponds to 8 cycles and therefore enables extraction, the case represented by reference numeral 3903 corresponds to only 4 cycles and therefore extraction cannot be performed. From the above, if the specified area is known and, as a result, a remaining range of the second area is known, it is possible to determine whether or not the additional security information is to be substantially erased.

Movement processing is similar to area specification in the sense that part of an image removed from a paper surface due to the movement will be erased. Therefore, if both the longitudinal and lateral travel distances are known and, as a result, a remaining range of the second area is known, it is possible to determine whether or not the additional security information is to be substantially erased.

<Other Advanced Modes>

Other advanced modes will now be described.

A case will be assumed where a reverse negative-positive button denoted by reference numeral 3701 shown in FIG. 37 is pressed down and a negative-positive reversed image is printed. When the original is once again read by a scanner, the dot detection shown in FIG. 19 will not be successful since black dots normally detected from four directions have actually been changed to white dots on a black background by the negative-positive reversal. Therefore, extraction of additional security information from a negative-positive revered original becomes impossible.

Alternatively, a case will be assumed where a mirror image button denoted by reference numeral 3702 is pressed down and the result of left-right mirror image inversion of an image is printed. When once again reading the image with a scanner, additional security information originally coded by a significant value ends up being turned into meaningless information by the left-right inversion. Therefore, in this case, decoding of the error correction code of the first area becomes undecodable regardless of angle as shown in FIG. 29, thereby destroying the additional security information.

As described above, depending on the advanced mode, since there are cases where additional security information is destroyed merely by applying processing, it is necessary to disable the application of such advanced modes.

<Operation of Job Control Determining Unit>

Figure 40:
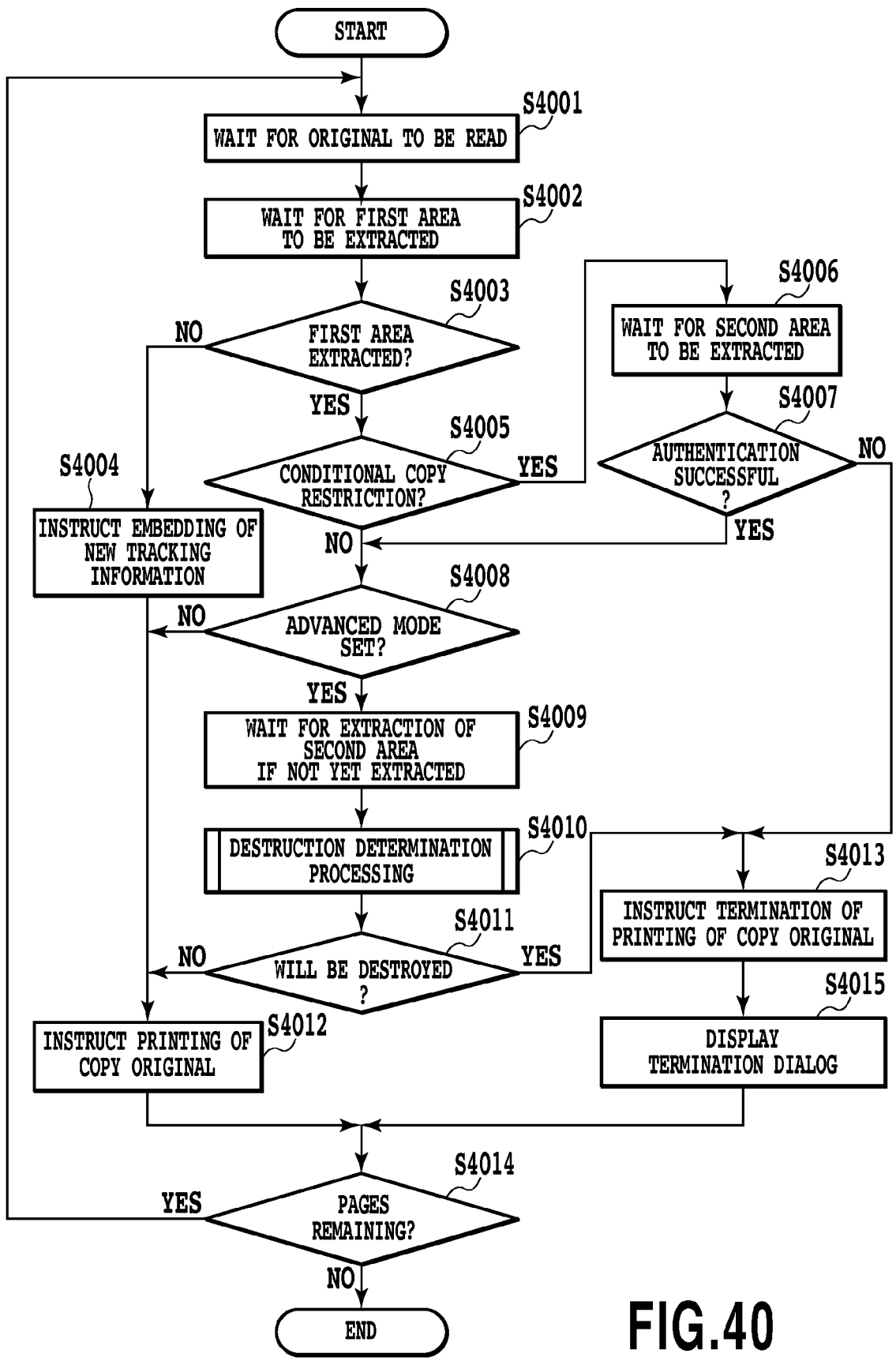
FIG. 40 is a flowchart describing operations of a job control determining unit that performs job control in consideration of applying enlarging/reducing and an advanced mode, according to the first embodiment of the present invention.

FIG. 40 is a flowchart describing operations of the job control determining unit 1405 shown in FIG. 14 which performs job control in consideration of the application of enlarging/reducing and other advanced modes.

The job control determining unit 1405 is responsible for determining upon start of a copy operation whether or not a page is to be printed and whether to instruct the print unit 1403 to print or abort printing. In FIG. 40, in step S4001, the process waits for the image reading unit 1401 to read an image. In step S4002, the process waits for the extraction of additional security information of the first area to be completed by the image analyzing unit 1404.

In step S4003, the image analyzing unit 1404 determines whether the first area has been extracted. If not, in step S4004, an instruction to embed new additional security information is issued to the print unit 1403 and the process jumps to step S4012. In this case, since new additional security information need only be embedded where an advance mode is to be applied regardless of whether the applied advance mode is enlarging/reducing or another advanced mode, printing may be continued.

On the other hand, when it is determined in step S4003 that the extraction of the aforementioned first area has been successful, the copy restricting information written into the first area is extracted. As a result, when it is determined that conditional copy restricting information exists, the process moves on to step S4006 to wait for the image analyzing unit 1404 to complete the extraction of the second area. The authentication dialog 602 shown in FIG. 6 for prompting password input described earlier is displayed at this point.

In step S4007, an authentication code (e.g. a password) included in tracking information extracted from the second area is compared with a password inputted by the user via the authentication dialog 602 shown in FIG. 6. If it is determined at this point that authentication has failed, the process returns to step S4013 and the job control determining unit 1405 instructs the print unit 1403 to terminate printing. The flow proceeds to step S4015 where a print termination dialog indicating a termination of the printing due to copy inhibition is displayed. The password comparison described above may take the form a comparison of text strings themselves or a comparison evaluation of a result applying a one-way hash function to text strings. In addition, although not shown, when it is determined in step S4005 that the copy restricting information is "prohibit copying", the process immediately moves on to step S4013 and instructs the print unit 1403 to terminate printing.

On the other hand, when the aforementioned authentication is successful, determination is made in step S4008 on whether enlarging/reducing or another advanced mode has been set. If these advanced modes have not been set, the process moves on to step S4012 to continue printing. Conversely, in the case where these advanced modes have been set, in step S4009, if the second area has not been extracted, the process waits for the image analyzing unit 1404 to complete extraction of the second area.

Figure 43:
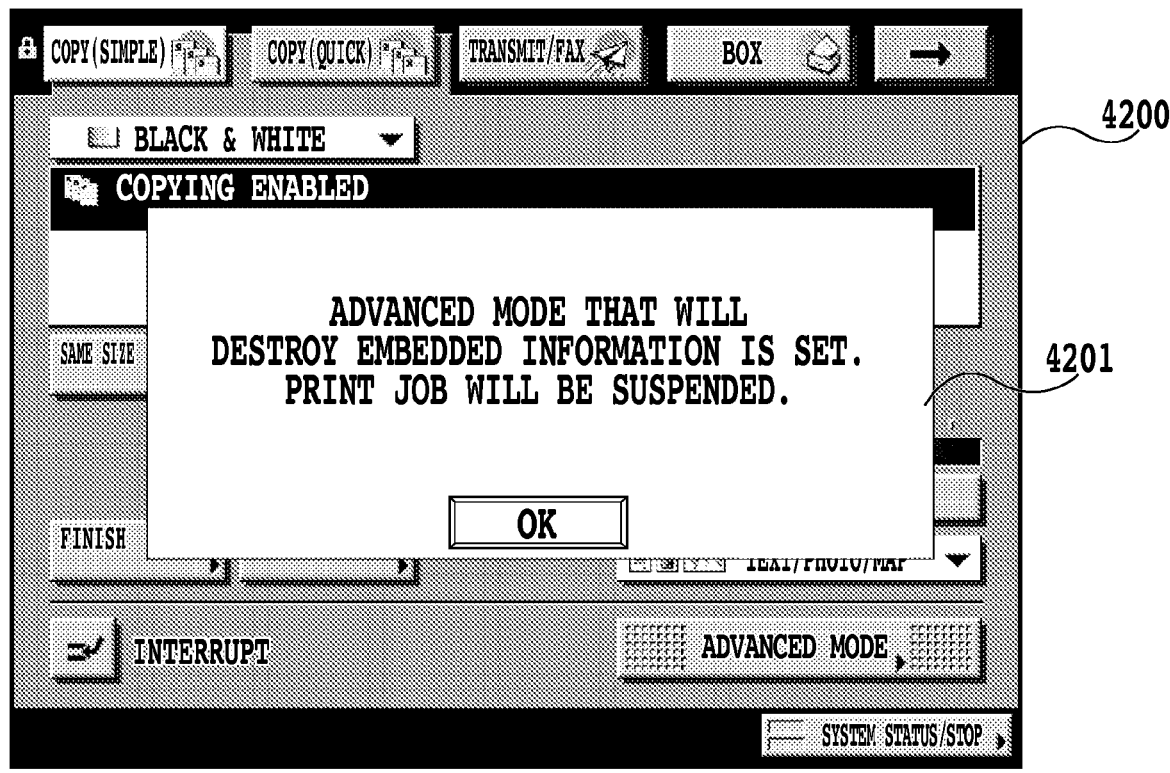
FIG. 43 is a GUI diagram showing a print termination dialog displayed when additional security information is determined to be destroyed due to the setting value of enlarging/reducing or an advance mode, according to the first embodiment of the present invention.

In step S4010, processing (to be described later) is executed as prescribed processing to determine whether or not enlarging/reducing or another advanced mode will destroy the embedded additional security information. In step S4011, in response to the determination result of step S4010, when it is determined that additional security information will be destroyed, the process moves on to step S4013 to terminate printing. Furthermore, in step S4015, a message to the effect that a job has been cancelled is displayed on the operating panel, an example of which is shown in FIG. 43. On the other hand, in the case where it is determined that additional security information will not be destroyed, the process proceeds to step S4012 to continue printing while applying enlarging/reducing or another advanced mode as prescribed processing.

Finally, in step S4014, determination is made on whether there remain pages to be read by the image reading unit 1401. If so, the flow returns to step S4001, and if not, the processing is completed.

Details of the destruction determination processing of step S4010 described above will now be provided.

Figure 41:
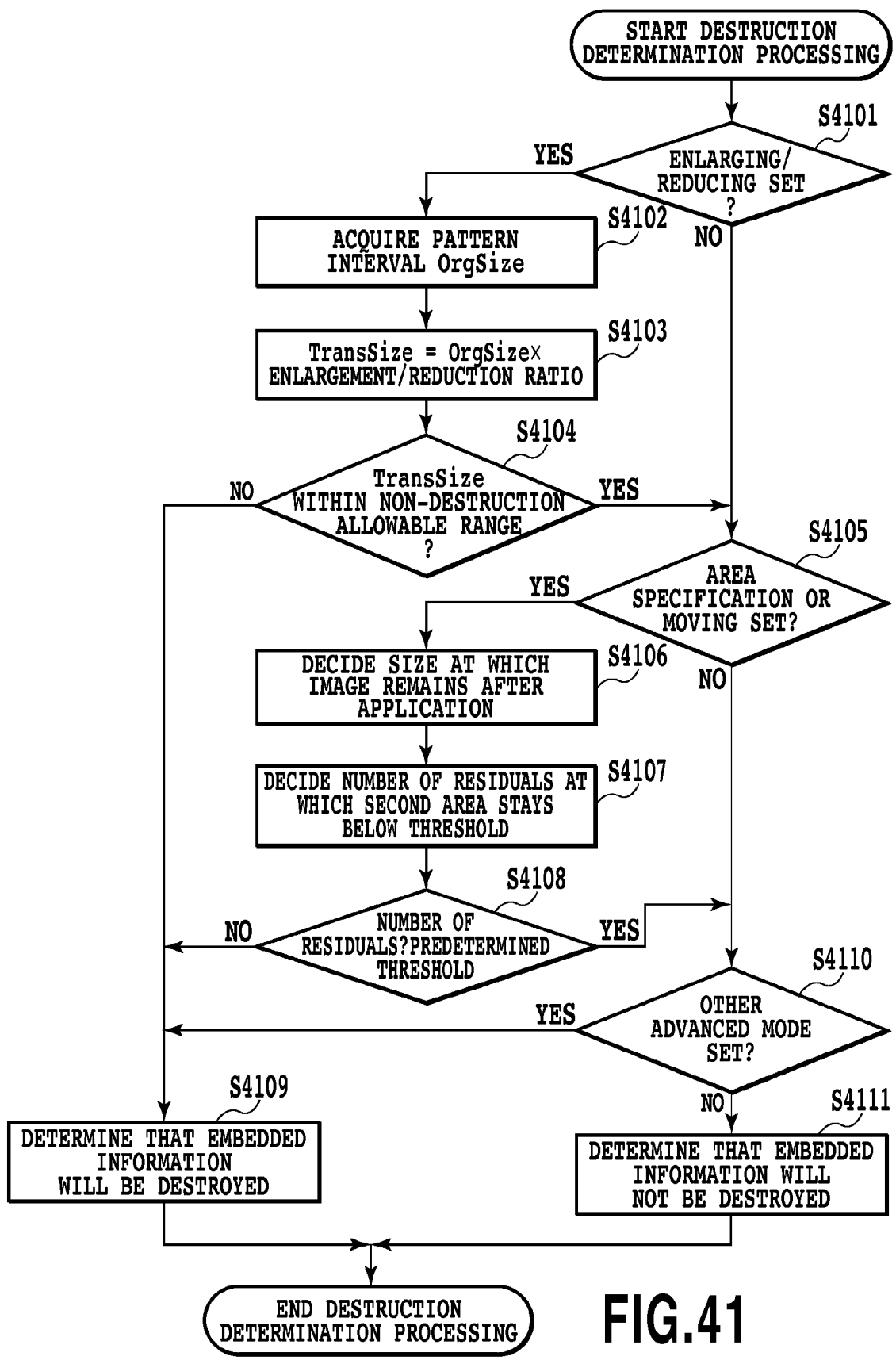
FIG. 41 is a flowchart for describing details of destruction determination processing according to the first embodiment of the present invention.

FIG. 41 is a flowchart for describing details of the processing performed in step S4010.

In step S4101 in FIG. 41, determination is made on whether enlarging/reducing has been set. If enlarging/reducing has been set, in step S4102, the original grid internal OrigSize calculated upon extraction of the first area is acquired from the image analyzing unit 1404. On the other hand, if enlarging/reducing has not been set, the process jumps to step S4105 described below.

In step S4103, TransSize is calculated from OrigSize and the enlargement/reduction ratio, and in step S4104, a determination is made on whether TransSize falls within an allowable range (the range expressed by MinSize and MaxSize described earlier). When TransSize is out of the allowable range, in step S4109, a determination result is issued to the effect that additional security information that is embedded information would be destroyed. On the other hand, when TransSize is within the allowable range, in step S4105, a determination is made on whether area specification or movement is specified as an advanced mode. When either area specification or movement has been set, in step S4106, the size of the image remaining after the advanced mode is applied is determined.

In step S4107, the number of residuals is determined, the number of residuals reflects or corresponds to the remaining number of second areas in the image, and in step S4108, a determination is made on whether or not the number of residuals exceeds a prescribed threshold. When it is determined that the aforementioned number of residuals exceeds the prescribed threshold, the latency of the second area is determined to be sufficient and the process moves on to step S4110. On the other hand, if not, it is assumed that the latency is insufficient and that additional security information has been destroyed, and the process jumps to step S4109.

In step S4110, when another advanced mode, i.e., negative-positive reversal or mirror image which are image creating, has been set, the process moves on to step S4109 to issue a determination result to the effect that additional security information will inevitably be destroyed. On the other hand, if such an advanced mode has not been set, the process moves on to step S4111 to issue a determination result to the effect that additional security information will not be destroyed.

In the manner described above, print control is performed on the image forming apparatus.

The above embodiment has been described using, as a target, image data that expresses additional information by the direction of displacement of a dot, forming part of a pattern, from a virtual grid point.

However, the present invention is also applicable to other forms of expression (expression of additional information). For example, the present invention is applicable to two-dimensional codes such as a QR code™. Alternatively, the present invention is applicable to two-dimensional codes such as a glyph code or a dot code. A QR code differs from "a method of expressing additional information by the direction of displacement of a dot from a virtual grid point" in that, in a QR code, information is expressed by controlling whether or not a dot is to be placed on a virtual grid point. Thus a QR code differs from "a method of expressing additional information by the direction of displacement of a dot from a virtual grid point" in that virtual grid points exist to which a dot is not associated (thereby expressing information 0).

More generally, additional information may thus be expressed by the arrangement of dots associated to virtual grid points, thereby encompassing additional information encoded using codes such as a QR code or an LVBC as described above. [0001]

[Second Embodiment]

In the first embodiment described earlier, a determination of permission/non-permission of scaling (enlarging, reducing) is made based on whether the grid interval is within a predetermined range (within an allowable range).

In a second embodiment to be described below, a determination of permission/non-permission of scaling is made based not only on whether or not the grid interval is within a predetermined range but also on whether or not the dot size is within a predetermined range.

This method is not particularly suitable as a method in which "distances between pattern points or dots (pattern interval) and the dot size are approximately consistent", such as a QR code (registered trademark). This is because making a determination regarding the distance between pattern points or dots (pattern interval) and then making a determination regarding dot size substantially equates to making the same determination twice.

On the other hand, with a method in which the magnitude of distances between pattern points A (pattern interval) and the dot size B are not approximately consistent and a ratio therebetween (ratio of A to B) is variable, as typified by the LVBC disclosed in the first embodiment, a necessity arises to make both determinations.

Hereinafter, as the second embodiment, an embodiment that differs from the destruction determination processing of aforementioned step S4010 according to the first embodiment will be described in detail.

Figure 42:
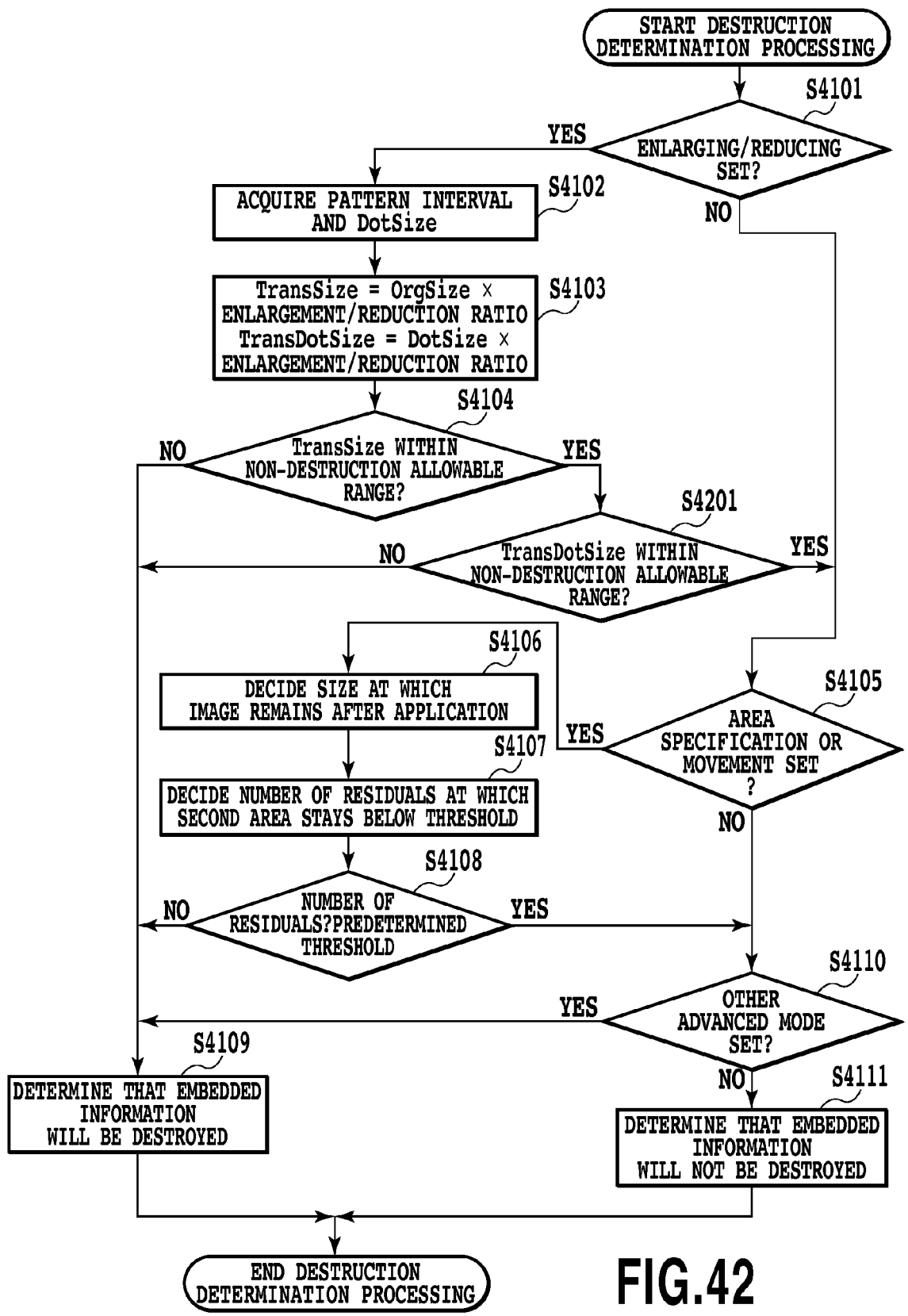
FIG. 42 is a flowchart for describing details of destruction determination processing according to a second embodiment of the present invention.

FIG. 42 is a flowchart for describing details of processing performed in step S4010 according to the present embodiment. In the diagram, processing steps shared with or similar to the flowchart shown in FIG. 41 are denoted by common reference characters.

In step S4101 in FIG. 41, determination is made on whether enlarging/reducing has been set. If enlarging/reducing has been set, in step S4102, the original pattern interval OrigSize calculated upon extraction of the first area is acquired from the image analyzing unit 1404. Furthermore, an average dot size DotSize is acquired from the dot analyzing unit 1803. On the other hand, if enlarging/reducing has not been set, the process jumps to step S4105 described below.

In step S4103, TransSize is calculated from OrigSize and the enlargement/reduction ratio. Furthermore, in step S4103, TransDotSize is calculated based on the average dot size and the enlargement/reduction ratio (by multiplying the two). In step S4104, determination is made on whether or not TransSize is within an allowable range (the range expressed by MinSize and MaxSize described earlier). When TransSize is out of the allowable range, in step S4109, a determination result is issued to the effect that additional security information that is embedded information would be destroyed. Processing of step S4105 and thereafter as well as the processing of step S4201 will not be performed. On the other hand, if TransSize is within the allowable range, the process moves on to step S4201, where a determination is made on whether TransDotSize is within the allowable range. When TransDotSize is out of the allowable range, in step S4109, a determination result is issued to the effect that additional security information that is embedded information would be destroyed. Processing of step S4105 and thereafter will not be performed. On the other hand, if TransDotSize is within the allowable range, the flow moves on to step S4105. In step S4105, a determination is made on whether area specification or movement is specified as an advanced mode. When either area specification or movement has been set, in step S4106, the size of the image remaining after the advanced mode is applied is determined.

In step S4107, the number of residuals is determined, where the number of residuals reflects or corresponds to the remaining number of second areas in the remaining image, and in step S4108, a determination is made on whether or not the number of residuals exceeds a prescribed threshold. When it is determined that the aforementioned number of residuals exceeds the prescribed threshold, the latency of the second area is determined to be sufficient and the process moves onto step S4110. On the other hand, if the number of residuals does not exceed the prescribed threshold, it is assumed that the latency is insufficient and that additional security information would be destroyed, and the process proceeds to step S4109.

In step S4110, when another advanced mode, e.g., negative-positive reversal or mirror image which are image creating, has been set, the flow moves on to step S4109 to issue a determination result to the effect that additional security information will be inevitably destroyed. On the other hand, if such another advanced mode has not been set, the process proceeds to step S4111 to issue a determination result to the effect that additional security information will not be destroyed.

In the manner described above, print control is performed on the image forming apparatus.

The object of the present invention can also be achieved by having a computer (or a CPU or an MPU) of a system or an apparatus read out and execute a program code realizing the procedures of the flowcharts presented in the embodiments described above from a storage medium storing the program code.

In this case, the program code itself that is read out from the storage medium causes the computer to realize the functions of the embodiments described above. Consequently, the program code and the computer-readable storage medium in which the program code is stored/recorded also constitute an aspect of the present invention.

Examples of the storage medium for supplying the program code may include a floppy (registered trademark) disk, a hard disk, an optical disk, a magnetic optical disk, a CD-ROM, a CD-R, a magnetic tape, a nonvolatile memory card, a ROM, and the like.

In addition, the functions of the embodiments described earlier are realized by having a computer read out and execute a program. The execution of the program includes a case where an OS or the like running on a computer performs a part or all of the actual processing based on instructions of the program.

Furthermore, the functions of the embodiments described earlier can also be realized by an expansion board inserted into a computer or in an expansion unit connected to the computer. In this case, a program read out from a storage medium is first written into a memory provided on the expansion board inserted into a computer or on the expansion unit connected to the computer. Subsequently, a CPU or the like provided on the expansion board or the expansion unit performs a part of or all of the actual processing based on instructions contained in the program. The functions of the embodiments described earlier can also be realized by processing performed by such an expansion board or an expansion unit.

The present invention also relates to a print control apparatus for receiving a data of an image expressing additional information by a direction of displacement of a dot from a grid point, the print control apparatus comprising:

a determining unit configured to determine an interval between the grid point and a grid point adjacent to the grid point from the received data of the image; and a control unit configured to perform a control so as to scale the image at a magnification specified by a user and have the scaled image printed by a printing apparatus when the product of the magnification specified by the user and the interval determined by the determining unit falls within a predetermined range, and configured to terminate or interrupt the printing of the image by the printing apparatus when the product of the magnification specified by the user and the interval determined by the determining unit does not fall within the predetermined range.

The present invention also relates to a print control apparatus for receiving a data of an image expressing additional information by a direction of displacement of a dot from a grid point, the print control apparatus comprising:

a determining unit configured to determine an interval between the grid point and a grid point adjacent to the grid point from the received data of the image; and a control unit configured to perform a control so as to scale the image at a magnification specified by a user and have the scaled image printed by a printing apparatus, wherein the control unit performs control so as to determine whether an interval between a grid point in the image after scaling and a grid point adjacent to the grid point in the image after scaling falls within a predetermined range based on the magnification applied to the image and specified from the user and the interval determined by the determining unit, and scale the image at the magnification and terminate or interrupt processing for causing the printing apparatus to print the scaled image when determining that the interval does not fall within the predetermined range.

The present invention also relates to a print control apparatus for receiving an image data including a two-dimensional code, comprising:

a determining unit configured to determine an interval between the centroid of a pattern element constituting the two-dimensional code and the centroid of a pattern element adjacent to the pattern element from the received data of the image; and a control unit configured to perform a control so as to scale the received image at a magnification specified by a user and have the scaled image printed by a printing apparatus when the product of the magnification specified by the user and the interval determined by the determining unit falls within a predetermined range, and configured to terminate or interrupt the printing of the received image by the printing apparatus when the product of the magnification specified by the user and the interval determined by the determining unit does not fall within the predetermined range.

The present invention also relates to a print control apparatus for receiving a image data including a two-dimensional code, comprising:

a determining unit configured to determine an interval between the centroid of a pattern element constituting the two-dimensional code and the centroid of a pattern element adjacent to said pattern element from the received data of the image; and a control unit configured to perform a control so as to scale the image at a magnification specified by a user and have the scaled image printed by a printing apparatus, wherein the control unit performs control so as to determine whether an interval between the centroid of the pattern element in the scaled image and a centroid of a pattern element adjacent to the pattern element in the scaled image falls within a predetermined range based on the magnification applied to the image and specified from the user and the interval determined by the determining unit, and scale the received image at the magnification and terminate or interrupt processing for causing the printing apparatus to print the scaled image when determining that the interval does not fall within the predetermined range.

The present invention also relates to a print control method of a print control apparatus for receiving a data of an image expressing additional information by a direction of displacement of a dot from a grid point, the print control method comprising the steps of:

determining an interval between the grid point and a grid point adjacent to the grid point from the received data of the image;

performing a control so as to scale the image at a magnification specified by a user and have the scaled image printed by a printing apparatus when the product of the magnification specified by the user and the interval determined in the determining step falls within a predetermined range; and performing a control so as to terminate or interrupt the printing of the image by the printing apparatus when the product of the magnification specified by the user and the interval determined in the determining step does not fall within the predetermined range.

The present invention also relates to a print control method of a print control apparatus for receiving a data of an image expressing additional information by a direction of displacement of a dot from a grid point, the print control method comprising the steps of:

determining an interval between the grid point and a grid point adjacent to said grid point from the received data of the image; and performing a control so as to scale the image at a magnification specified by a user and have the scaled image printed by a printing apparatus, the control step including performing a control so as to determine whether an interval between a grid point in the image after scaling and a grid point adjacent to the grid point in the scaled image falls within a predetermined range based on the magnification applied to the image and specified from the user and the interval determined in the determining step, and scale the image at the magnification and terminate or interrupt processing for causing the printing apparatus to print the scaled image when determining that the interval does not fall within the predetermined range.

The present invention also relates to a print control method of a print control apparatus for receiving an image data including a two-dimensional code, the print control method comprising the steps of:

determining an interval between the centroid of a pattern element constituting the two-dimensional code and the centroid of a pattern element adjacent to the pattern element from the received data of the image;

performing a control so as to scale the received image at a magnification specified by a user and have the scaled image printed by a printing apparatus when the product of the magnification specified by the user and the interval determined in the determining step falls within a predetermined range; and performing a control so as to terminate or interrupt the printing of the received image by the printing apparatus when the product of the magnification specified by the user and the interval determined by in the determining step does not fall within the predetermined range.

The present invention also relates to a print control method of a print control apparatus for receiving an image data including a two-dimensional code, the print control method comprising the steps of:

determining an interval between the centroid of a pattern element constituting the two-dimensional code and the centroid of a pattern element adjacent to said pattern element from the received image data; and performing a control so as to scale the image at a magnification specified by a user and have the scaled image printed by a printing apparatus, the control step including performing control so as to determine whether an interval between the centroid of the pattern element in the scaled image and a centroid of the pattern element adjacent to the pattern element in the scaled image falls within a predetermined range based on the magnification applied to the image and specified from the user and the interval determined in the determining step, and scale the received image at the magnification and terminate or interrupt processing for causing the printing apparatus to print the scaled image when determining that the interval does not fall within the predetermined range.

The present invention also relates to a print control apparatus for receiving a data of an image expressing additional information by an arrangement of a dot associated with a grid point, the print control apparatus comprising:

a determining unit configured to determine an interval between the grid point and a grid point adjacent to the grid point from the received data of the image; and a control unit configured to perform a control so as to scale the image at a magnification specified by a user and have the scaled image printed by a printing apparatus when the product of the magnification specified by the user and the interval determined by the determining unit falls within a predetermined range, and configured to terminate or interrupt the printing of the image by the printing apparatus when the product of the magnification specified by the user and the interval determined by the determining unit does not fall within the predetermined range.

The present invention also relates to a print control apparatus for receiving a data of an image expressing additional information by an arrangement of dots associated with grid points, the print control apparatus comprising:

a determining unit configured to determine an interval between the grid point and a grid point adjacent to the grid point from the received data of the image and further determining an average size of the dots; and a control unit configured to perform a control so as to scale the image at a magnification specified by a user and have the scaled image printed by a printing apparatus when the product of the magnification specified by the user and the interval determined by the determining unit as well as the product of the magnification specified by the user and the average dot size determined by the determining unit fall within a predetermined range, and configured to terminate or interrupt the printing of the image by the printing apparatus when either one of the product of the magnification specified by the user and the interval determined by the determining unit and the product of the magnification specified by the user and the average dot size determined by the determining unit does not fall within the predetermined range.

The present invention also relates to a program on a computer-readable medium, the program causing a computer provided at a print control apparatus for receiving a data of an image expressing additional information by a direction of displacement of a dot from a grid point to function as:

a determining unit configured to determine an interval between the grid point and a grid point adjacent to the grid point from the received image data; and a control unit configured to perform a control so as to scale the image at a magnification specified by a user and have the scaled image printed by a printing apparatus when the product of the magnification specified by the user and the interval determined by the determining unit falls within a predetermined range, and configured to terminate or interrupt the printing of the image by the printing apparatus when the product of the magnification specified by the user and the interval determined by the determining unit does not fall within the predetermined range.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-291139, filed Nov. 8, 2007, which is hereby incorporated by reference herein in its entirety.

What is claimed is:

1. A print control apparatus for receiving an image including a two-dimensional code expressing additional information by an arrangement of dots associated with grid points, the print control apparatus comprising:

a determining unit configured to determine from the received image an interval between a grid point and a grid point adjacent thereto; and a control unit configured to control so as to scale the image at a magnification specified by a user and have the scaled image printed by a print unit when the product of the magnification specified by the user and the interval determined by the determining unit falls within a predetermined range, and configured to control so as to terminate or interrupt the printing of the image by the print unit when the product of the magnification specified by the user and the interval determined by the determining unit does not fall within the predetermined range.

2. The print control apparatus according to claim 1, wherein the additional information is conditional copy restricting information.

3. A program stored in a non-transitory computer readable storage medium for causing a computer to perform the print control apparatus according to claim 1.

4. A print control apparatus for receiving an image including a two-dimensional code expressing additional information by an arrangement of dots, the print control apparatus comprising:

a determining unit configured to determine sizes of the dots from the received image; and a control unit configured to control so as to scale the image at a magnification specified by a user and have the scaled image printed by a print unit when the product of the magnification specified by the user and the sizes of the dots determined by the determining unit falls within a predetermined range, and configured to control so as to terminate or interrupt the printing of the image by the print unit when the product of the magnification specified by the user and the sizes of the dots determined by the determining unit does not fall within the predetermined range.

5. A print control method in a print control apparatus for receiving an image including a two-dimensional code expressing additional information by an arrangement of dots associated with grid points, the print control method comprising the steps of:

determining from the received image an interval between grid point and a grid point adjacent thereto; and controlling so as to scale the image at a magnification specified by a user and have the scaled image printed by a printing step when the product of the magnification specified by the user and the interval determined by the determining step falls within a predetermined range, and controlling so as to terminate or interrupt the printing of the image by the printing step when the product of the magnification specified by the user and the interval determined by the determining step does not fall within the predetermined range.

6. The print control method according to claim 5, wherein the additional information is conditional copy restricting information.

7. A print control method in a print control apparatus for receiving an image including a two-dimensional code expressing additional information by an arrangement of dots, the print control method comprising the steps of:

determining sizes of the dots from the received image; and controlling so as to scale the image at a magnification specified by a user and have the scaled image printed by a printing step when the product of the magnification specified by the user and the sizes of the dots determined by the determining step falls within a predetermined range, and controlling so as to terminate or interrupt the printing of the image by the printing step when the product of the magnification specified by the user and the sizes of the dots determined by the determining step does not fall within the predetermined range.

* * * * *